(12) United States Patent
Toshikage et al.

(10) Patent No.: US 8,306,917 B2
(45) Date of Patent: *Nov. 6, 2012

(54) IMAGE COMMERCIAL TRANSACTIONS SYSTEM AND METHOD

(75) Inventors: Hideki Toshikage, Saitama (JP);
Shigeyuki Yoneyama, Tokyo (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/586,934

(22) Filed: Oct. 26, 2006

(65) Prior Publication Data

US 2007/0050267 A1 Mar. 1, 2007

Related U.S. Application Data

(63) Continuation of application No. 09/749,097, filed on Dec. 27, 2000, now Pat. No. 7,225,158.

(30) Foreign Application Priority Data

Dec. 28, 1999 (JP) ................................. P11-375545

(51) Int. Cl.
*G06F 21/00* (2006.01)

(52) U.S. Cl. ......................................................... 705/51

(58) Field of Classification Search .................... 705/50, 705/51, 56, 75; 717/127, 128, 178; 713/187, 713/190, 200

See application file for complete search history.

(56) References Cited

U.S. PATENT DOCUMENTS

| | | | |
|---|---|---|---|
| 549,231 A | 11/1895 | Crane | |
| 1,160,037 A | 11/1915 | Brewer | |
| 1,260,280 A | 3/1918 | Avram | |
| 1,312,052 A | 8/1919 | Sartorius et al. | |
| 1,572,252 A | 2/1926 | Tessier | |
| 1,997,333 A | 4/1935 | Hultquist et al. | |
| 2,377,341 A | 6/1945 | Hannum | |
| 2,628,346 A | 2/1953 | Burkhart | |
| 3,138,081 A | 6/1964 | Nerwin | |
| 3,490,844 A | 1/1970 | Sapp, Jr. | |

(Continued)

FOREIGN PATENT DOCUMENTS

EP 0 212 443 3/1987

(Continued)

OTHER PUBLICATIONS

Thumbnail, p. 519, defintion from Microsoft Computer Dictionary Fifth Edition, Copywrite 2002.

(Continued)

*Primary Examiner* — Mary Cheung

(74) *Attorney, Agent, or Firm* — Lerner, David, Littenberg, Krumholz & Mentlik, LLP

(57) ABSTRACT

An image commercial transactions system and method that are able to implement sales to the purpose of the seller. An e-commerce system for selling a picture and a handling condition specific to the picture, both being recorded on a predetermined recording medium in a predetermined format. The picture to be sold and the handling condition are accepted by an acceptor in a digital format. When a transaction is established, an accounting company carries out an accounting electronically for a purchaser of the picture and the e-commerce condition, thereby both of the picture to be sold and the handling condition are sold as digital data so that the purchased picture is used in a handling manner as intended by the seller. Consequently, the selling of the picture can be made so as to satisfy the intention of the seller.

12 Claims, 53 Drawing Sheets

U.S. PATENT DOCUMENTS

| | | |
|---|---|---|
| 3,674,365 A | 7/1972 | Köhler et al. |
| 3,678,834 A | 7/1972 | Mellilio |
| 3,744,890 A | 7/1973 | Suzuki |
| 3,810,218 A | 5/1974 | Millet |
| 3,812,327 A | 5/1974 | Inoue |
| 3,825,679 A | 7/1974 | Farrell et al. |
| 3,865,738 A | 2/1975 | Lente |
| 4,080,061 A | 3/1978 | von Stein et al. |
| 4,096,523 A | 6/1978 | Belmares-Sarabia et al. |
| 4,097,892 A | 6/1978 | Balding |
| 4,101,912 A | 7/1978 | Watanabe et al. |
| 4,141,735 A | 2/1979 | Schrader et al. |
| 4,146,321 A | 3/1979 | Melillo |
| 4,174,888 A | 11/1979 | Hunn et al. |
| 4,183,645 A | 1/1980 | Ohmura et al. |
| 4,203,769 A | 5/1980 | Guestaux et al. |
| 4,223,990 A | 9/1980 | Edwards |
| 4,272,780 A | 6/1981 | Belmares-Sarabia et al. |
| 4,295,713 A | 10/1981 | Edwards |
| 4,320,965 A | 3/1982 | Kimura et al. |
| 4,332,449 A | 6/1982 | Zawodny et al. |
| 4,357,102 A | 11/1982 | Taren et al. |
| 4,368,096 A | 1/1983 | Kobayashi et al. |
| 4,371,950 A | 2/1983 | Chadra |
| 4,384,774 A | 5/1983 | Tuck |
| 4,384,779 A | 5/1983 | Shono et al. |
| 4,396,164 A | 8/1983 | Maeda et al. |
| 4,401,376 A | 8/1983 | Pomazi |
| 4,416,525 A | 11/1983 | Chan et al. |
| 4,416,539 A | 11/1983 | Terashita et al. |
| 4,417,403 A | 11/1983 | Strange |
| 4,418,141 A | 11/1983 | Kawaguchi et al. |
| 4,418,358 A | 11/1983 | Poetsch et al. |
| 4,431,292 A | 2/1984 | Takahashi et al. |
| 4,437,749 A | 3/1984 | Ehgartner et al. |
| 4,459,616 A | 7/1984 | Lemke |
| 4,482,924 A | 11/1984 | Brownstein |
| 4,485,406 A | 11/1984 | Brownstein |
| 4,490,027 A | 12/1984 | Frank et al. |
| 4,495,276 A | 1/1985 | Takimoto et al. |
| 4,496,983 A | 1/1985 | Takenaka et al. |
| 4,557,591 A | 12/1985 | Serizawa et al. |
| 4,563,083 A | 1/1986 | Shiota et al. |
| 4,583,831 A | 4/1986 | Harvey |
| 4,603,966 A | 8/1986 | Brownstein |
| 4,608,595 A | 8/1986 | Nakayama et al. |
| 4,633,387 A | 12/1986 | Hartung et al. |
| 4,639,111 A | 1/1987 | Harvey |
| 4,641,197 A | 2/1987 | Miyagi et al. |
| 4,642,700 A | 2/1987 | Ohta et al. |
| 4,645,334 A | 2/1987 | Shimada et al. |
| 4,650,304 A | 3/1987 | Harvey |
| 4,656,524 A | 4/1987 | Norris et al. |
| 4,660,101 A | 4/1987 | Martin |
| 4,682,870 A | 7/1987 | Atkinson |
| 4,688,099 A | 8/1987 | Funston |
| 4,689,696 A | 8/1987 | Plummer |
| 4,692,797 A | 9/1987 | Matsumoto et al. |
| 4,693,591 A | 9/1987 | Saijo et al. |
| 4,694,354 A | 9/1987 | Tanaka et al. |
| 4,699,492 A | 10/1987 | Iwashita et al. |
| 4,703,366 A | 10/1987 | Kobori et al. |
| 4,716,427 A | 12/1987 | Shyu et al. |
| 4,720,813 A | 1/1988 | Kaneko et al. |
| 4,727,399 A | 2/1988 | Matsumoto et al. |
| 4,727,418 A | 2/1988 | Kato et al. |
| 4,733,304 A | 3/1988 | Homma et al. |
| 4,737,825 A | 4/1988 | Davis |
| 4,738,523 A | 4/1988 | Ito et al. |
| 4,754,342 A | 6/1988 | Duffy |
| 4,763,186 A | 8/1988 | Belmares-Sarabia et al. |
| 4,769,694 A | 9/1988 | Oshikoshi et al. |
| 4,777,515 A | 10/1988 | Aikoh et al. |
| 4,780,735 A | 10/1988 | Taniguchi et al. |
| 4,803,505 A | 2/1989 | Saijo et al. |
| 4,805,039 A | 2/1989 | Otake et al. |
| 4,807,020 A | 2/1989 | Hirosawa et al. |
| 4,811,109 A | 3/1989 | Shimizu et al. |
| 4,812,871 A | 3/1989 | Taniguchi et al. |
| 4,827,347 A | 5/1989 | Bell |
| 4,829,386 A | 5/1989 | Takei et al. |
| 4,837,628 A | 6/1989 | Sasaki et al. |
| 4,848,693 A | 7/1989 | Robertson |
| 4,857,994 A | 8/1989 | Belmares-Sarabia et al. |
| 4,860,037 A | 8/1989 | Harvey |
| 4,860,039 A | 8/1989 | Hata et al. |
| 4,860,966 A | 8/1989 | Cloutier |
| 4,862,200 A | 8/1989 | Hicks |
| 4,862,201 A | 8/1989 | Taniguchi et al. |
| 4,862,251 A | 8/1989 | Belmares-Sarabia et al. |
| 4,866,511 A | 9/1989 | Belmares-Sarabia et al. |
| 4,883,235 A | 11/1989 | Niedospial, Jr. |
| 4,883,532 A | 11/1989 | Bodine |
| 4,896,208 A | 1/1990 | Moriya et al. |
| 4,903,073 A | 2/1990 | Saijo et al. |
| 4,908,641 A | 3/1990 | Fairman |
| 4,920,419 A | 4/1990 | Easterly |
| 4,922,289 A | 5/1990 | Kogane et al. |
| 4,931,829 A | 6/1990 | Hakamada et al. |
| 4,931,832 A | 6/1990 | Takenaka et al. |
| 4,931,863 A | 6/1990 | Tokuda et al. |
| 4,933,713 A | 6/1990 | Tsuji et al. |
| 4,933,773 A | 6/1990 | Shiota et al. |
| 4,933,780 A | 6/1990 | Wash et al. |
| 4,948,063 A | 8/1990 | Niedospial, Jr. |
| 4,962,401 A | 10/1990 | Takahashi et al. |
| 4,964,139 A | 10/1990 | Wash et al. |
| 4,965,627 A | 10/1990 | Robison |
| 4,966,285 A | 10/1990 | Otake et al. |
| 4,967,266 A | 10/1990 | Yamamoto et al. |
| 4,972,068 A | 11/1990 | Ohtani et al. |
| 4,974,096 A | 11/1990 | Wash |
| 4,975,732 A | 12/1990 | Robison et al. |
| 4,977,419 A | 12/1990 | Wash et al. |
| 4,987,439 A | 1/1991 | Cloutier |
| 4,996,546 A | 2/1991 | Pagano et al. |
| 5,004,176 A | 4/1991 | Niedospial |
| 5,005,031 A | 4/1991 | Kelbe |
| 5,006,873 A | 4/1991 | Wash |
| 5,006,878 A | 4/1991 | Cloutier |
| 5,012,334 A | 4/1991 | Etra |
| 5,017,326 A | 5/1991 | Wash et al. |
| 5,019,915 A | 5/1991 | Fujito et al. |
| 5,021,820 A | 6/1991 | Robison et al. |
| 5,023,635 A | 6/1991 | Nealon |
| 5,023,656 A | 6/1991 | Terashita et al. |
| 5,027,140 A | 6/1991 | Cloutier |
| 5,028,940 A | 7/1991 | Pearson |
| 5,029,313 A | 7/1991 | Robison et al. |
| 5,031,852 A | 7/1991 | Dowling et al. |
| 5,032,854 A | 7/1991 | Smart et al. |
| 5,040,009 A | 8/1991 | Mizuno et al. |
| 5,041,933 A | 8/1991 | DeMarti, Jr. et al. |
| 5,043,758 A | 8/1991 | Nealon |
| 5,046,682 A | 9/1991 | Niedospial |
| 5,047,864 A | 9/1991 | Fujito et al. |
| 5,049,908 A | 9/1991 | Murakami et al. |
| 5,049,912 A | 9/1991 | Pagano et al. |
| 5,066,971 A | 11/1991 | Kodaira et al. |
| 5,070,405 A | 12/1991 | Ejima et al. |
| 5,072,253 A | 12/1991 | Patton |
| 5,083,155 A | 1/1992 | Kataoka et al. |
| 5,086,215 A | 2/1992 | Carsner et al. |
| 5,086,310 A | 2/1992 | Iwashita et al. |
| 5,086,311 A | 2/1992 | Naka et al. |
| 5,093,686 A | 3/1992 | Shigaki et al. |
| 5,101,225 A | 3/1992 | Wash et al. |
| 5,106,030 A | 4/1992 | Pagano et al. |
| 5,109,482 A | 4/1992 | Bohrman |
| 5,115,268 A | 5/1992 | Kitagawa et al. |
| 5,119,118 A | 6/1992 | Harada et al. |
| 5,119,474 A | 6/1992 | Beitel et al. |
| 5,127,303 A | 7/1992 | Tsumura et al. |
| 5,130,525 A | 7/1992 | Ryon |
| 5,130,728 A | 7/1992 | Goto et al. |
| 5,130,745 A | 7/1992 | Cloutier et al. |
| 5,132,715 A | 7/1992 | Taillie |

| | | |
|---|---|---|
| 5,151,726 A | 9/1992 | Iwashita et al. |
| 5,151,730 A | 9/1992 | Kemp et al. |
| 5,157,482 A | 10/1992 | Cosgrove |
| 5,157,502 A | 10/1992 | Nakajima et al. |
| 5,157,518 A | 10/1992 | Ohtaki et al. |
| 5,160,952 A | 11/1992 | Iwashita et al. |
| 5,160,953 A | 11/1992 | Iwashita et al. |
| 5,164,831 A | 11/1992 | Kuchta et al. |
| 5,168,303 A | 12/1992 | Ikenoue et al. |
| 5,173,730 A | 12/1992 | Dieterich et al. |
| 5,179,266 A | 1/1993 | Imamura et al. |
| 5,187,511 A | 2/1993 | Amano et al. |
| 5,187,518 A | 2/1993 | Kitagawa et al. |
| 5,191,406 A | 3/1993 | Brandestini et al. |
| 5,194,892 A | 3/1993 | Robison |
| 5,196,946 A | 3/1993 | Balkanski et al. |
| 5,204,707 A | 4/1993 | Harvey |
| 5,204,708 A | 4/1993 | Whitfield et al. |
| 5,206,929 A | 4/1993 | Langford et al. |
| 5,211,348 A | 5/1993 | Enomoto et al. |
| 5,212,367 A | 5/1993 | Takenaka et al. |
| 5,220,371 A | 6/1993 | Tanii et al. |
| 5,223,892 A | 6/1993 | Ikenoue et al. |
| 5,227,823 A | 7/1993 | Shigaki et al. |
| 5,227,837 A | 7/1993 | Terashita et al. |
| 5,229,810 A | 7/1993 | Cloutier et al. |
| 5,231,439 A | 7/1993 | Takahashi et al. |
| 5,237,156 A | 8/1993 | Konishi et al. |
| 5,238,794 A | 8/1993 | Hirose et al. |
| 5,241,659 A | 8/1993 | Parulski et al. |
| 5,245,373 A | 9/1993 | Ogawa et al. |
| 5,247,325 A | 9/1993 | Takahashi et al. |
| 5,251,840 A | 10/1993 | Niedospial |
| 5,253,248 A | 10/1993 | Dravida et al. |
| 5,253,275 A | 10/1993 | Yurt et al. |
| 5,255,031 A | 10/1993 | Ikenoue et al. |
| 5,258,859 A | 11/1993 | Wada et al. |
| 5,264,683 A | 11/1993 | Yoshikawa et al. |
| 5,264,684 A | 11/1993 | Weil |
| 5,265,820 A | 11/1993 | Enomoto et al. |
| 5,270,755 A | 12/1993 | Ohno et al. |
| 5,270,831 A | 12/1993 | Parulski et al. |
| 5,274,418 A | 12/1993 | Kazami et al. |
| 5,274,422 A | 12/1993 | Yoshikawa et al. |
| 5,287,141 A | 2/1994 | Yoshikawa et al. |
| 5,294,473 A | 3/1994 | Kawamoto et al. |
| 5,296,886 A | 3/1994 | Zander et al. |
| 5,305,042 A | 4/1994 | Niedospial, Jr. et al. |
| 5,317,355 A | 5/1994 | Zander et al. |
| 5,319,406 A | 6/1994 | Takatori et al. |
| 5,325,138 A | 6/1994 | Nagata et al. |
| 5,325,423 A | 6/1994 | Lewis |
| 5,326,689 A | 7/1994 | Murayama et al. |
| 5,333,113 A | 7/1994 | Cloutier et al. |
| 5,336,589 A | 8/1994 | Mukunoki et al. |
| 5,344,730 A | 9/1994 | Kitamoto et al. |
| 5,347,334 A | 9/1994 | Smart et al. |
| 5,347,403 A | 9/1994 | Uekusa et al. |
| 5,352,879 A | 10/1994 | Milch |
| 5,357,302 A | 10/1994 | Kawamura et al. |
| 5,368,997 A | 11/1994 | Kawamoto et al. |
| 5,373,339 A | 12/1994 | Greene et al. |
| 5,382,508 A | 1/1995 | Ikenoue et al. |
| 5,383,027 A | 1/1995 | Harvey et al. |
| 5,383,035 A | 1/1995 | Suzuki et al. |
| 5,389,988 A | 2/1995 | Daitoku et al. |
| 5,396,305 A | 3/1995 | Egawa et al. |
| 5,400,152 A | 3/1995 | Manico et al. |
| 5,404,196 A | 4/1995 | Terashita et al. |
| 5,410,415 A | 4/1995 | Parulski et al. |
| 5,412,773 A | 5/1995 | Carlucci et al. |
| 5,420,699 A | 5/1995 | Yamanouchi et al. |
| 5,430,515 A | 7/1995 | Lawther et al. |
| 5,432,586 A | 7/1995 | Tokuda et al. |
| 5,435,500 A | 7/1995 | Shibata et al. |
| 5,440,401 A | 8/1995 | Parulski et al. |
| 5,450,153 A | 9/1995 | Matsumoto et al. |
| 5,452,038 A | 9/1995 | Csaszar et al. |
| 5,453,815 A | 9/1995 | Yoshikawa et al. |
| 5,455,648 A | 10/1995 | Kazami et al. |
| 5,461,440 A | 10/1995 | Toyoda et al. |
| 5,461,492 A | 10/1995 | Jones |
| 5,469,209 A | 11/1995 | Gunday et al. |
| 5,471,265 A | 11/1995 | Shibata et al. |
| 5,473,370 A | 12/1995 | Moronaga et al. |
| 5,475,454 A | 12/1995 | Ezawa et al. |
| 5,477,299 A | 12/1995 | Takahashi et al. |
| 5,477,353 A | 12/1995 | Yamasaki et al. |
| 5,479,466 A | 12/1995 | Kim et al. |
| 5,483,310 A | 1/1996 | Tanii et al. |
| 5,488,529 A | 1/1996 | Kato et al. |
| 5,493,355 A | 2/1996 | Kazami et al. |
| 5,496,687 A | 3/1996 | Kawamoto et al. |
| 5,508,767 A | 4/1996 | Kazumi et al. |
| 5,512,396 A | 4/1996 | Hicks |
| 5,522,563 A | 6/1996 | Earnhart et al. |
| 5,526,084 A | 6/1996 | Kataoka et al. |
| 5,526,255 A | 6/1996 | Shenk |
| 5,534,956 A | 7/1996 | Iwashita et al. |
| 5,544,835 A | 8/1996 | Takahashi et al. |
| 5,561,458 A | 10/1996 | Cronin et al. |
| 5,564,001 A | 10/1996 | Lewis |
| 5,564,643 A | 10/1996 | Kaya et al. |
| 5,566,897 A | 10/1996 | Yago et al. |
| 5,570,147 A | 10/1996 | Saito et al. |
| 5,570,152 A | 10/1996 | Kaya et al. |
| 5,576,785 A | 11/1996 | Kazami et al. |
| 5,580,707 A | 12/1996 | Kawamoto et al. |
| 5,583,610 A | 12/1996 | Yoshikawa et al. |
| 5,585,229 A | 12/1996 | Kawamoto et al. |
| 5,587,278 A | 12/1996 | Kawamoto et al. |
| 5,587,546 A | 12/1996 | Kato et al. |
| 5,589,947 A | 12/1996 | Sato et al. |
| 5,593,818 A | 1/1997 | Kawamoto et al. |
| 5,597,131 A | 1/1997 | Kaya et al. |
| 5,602,611 A | 2/1997 | Takatori et al. |
| 5,606,420 A | 2/1997 | Maeda et al. |
| 5,611,066 A | 3/1997 | Keele et al. |
| 5,619,425 A | 4/1997 | Funahashi et al. |
| 5,620,839 A | 4/1997 | Kawamoto et al. |
| 5,625,855 A | 4/1997 | Takatori et al. |
| 5,629,141 A | 5/1997 | Kawamoto et al. |
| 5,652,643 A | 7/1997 | Saito et al. |
| 5,666,215 A | 9/1997 | Fredlund et al. |
| 5,666,578 A | 9/1997 | Oikawa et al. |
| 5,684,952 A | 11/1997 | Stein |
| 5,703,308 A | 12/1997 | Tashiro et al. |
| 5,703,701 A | 12/1997 | Yamamoto et al. |
| 5,703,997 A | 12/1997 | Kitamura et al. |
| 5,706,050 A | 1/1998 | Nishimura et al. |
| 5,710,954 A | 1/1998 | Inoue et al. |
| 5,721,991 A | 2/1998 | Saito et al. |
| 5,732,216 A | 3/1998 | Logan et al. |
| 5,737,062 A | 4/1998 | Yoshikawa |
| 5,742,855 A | 4/1998 | Saito et al. |
| 5,767,904 A | 6/1998 | Miyake et al. |
| 5,784,149 A | 7/1998 | Kawaoka et al. |
| 5,790,172 A * | 8/1998 | Imanaka ........................ 725/8 |
| 5,794,210 A | 8/1998 | Goldhaber et al. |
| 5,835,802 A | 11/1998 | Komori et al. |
| 5,845,281 A | 12/1998 | Benson et al. |
| 5,861,911 A | 1/1999 | Oosaka et al. |
| 5,877,842 A | 3/1999 | Gibbens et al. |
| 5,883,698 A | 3/1999 | Kimura et al. |
| 5,892,900 A | 4/1999 | Ginter et al. |
| 5,918,082 A | 6/1999 | Katsura et al. |
| 5,929,850 A | 7/1999 | Broadwin et al. |
| 5,943,422 A | 8/1999 | Van Wie et al. |
| 5,949,757 A * | 9/1999 | Katoh et al. ................ 370/232 |
| 5,950,024 A | 9/1999 | Saito et al. |
| 5,959,945 A | 9/1999 | Kleiman |
| 5,974,401 A | 10/1999 | Enomoto et al. |
| 5,978,067 A | 11/1999 | Saito et al. |
| 5,986,773 A | 11/1999 | Goto et al. |
| 6,014,691 A | 1/2000 | Brewer et al. |
| 6,017,157 A | 1/2000 | Garfinkle et al. |
| 6,035,143 A | 3/2000 | Saito et al. |
| 6,038,011 A | 3/2000 | Ikenoue et al. |

| | | | | | | |
|---|---|---|---|---|---|---|
| 6,041,191 | A | 3/2000 | Saito et al. | JP | 56-132321 | 10/1981 |
| 6,055,314 | A | 4/2000 | Spies et al. | JP | 57-040232 | 3/1982 |
| 6,058,272 | A | 5/2000 | Saito et al. | JP | 57-044149 | 3/1982 |
| 6,078,005 | A | 6/2000 | Kurakake et al. | JP | 57048729 | 3/1982 |
| 6,118,116 | A | 9/2000 | Sawada et al. | JP | 58145931 | 8/1983 |
| 6,133,985 | A | 10/2000 | Garfinkle et al. | JP | 58-173723 | 10/1983 |
| 6,154,295 | A | 11/2000 | Fredlund et al. | JP | 59-045667 | 3/1984 |
| 6,154,616 | A | 11/2000 | Saito et al. | JP | 60-139476 | 7/1985 |
| 6,167,469 | A | 12/2000 | Safai et al. | JP | 60-145428 | 7/1985 |
| 6,199,076 | B1 * | 3/2001 | Logan et al. .................. 715/203 | JP | 60-166939 | 8/1985 |
| 6,212,555 | B1 * | 4/2001 | Brooks et al. ................. 709/219 | JP | 61-165746 | 7/1986 |
| 6,226,462 | B1 | 5/2001 | Saito et al. | JP | 61165746 | 7/1986 |
| 6,226,618 | B1 | 5/2001 | Downs et al. | JP | 62-028720 | 2/1987 |
| 6,231,347 | B1 | 5/2001 | Tsai | JP | 62-108810 | 5/1987 |
| 6,232,968 | B1 | 5/2001 | Alimpich et al. | JP | 62-141176 | 6/1987 |
| 6,253,246 | B1 | 6/2001 | Nakatsuyama et al. | JP | 63-088542 | 4/1988 |
| 6,288,719 | B1 | 9/2001 | Squilla et al. | JP | 63-142338 | 6/1988 |
| 6,307,550 | B1 * | 10/2001 | Chen et al. .................... 345/418 | JP | 63-188647 | 8/1988 |
| 6,314,575 | B1 | 11/2001 | Billock et al. | JP | 64-43339 U | 3/1989 |
| 6,323,968 | B1 | 11/2001 | Goto et al. | JP | 1-169235 U | 7/1989 |
| 6,324,521 | B1 | 11/2001 | Shiota et al. | JP | 1-174483 | 7/1989 |
| 6,327,049 | B1 | 12/2001 | Ohtsuka et al. | JP | 1-198733 | 8/1989 |
| 6,328,570 | B1 | 12/2001 | Ng et al. | JP | 1-245234 | 9/1989 |
| 6,341,133 | B1 | 1/2002 | Kawamoto et al. | JP | 1-252949 | 10/1989 |
| 6,397,189 | B1 | 5/2002 | Martin et al. | JP | 1-260426 | 10/1989 |
| 6,408,301 | B1 * | 6/2002 | Patton et al. .................... 707/102 | JP | 1282530 | 11/1989 |
| 6,434,339 | B1 | 8/2002 | Saito et al. | JP | 1282531 | 11/1989 |
| 6,434,579 | B1 | 8/2002 | Shaffer et al. | JP | 1282532 | 11/1989 |
| 6,463,539 | B1 | 10/2002 | Mochizuki | JP | 1282533 | 11/1989 |
| 6,571,067 | B2 | 5/2003 | Saito et al. | JP | 1282536 | 11/1989 |
| 6,571,271 | B1 | 5/2003 | Savitzky et al. | JP | 1-17143 U | 12/1989 |
| 6,574,440 | B2 | 6/2003 | Saito et al. | JP | 2-8465 | 2/1990 |
| 6,583,851 | B2 | 6/2003 | Saito et al. | JP | 2-053039 | 2/1990 |
| 6,600,880 | B2 | 7/2003 | Saito et al. | JP | 20-48871 | 2/1990 |
| 6,618,547 | B1 | 9/2003 | Peters et al. | JP | 2-064621 | 3/1990 |
| 6,623,528 | B1 | 9/2003 | Squilla et al. | JP | 2-064622 | 3/1990 |
| 6,657,702 | B1 | 12/2003 | Chui et al. | JP | 2-067537 | 3/1990 |
| 6,668,158 | B1 | 12/2003 | Tsutsui et al. | JP | 2-109342 | 4/1990 |
| 6,701,355 | B1 * | 3/2004 | Brandt et al. .................. 709/219 | JP | 2-136840 | 5/1990 |
| 6,741,795 | B1 | 5/2004 | Takehiko et al. | JP | 2-149834 | 6/1990 |
| 6,762,860 | B1 | 7/2004 | Watanabe et al. | JP | 2-211443 | 8/1990 |
| 6,778,760 | B1 | 8/2004 | Kagle | JP | 2-244288 | 9/1990 |
| 6,784,925 | B1 | 8/2004 | Tomat et al. | JP | 2-278249 | 11/1990 |
| 6,788,425 | B1 | 9/2004 | Ohtsuka et al. | JP | 2-287524 | 11/1990 |
| 6,819,441 | B2 | 11/2004 | Umebayashi et al. | JP | 2-306229 | 12/1990 |
| 6,834,110 | B1 * | 12/2004 | Marconcini et al. .......... 380/239 | JP | 3-006547 | 1/1991 |
| 6,925,489 | B1 | 8/2005 | Curtin | JP | 3-007926 | 1/1991 |
| 6,934,963 | B1 | 8/2005 | Reynolds et al. | JP | 3-14639 | 2/1991 |
| 7,016,059 | B1 | 3/2006 | Baum et al. | JP | 3-050537 | 3/1991 |
| 7,039,589 | B2 | 5/2006 | Whitham | JP | 3-077930 | 4/1991 |
| 7,082,412 | B1 * | 7/2006 | Treider et al. .................... 705/38 | JP | 3-092838 | 4/1991 |
| 7,287,267 | B2 | 10/2007 | Knudson et al. | JP | 3-095536 | 4/1991 |
| 7,477,283 | B2 | 1/2009 | Rambo et al. | JP | 3-098429 | 4/1991 |
| 7,808,540 | B2 | 10/2010 | Cok | JP | 3-100635 | 4/1991 |
| 2001/0016836 | A1 * | 8/2001 | Boccon-Gibod et al. ........ 705/51 | JP | 3-105336 | 5/1991 |
| 2001/0023429 | A1 * | 9/2001 | Barker et al. .................. 709/203 | JP | 3-130751 | 6/1991 |
| 2002/0012443 | A1 * | 1/2002 | Rhoads et al. ................. 382/100 | JP | 3-130754 | 6/1991 |
| 2002/0035599 | A1 | 3/2002 | Matsumoto et al. | JP | 3-132734 | 6/1991 |
| 2002/0067500 | A1 | 6/2002 | Yokomizo et al. | JP | 3-146934 | 6/1991 |
| 2003/0011627 | A1 | 1/2003 | Yager et al. | JP | 3-158837 | 7/1991 |
| 2003/0066085 | A1 | 4/2003 | Boyer et al. | JP | 3-162093 | 7/1991 |
| 2004/0021907 | A1 | 2/2004 | Truc et al. | JP | 3-171038 | 7/1991 |
| 2008/0276275 | A1 | 11/2008 | Ellis | JP | 3-214157 | 9/1991 |
| | | | | JP | 3-69137 | 10/1991 |
| | | FOREIGN PATENT DOCUMENTS | | JP | 3-228050 | 10/1991 |
| EP | | 0 357 355 | 3/1990 | JP | 3-246539 | 11/1991 |
| EP | | 0 428 072 | 5/1991 | JP | 4-005641 | 1/1992 |
| EP | | 0 497 252 | 1/1992 | JP | 04-006532 | 1/1992 |
| EP | | 0 476 907 | 3/1992 | JP | 4-009023 | 1/1992 |
| EP | | 0 561 592 | 9/1993 | JP | 4-009024 | 1/1992 |
| EP | | 0 786 774 | 1/1997 | JP | 4-025828 | 1/1992 |
| EP | | 0 896 333 A2 | 2/1999 | JP | 4-073746 | 3/1992 |
| GB | | 2 084 746 | 4/1982 | JP | 4-084133 | 3/1992 |
| GB | | 2 086 065 | 5/1982 | JP | 42-17164 | 8/1992 |
| JP | | 54-026723 | 2/1979 | JP | 43-62849 | 12/1992 |
| JP | | 54-029928 | 3/1979 | JP | 5-019368 | 1/1993 |
| JP | | 55-103647 | 8/1980 | JP | 5-019370 | 1/1993 |
| JP | | 55134827 | 10/1980 | JP | 50-45714 | 2/1993 |
| JP | | 56-006031 | 1/1981 | JP | 5-503171 U | 5/1993 |

| | | |
|---|---|---|
| JP | 5-150335 | 6/1993 |
| JP | 5-342374 | 12/1993 |
| JP | 61-23923 | 5/1994 |
| JP | 62-62342 | 9/1994 |
| JP | 62-68822 | 9/1994 |
| JP | 72-03184 | 8/1995 |
| JP | 09160899 A | 6/1997 |
| JP | 11066824 A | 3/1999 |
| JP | 11259971 A | 9/1999 |
| JP | 11288556 A | 10/1999 |
| KR | 99-070912 | 9/1999 |
| WO | WO-91/12557 | 8/1991 |
| WO | WO-92/12593 | 7/1992 |
| WO | 9952111 A1 | 10/1999 |

OTHER PUBLICATIONS

Anon., "Technology: Videodisks Make a Comeback as Instructors and Sales Tools," Wall Street Journal, Eastern Edition, Feb. 15, 1985, p. 25.

Song, C., "MIME: Multimedia on the Internet," UNIX Review, vol. 13, No. 4, pp. 43-52, Apr. 1995.

Office Action from Japanese Application No. 2000-398944, dated Aug. 12, 2010.

* cited by examiner

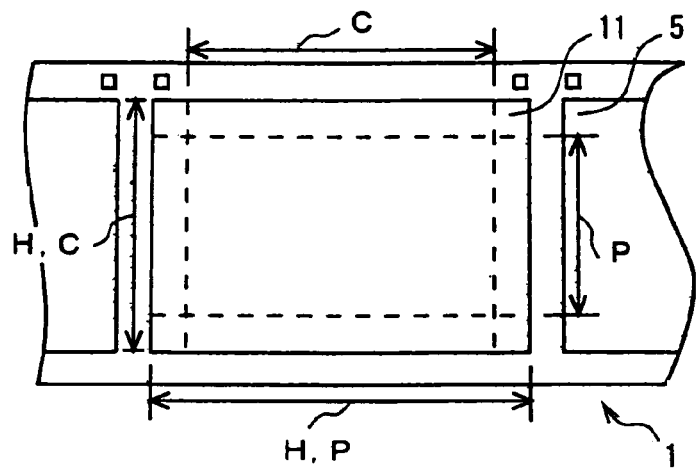
FIG.5
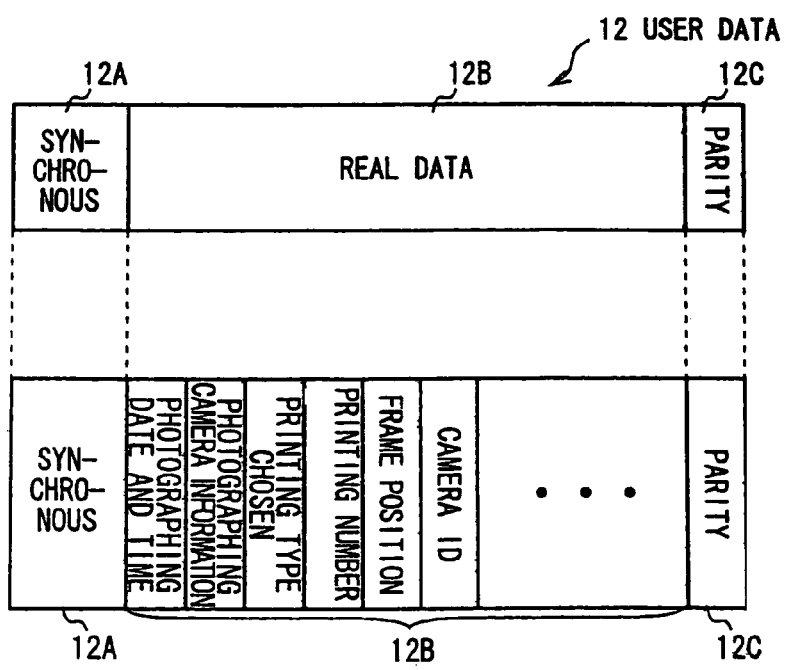
FIG.6A
FIG.6B

100 PHOTOGRAPHIC IMAGE PRINTING MACHINE

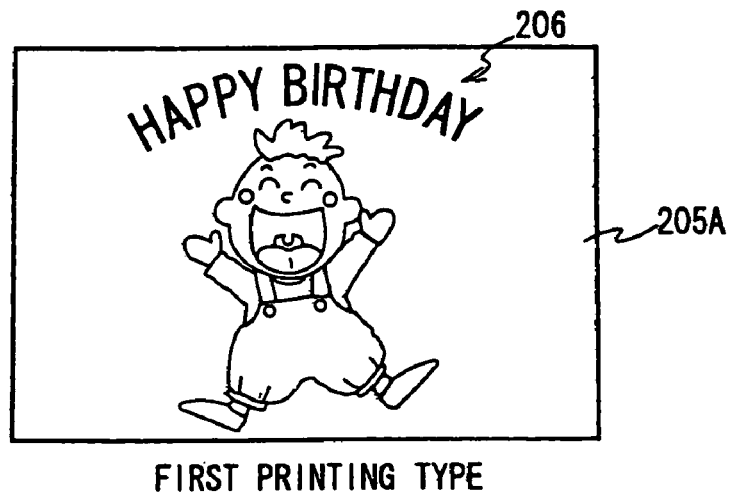
FIG.22A  FIRST PRINTING TYPE
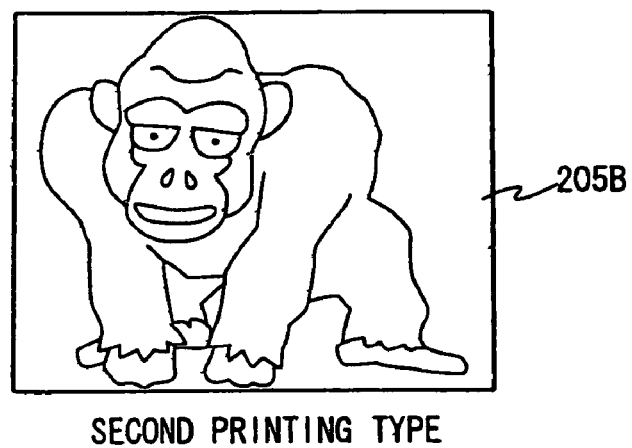
FIG.22B  SECOND PRINTING TYPE
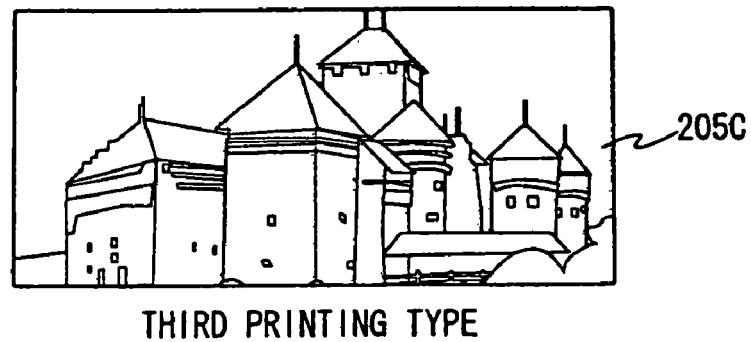
FIG.22C  THIRD PRINTING TYPE

IMAGE COMMERCIAL TRANSACTIONS SYSTEM AND METHOD

CROSS-REFERENCE TO RELATED APPLICATIONS

The present application is a continuation of Application No. 09/749,097, filed Dec. 27, 2000, which claims priority from Japanese Application No. 11-375545, filed Dec. 28, 1999, the disclosures of which are hereby incorporated by reference herein.

BACKGROUND OF THE INVENTION

The present invention relates to-an image commercial transactions system and method, and more particularly, to a photographic image commercial transactions system for selling a photographic image exposed on a photographic film by photographing a subject, using a still camera, for example.

Conventionally, a photographic image exposed on a photographic film is typically printed on a photographic paper and handled as a print photograph.

By the way, to sell the print photograph shop to others, it was necessary to ask a photograph shop such as a Development Print Enlargement (DPE) shop to reprint the print photograph, and a mailing company to mail the print photograph shop to a purchaser, whereby there was a problem of requiring complicated procedure.

In order to solve such problem, there is provided a method of reading a print photograph shop that is decided to be bought into a personal computer using an image scanner to generate the image data, and distribute this image data over a network to the purchaser.

However, with this method, because it is unknown under which conditions the purchaser who has received the image data produces the print photograph, it can not be said that the seller sold the intended print photograph shop in a suitable manner, and accordingly this method is still insufficient to solve the problem.

SUMMARY OF THE INVENTION

In view of the foregoing, an object of the invention is to provide an image commercial transactions system and method that are able to implement the sales to the purpose of the seller.

The foregoing object and other objects of the invention have been achieved by the provision of an image commercial transactions system and method in which the reception dealer accepts the sale of an image recorded on a recording medium in a predetermined format with a handling condition specific to the image, and sells the image with the handling condition in digital data format, and if a trade is established, the charge accounting agent makes an electronic charging process for the purchase of the data of the image with the handling condition.

Accordingly, if the image to be sold, together with the handling condition, is sold in the format of digital data, the purchased image can be utilized to the purpose of the seller and in accordance with the handling condition.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 5 is a schematic front view for describing three kinds of printing types for a photographic image;

FIGS. 6A and 6B are schematic views showing a configuration of user data;

FIGS. 22A to 22C are schematic views showing a configuration of a print photograph;

DETAILED DESCRIPTION

Preferred embodiments of this invention will be described with reference to the accompanying drawings:

(1) Photographic Image

At present, the photographic films that are used most widely are those referred to as a 135 film with a width of 35 mm, as defined by the standards in accordance with Japan Industrial Standard (JIS) and International Standardization for Organization (ISO).

Lately, the photographic films with a width of 24 mm, or so-called Advanced Photo System (APS) (Trademark) films have been put into the market.

Because this APS film has a narrower width than the 135 film, the still camera specifically designed for the APS film (i.e., APS camera) can be significantly reduced in size as compared with the still camera for the 135 film, whereby the APS films have spread rapidly along with the APS cameras.

Figure 1:
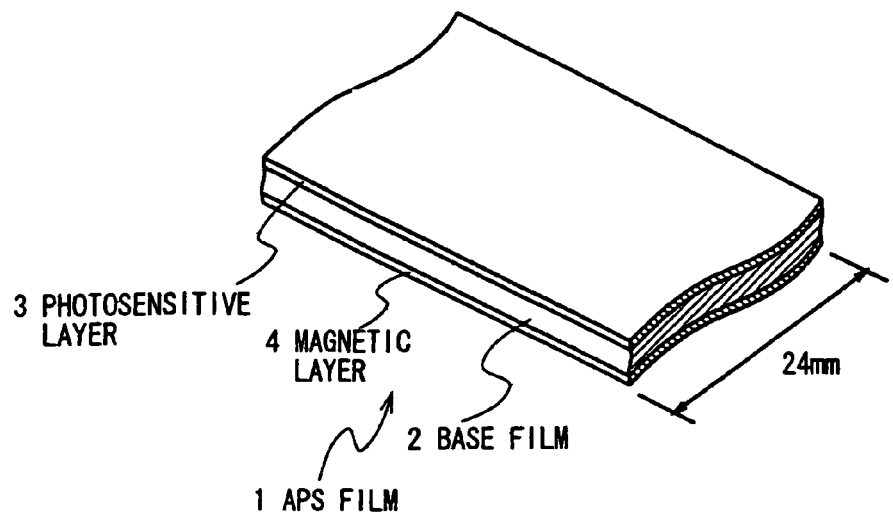
FIG. 1 is a schematic perspective view showing a configuration of an APS film.

As shown in FIG. 1, in an APS film 1, an optically transmissive photosensitive layer 3 is laminated on one face of a base film 2 like a strip with a width of 24 mm, and an optically transmissive magnetic layer 4 is laminated on the other face of the base film 2.

Figure 2:
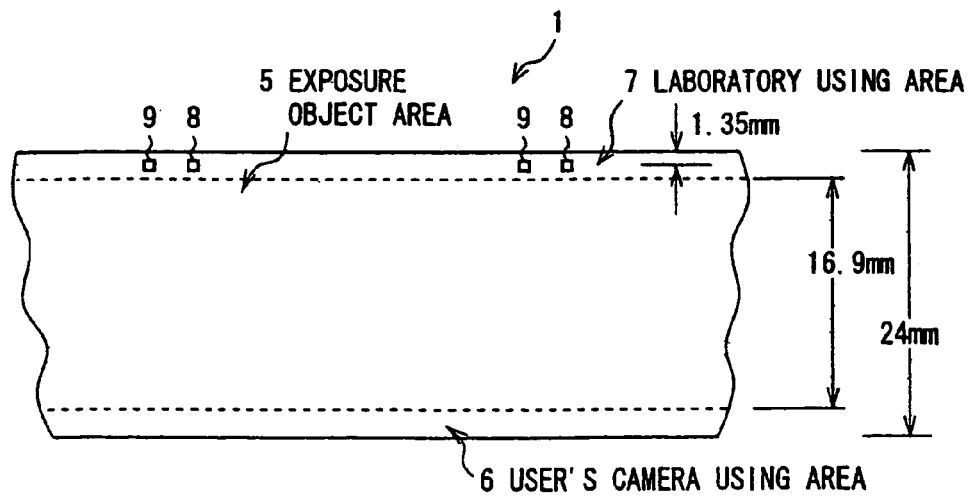
FIG. 2 is a schematic front view for describing a user's camera using area as well as a laboratory using area of an APS film.

As shown in FIG. 2, in the APS film 1, a strip-like exposure object area 5 is provided along a longitudinal direction of the APS film 1 (hereinafter referred as a film lengthwise direction) substantially in the central part of the photosensitive layer 3, and a user's camera using area 6 and a laboratory using area 7 that are strip-like unexposure areas are provided on both marginal portions in a cross direction of the APS film 1 (hereinafter referred to as a film width direction).

Further, in the laboratory using area 7, an adjacent pair of film position predicting perforation 8 and film positioning square perforation 9 are perforated in succession at a predetermined pitch along the film lengthwise direction.

In this connection, in the APS film 1, the width of the exposure object area 5 is chosen at about 16.9 mm, taking into consideration the width of a guard area (not shown) provided between the exposure object area 5 and the user's camera using area 6 or the laboratory using area 7, and the width of each of the user's camera using area 6 and the laboratory using area 7 is chosen at about 2.5 mm. Also, a pair of film position predicting perforation 8 and film positioning square perforation 9 have sides of about 2 mm and are perforated about 1.35 mm inside from the margin in the film width direction.

Figure 3:
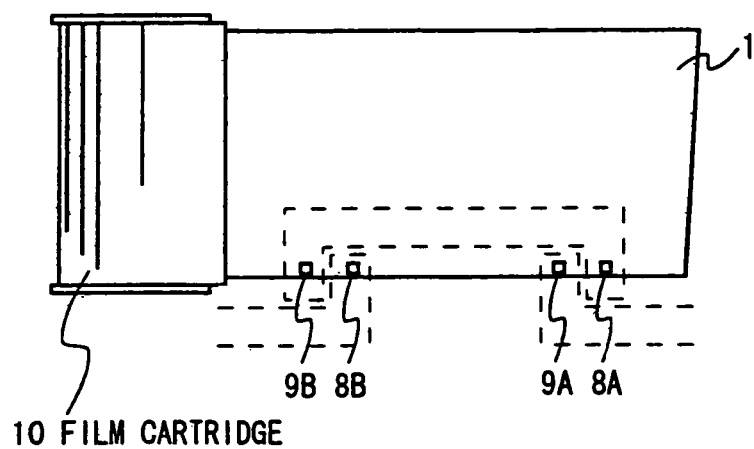
FIG. 3 is a schematic front view for describing an APS film drawn out of a film cartridge.

And the APS film 1 is contained within a film cartridge 10 shaped like a substantially elliptical barrel, as shown in FIG. 3, and an APS camera (not shown) is loaded in this state. If the APS film 1 is drawn out of the film cartridge 10 within the APS camera, the APS film 1 is positioned by the use of a film position predicting perforation 8A among a pair of film position predicting perforation 8A and film positioning square perforation 9A, and a film positioning square perforation 9B among a pair of film position predicting perforation 8B and film positioning square perforation 9B that is drawn subsequently.

Figure 4:
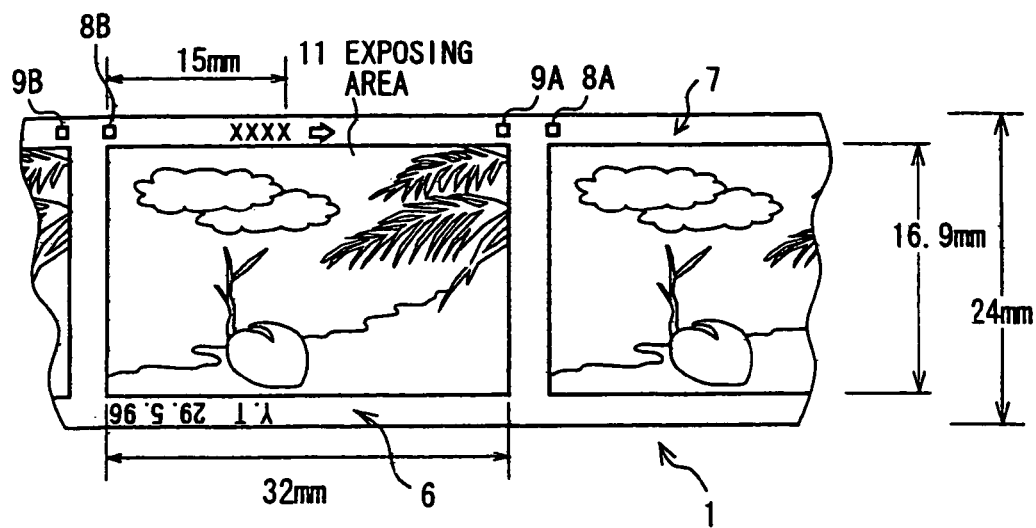
FIG. 4 is a schematic front view for describing an APS film in which a photographic image is exposed and formed.

Thereby, in the APS film 1, an exposing area 11 of a predetermined frame size and having an aspect ratio of 9 to 16, like an aspect ratio of High Definition Television (HDTV), is provided in succession at a predetermined pitch along the film lengthwise direction in the exposure object area 5, and a photographic image is exposed over an entire surface of the exposing area 11, as shown in FIG. 4. The characters shown in Figure (Y.T 29.5.96) are actually a magnetically recorded digital signal, and particularly the Y.T is changed to an ID of such as the owner of the camera.

In this connection, in the APS film 1, in the case where the photographic image exposed over the entire surface of the exposing area 11 is printed on the printing paper, there are three options of printing type including a first printing type H of printing on the printing paper in a predetermined frame size having an aspect ratio of 9 to 16, a second printing type C (Classic type) of printing on the printing paper in a frame size having an aspect ratio of 2 to 3 that is narrower in the film lengthwise direction than the aspect ratio of 9 to 16, and a third printing type P (Panorama type) of printing on the printing paper in a frame size having an aspect ratio of 1 to 3 that is narrower in the film width direction than the aspect ratio of 9 to 16, as shown in FIG. 5.

By the way, in the APS film 1, some kinds of data can be recorded in the user's camera using area 6 and the laboratory using area 7, and the data recorded in the user's camera using area 6 and the laboratory using area 7 can be utilized in the process of printing the photographic image on the printing paper.

In practice, in the user's camera using area 6 (FIG. 4) on the other side (i.e., magnetic layer 4) of the APS film 1, the photographing condition data (hereinafter referred to as user data) is magnetically recorded in correspondence to each exposing area 11, at the time of taking a picture using the APS camera (hereinafter referred to as a photographing time).

This user data is used to have the photographing condition reflected for each exposing area in printing the photographic image. Hence, the user data can be said as the printing condition of photographic image or further the handling condition of photographic image, and is fundamentally preserved forever.

Herein, the user's camera using area 6 is configured to contain as optical data in order the synchronous data 12A, the real data 12B, and the parity data 12C which is for error detection of the real data 12B, as shown in FIG. 6A.

The real data 12B of magnetic data contained in the user's camera using area is configured to contain a photographing date and time, photographing camera information, a printing type chosen by the user among the first to third printing types H, C, P, the number of printings specified by the user, frame position information, camera Identification (ID) assigned to the APS camera for use in photographing, information on whether a film cartridge is replaced or not, subject brightness information, information on whether an artificial light source is used or not, information on subject image magnification in the camera-to-subject distance, a title and message, printed on one face or the other face of photograph, and the photographer's name, as shown in FIG. 6B.

And the user data 12 is recorded as a sequence of bits represented by the position of "1" or "0" bit in one byte, or a combination of "1" and "0" bits in one-byte.

In this connection, the photographing camera information consists of the aperture value, shutter speed, International Standardization for Organization (ISO) speed, exposure compensation value, stroboscopic photography, and photographing lens focal length. The frame positional information has the information indicating the direction of the exposing area 11 within the APS camera, and the information as to whether or not the photographic image on the exposing area 11 has been printed on the printing paper.

In addition, in the user's camera using area 6 on one face (i.e., photosensitive layer 3) of the APS film 1, the frame number assigned sequentially to the exposing area 11 along the film lengthwise direction is optically recorded in correspondence to the exposing area 11 as the frame number data. Incidentally, the frame number data is represented by the number and the bar code expressing the number.

Also, in the laboratory using area 6 (FIG. 4) on the other side (i.e., magnetic layer 4) of the APS film 1, the data such as the printing condition (hereinafter referred to as laboratory data) that has been set on the basis of the user data is magnetically recorded, at the time of printing the photographic image on the printing paper (hereinafter simply referred to as the printing time) using a photographic image printing machine described later at a photograph shop, and the laboratory data can be rewritten as required.

Further, in the laboratory using area 7 on one face (i.e., photosensitive layer 3) of the APS film 1, at the top part of the APS film 1, the predetermined information such as the film type or the maximum allowable number of photographic images regarding the standards of the APS film 1, the name of the manufacturer which has manufactured the APS film 1, and the film ID assigned to the APS film 1 are optically recorded as the initial data.

In this connection, in the user's camera using area 6 and the laboratory using area 7, the frame number data and the initial data are recorded as a latent image that is optically detectable or viewable by the human eyes after developing the APS film 1.

Accordingly, the frame number data and the initial data optically recorded have no effect on the recording or reproduction of the user data and the laboratory data magnetically recorded, and the user data and the laboratory data magnetically recorded has no effect on the frame number data and the initial data optically recorded.

Therefore, in the user's camera using area 6 and the laboratory using area 7, the user data and the frame number data on one side can be recorded in opposition to the initial data and the laboratory data on the other side, whereby a large quantity of data can be recorded by making effective use of one side and the other side of the film.

Figure 7:
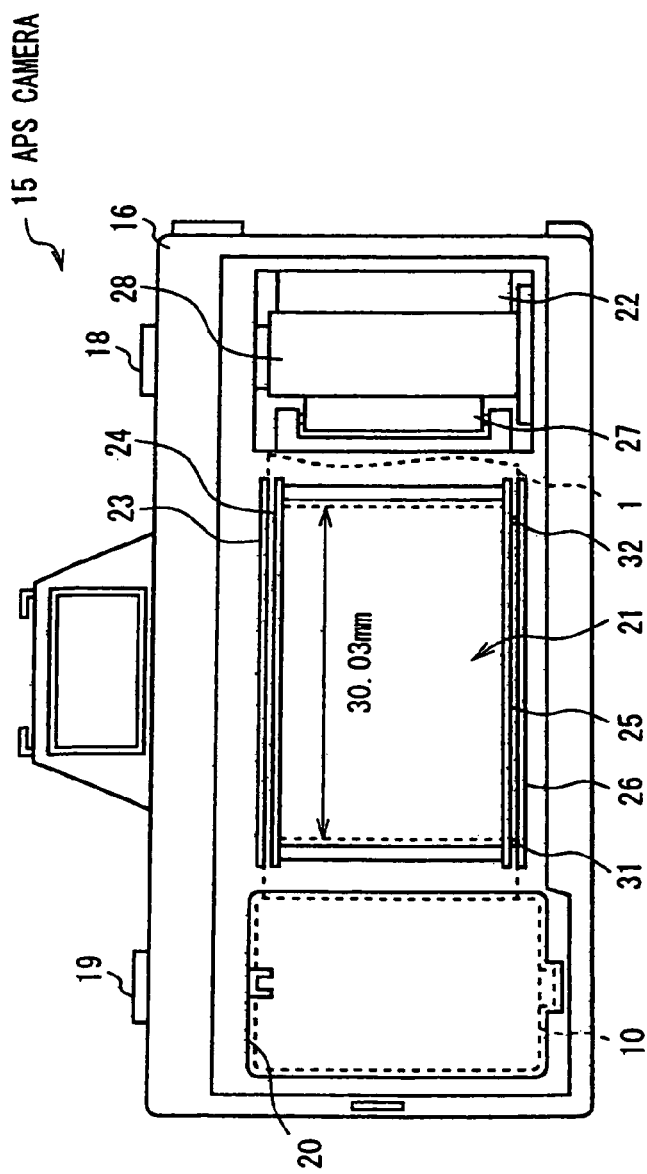
FIG. 7 is a schematic rear view showing a configuration of a dark box portion of an APS camera.
Figure 8:
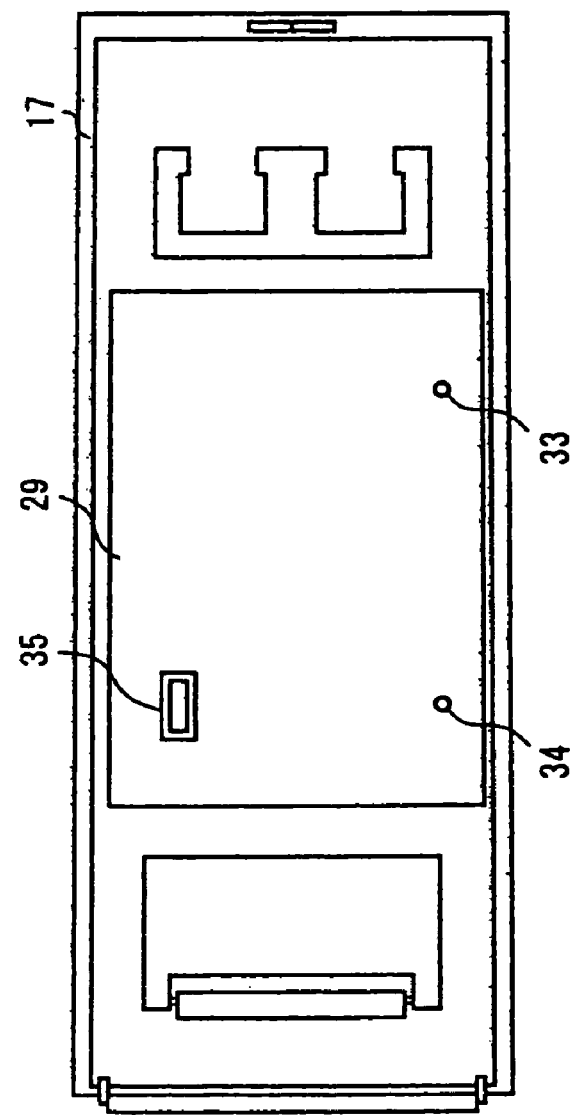
FIG. 8 is a schematic front view showing a rear cover of an APS camera.

Herein, an APS camera 15 loaded with an APS film 1 comprises a dark box 16 and a rear cover 17 for hermetically closing the dark box 16, as shown in FIGS. 7 and 8.

In the dark box 16 (FIG. 7), a shutter release button 18 and a frame size setting switch 19 for setting the printing type are arranged outside. Inside the dark box 16, a cartridge receiving chamber 20 of well-known structure to receive a film cartridge 10, an exposure opening portion 21 to expose the photographic image on the APS film 1, and a film housing 22 for receiving the APS film 1 that has been exposed are arranged side by side.

On the upper side of the exposure opening portion 21, a pair of upper film guides 23 and 24 are provided substantially in parallel, and on the lower side of the exposure opening portion 21, a pair of lower film guides 25 and 26 are also provided substantially in parallel.

Further, inside the film housing 22, a guide roller 27 for automatically rolling the APS film 1 is provided, and a film winding spool 28 for winding the APS film 1 is provided freely rotatably.

And on the inner surface of the rear cover 17 (FIG. 8), a film pressure plate 29 is provided in opposition to the exposure opening portion 21 of the dark box 16.

Thus, in the APS camera 15, if a film cartridge 10 is loaded into the cartridge receiving chamber 19, an APS film 1 is automatically drawn out of the film cartridge 10, passed between the exposure opening portion 21 and the film pressure plate 29, and automatically rolled by the guide roller 27, thereby winding the APS film 1 around the film winding spool 28.

By the way, between a pair of lower film guides 25 and 26, a film detecting light source 31 composed of a Light Emitting Diode (LED) having a diameter of about 1.5 mm, for example, is provided at one end along the longitudinal direction (hereinafter referred to as a guide longitudinal direction) of the lower film guides 25 and 26, and similarly a film predicting light source 32 also composed of an LED is provided at the other end thereof along the guide longitudinal direction.

On the contrary, on the film pressure plate 29 of the rear cover 17, photo-detectors 33 and 34 are provided in opposition to the film position detecting light source 31 and the film predicting light source 32, respectively. A magnetic head 35 is provided in opposition to a predetermined location between a pair of upper film guides 23 and 24.

Figure 9:
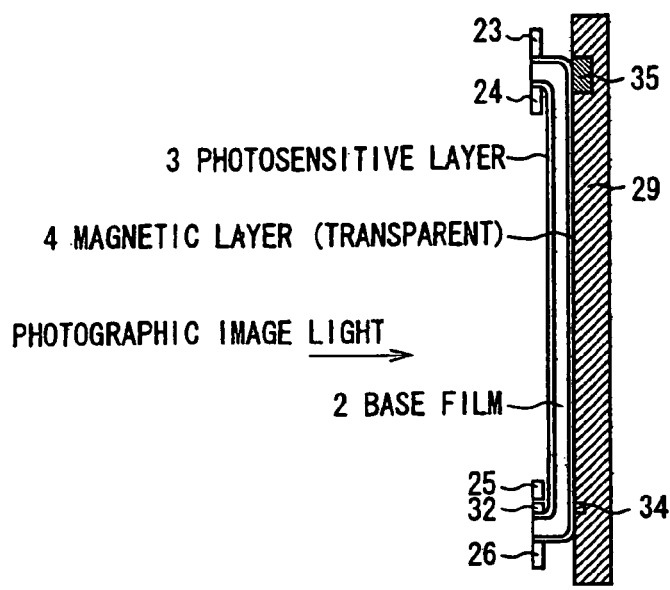
FIG. 9 is a schematic sectional view for describing an APS film drawn out of a film cartridge inside an APS camera.

And in the APS camera 15, a marginal part of the user's camera using area 6 in the APS film 1 that has been drawn out of the film cartridge 10 is passed between a pair of upper film guides 23 and 24, and a marginal part of the laboratory using area 7 is passed between a pair of lower film guides 25 and 26, as shown in FIG. 9. At the same time, the APS film 1 is pressed against the exposure opening portion 21 from the opposite side by the film pressure plate 29 of the rear cover 17, to stretch out the exposure object area 5 while preventing vertical movement of the APS film 1.

In the APS camera 15, the other side of the user's camera using area 6 (FIG. 4) in the APS film 1 is opposed to the magnetic head 32, and the laboratory using area 7 (FIG. 4) is passed successively between the film position detecting light source 31 and a photo-detector 33, and between the film predicting light source 32 and a photo-detector 34.

Thereby, in the APS camera 15, when the APS film 1 is automatically drawn out of the film cartridge 10, the film position predicting perforation 8 is detected by means of the film predicting light source 32 and the photo-detector 34, and then the film positioning square perforation 9 is detected by means of the film position detecting light source 31 and the photo-detector 33, whereby the APS film 1 is positioned in such a way that the near central part of the exposure area 11 that is unexposed is located substantially in the central part of the exposure opening portion 21.

Herein, in the exposure opening portion 21, the length of the exposure opening portion 21 along the transport direction of the APS film 1 is selected to be, for example, about 30.03 mm, in accordance with the length of the exposing area 11 along the film lengthwise direction, and the width of the exposure opening portion 21 along a direction almost orthogonal to the transport direction of the APS film 1 is selected to be, for example, about 16.93 mm in accordance with the width of the exposing area 11 along the film width direction.

Accordingly, in the APS camera 15, if the shutter release button 18 is depressed in a state where the APS film 1 has been positioned, a photographing light arriving from a subject (not shown) is taken via a camera lens, a diaphragm, and a shutter (not shown) into the exposure opening portion 21, to expose the exposing area 11 that is unexposed in the APS film 1 with the photographing light taken in, so that an image in the field of view including a subject, image can be formed on the exposing area 11 as a photographic image.

In this connection, in the APS camera 15, the exposing area 11 is stretched out at this time, as described earlier, whereby the photographic image formed on the exposing area 11 is prevented from being distorted.

In the APS camera 15, if the shutter release button 18 is depressed in this way, the user data is magnetically recorded by the magnetic head 32 on the user's camera using area 6, while the APS film 1 is being wound around the film winding spool 28. Thereby the film position predicting perforation 8 and the film positioning square perforation 9 are detected in succession by means of the film predicting light source 32 and the photodetector 34, and the film position detecting light source 31 and the photo-detector 33, whereby the APS film 1 is positioned in such a way that the near central part of the new exposing area 11 that is unexposed is located substantially in the almost central part of the exposure opening portion 21.

In this way, in the APS camera 15, every time the shutter release button 18 is depressed, a photographic image is formed on the exposing area 11 that is unexposed, and the user data is magnetically recorded on the user's camera using area 6. Thereafter, the new exposing area 11 that is unexposed is positioned with respect to the exposure opening portion 21.

In this connection, in the APS camera 15, every time a photographic image is formed on the exposing area 11, the user data corresponding to the exposing area 11 is recorded in the user's camera using area 6 repeatedly, or three times, for example.

Thereby, in a photographic image printing machine (not shown), for example, the user data that has been recorded repeatedly or about three times for each exposing area 11 in the APS film 1 is all reproduced in the printing time. By making an error detection through the comparison of the user data reproduced, the correct user data is discriminated from the proportion of the same user data and is employed for the printing. That is, in the photographic image printing machine, if all the user data reproduced three times are exactly the same, the user data is discriminated to be correct. If the user data reproduced twice are the same, among the user data reproduced three times, the same user data is discriminated to be correct. However, if all the user data reproduced three times are different, the user data is reproduced again.

The film predicting light source 32 and the film position detecting light source 31 are made to emit an infrared ray having a wavelength of, for example, about 940 nm, out of the wavelength region where the APS film 1 is photosensitive, whereby the exposing area 11 of the APS film 1 is prevented from being exposed owing to an infrared ray emitted from the film predicting light source 32 and the film position detecting light source 31.

Figure 10:
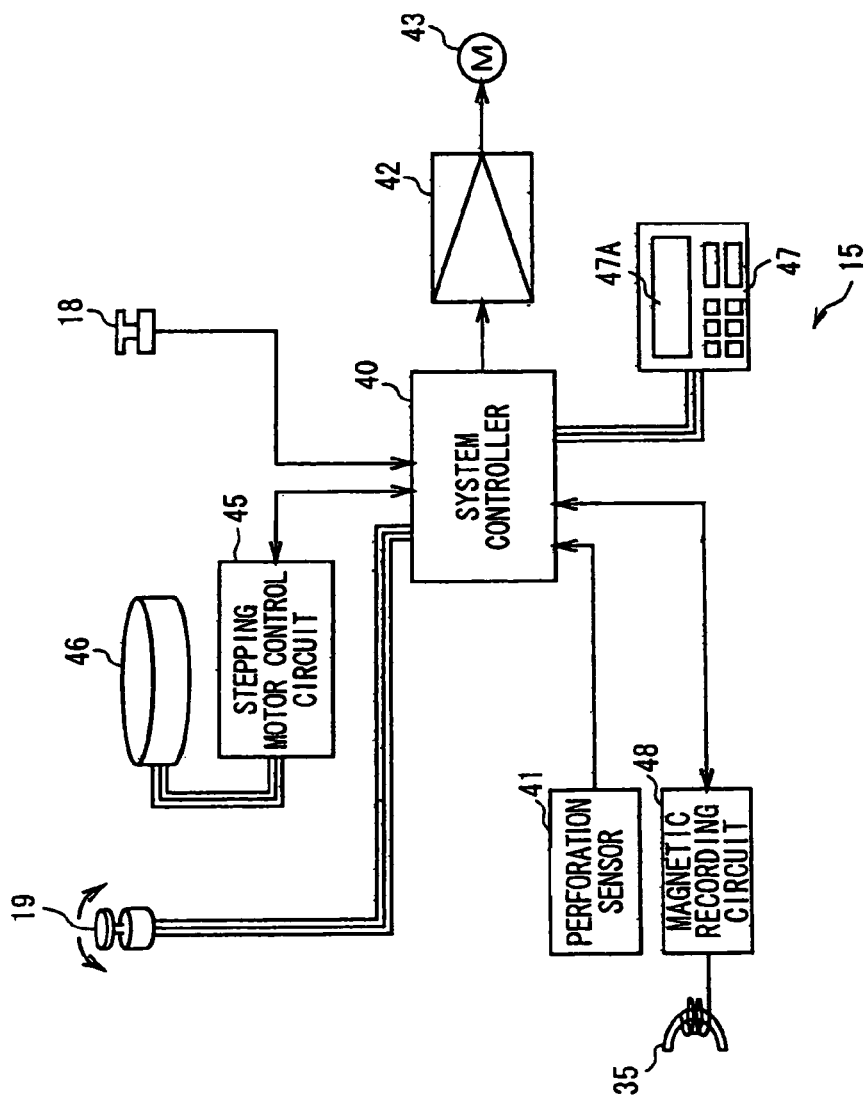
FIG. 10 is a block diagram showing a circuit configuration of an APS camera.

In practice, in the APS camera 15, a system controller 40 configured by a microcomputer is provided internally as shown in FIG. 10.

If a film cartridge 10 is loaded, the system controller 40 controls to drive a film drawing mechanism (not shown) to draw an APS film 1 from the film cartridge 10, while the film position predicting perforation 8 and the film positioning square perforation 9 are detected in succession by means of a perforation sensor 41 comprised of the film predicting light source 32 and the photo-detector 34, and the film position detecting light source 31 and the photo-detector 33, to issue a detection signal. Based on the detection signal, the system controller 40 produces a control signal, and sends the control signal via an amplification circuit 42 to a motor 43.

Thereby, the system controller 40 controls to drive the motor 43, based on the control signal, to cause rotation of the film winding spool 28 connected to the motor 43, so that the APS film 1 is wound around the film winding spool 28 by a certain amount of length. Then, the exposing area 11 is positioned with respect to the exposure opening portion 21.

In this connection, if the perforation sensor 41 issues a detection signal by detecting the film positioning square perforation 9, the system controller 40 counts up an internal counter, based on the detection signal, to allow the frame number to be recognized for the exposing area 11 positioned with respect to the exposure opening portion 21.

If the shutter release button 18 is depressed in a state where the exposing area 1i is positioned with respect to the exposure opening portion 21 in the above way, the system controller 40 controls a stepping motor control circuit 45 to drive a stepping motor 46 to adjust the focusing and exposure. Thereafter, the shutter is released to receive a photographing light into the exposure opening portion 21, so that a photographic image is exposed and formed on the exposing area 11.

The system controller 40 has received various kinds of information including the printing size type for the photographic image selected via a frame size setting switch 19, and the photographing date and time or the photographer's name input via an input portion 47 such as a keypad provided on the outer surface of the rear cover 17 (FIG. 8), and produces the user data based on various kinds of information that has been received, and other kinds of information such as the exposure condition supplied by adjusting the focusing and exposure.

In this connection, the input portion 47 is provided with a display panel 47A. If information is input via an input key, the information is displayed on the display panel 47A, making it possible to confirm visually whether or not the information to be recorded in the user's camera using area 6 of the APS film 1 has been recorded correctly as the user data.

If the photographic image has been exposed and formed on the exposing area 11, the system controller 40 controls the amplification circuit 42 to drive the motor 43, to pass the user data corresponding to the exposed photographic image to a magnetic recording circuit 48, while causing the APS film 1 to be wound around the film winding spool 28. Thus, the magnetic recording circuit 48 magnetically records the user data in the user's camera using area 6 of the APS film 1 via a magnetic head 35, and a new exposing area 11 that is unexposed is positioned with respect to the exposure opening portion 21, in the same way as described above.

In this way, in the APS camera 15, a photographic image can be exposed and formed in the exposing area 11 of the APS film 1 successively, while at the same time the user data corresponding to the photographic image can be recorded in the user's camera using area 6.

If all the photographic images by the maximum allowable number have been exposed and formed in the exposing area 11 of the APS film 1, the system controller 40 controls the film drawing mechanism to rewind the APS film 1 within the film cartridge 10. Hence, the film cartridge 10 within which the exposed APS film 1 is contained can be taken out of the APS camera 15, whereby the exposed APS film 1 taken outside can be protected by the film cartridge 10.

If a film winding button (not shown) is depressed before exposure of all the exposing areas 11 in the APS film 1 with the photographic images, the system controller 40 controls to magnetically record the information indicating that the film cartridge 10 has been replaced halfway in the user's camera using area 6 corresponding to the exposing area 11 positioned with respect to the exposure opening portion 21 at that time.

Thereafter, the system controller 40 controls to drive the film drawing mechanism to rewind the APS film 1 within the film cartridge 10, while magnetically recording the frame number data of the exposing area 11 at which the photographic image has been most lately exposed in the user's camera using area 6 at top of the APS film 1.

Thereby, even if a film cartridge 10 once loaded into the APS camera 15 is taken out before completion of exposure of all the exposing areas 11 of the APS film 1 with the photographic images, the system controller 40 can recognize the frame number of the exposing area 11 having the photographic image exposed just before replacement with reference to the user's camera using area 6 at top of the APS film 1 drawn out of the film cartridge 10 into the APS camera 15 again, when the film cartridge 10 is loaded into the APS camera 15 again. Consequently, the photographic image can be exposed and formed only on the exposing area 11 that is unexposed, following the exposing area 11 of the recognized frame number.

The APS film 1 having the photographic images exposed in all or part of the exposing areas 11 is accommodated within the film cartridge 10 and brought into the photograph shop. At the photograph shop, after the APS film 1 is developed, the photographic images are printed on the printing paper using a photographic image printing machine.

(2) Photographic Image Printing Machine

Figure 11:
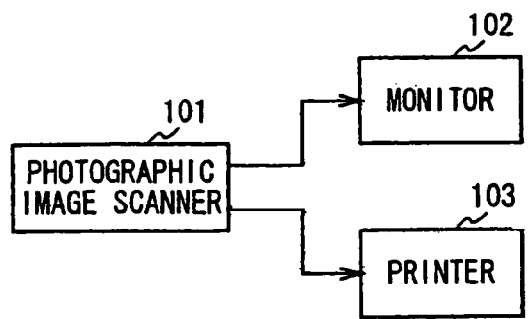
FIG. 11 is a block diagram showing an entire configuration of a photographic image printing machine.

Herein, a photographic image printing machine 100 installed in the photograph shop consists of a photographic image scanner 101 connected to a monitor 102 and a printer 103, shown in FIG. 11.

Figure 12:
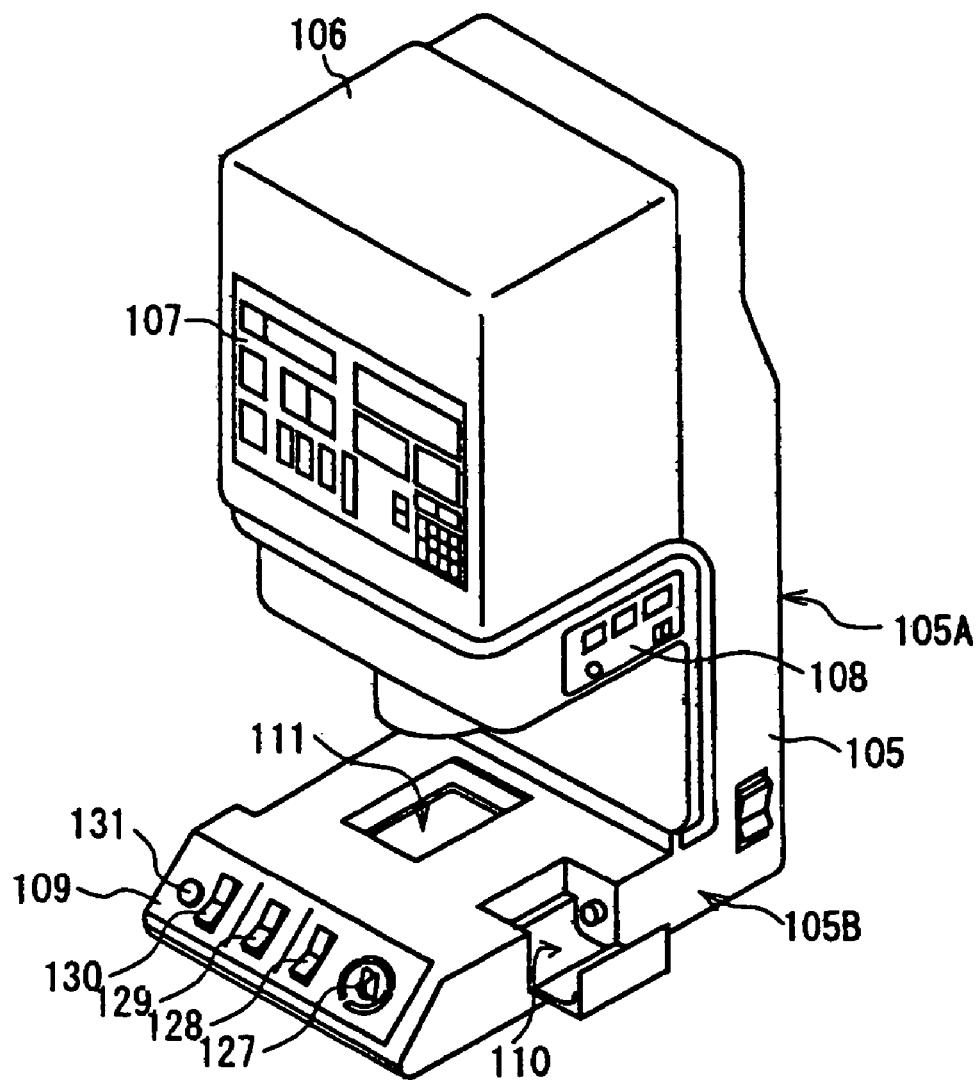
FIG. 12 is a schematic perspective view showing a configuration of a photographic image scanner.

The photographic image scanner 101 has a lower side body 105 of an L-character shape and an upper side body 106 mounted on a back plate 105A of the lower side body 105, with a printing selection panel 107 disposed on the front face of the upper side body 106, for example, as shown in FIG. 12.

A power supply indication panel 108 is attached on a lateral face of the upper side body 106, and inside the upper side body 106, there are provided an optical mechanism, a Charge Coupled Device (CCD), and a drive circuit as will be described later.

On the other hand, on a basement portion 105B of the lower side body 105, a monitor adjustment panel 109, a cartridge loading chamber 110, and a light transparent window 111 are provided, and a main power switch 112 is provided on a lateral face of the back plate 105A on the lower side body 105.

Figure 13:
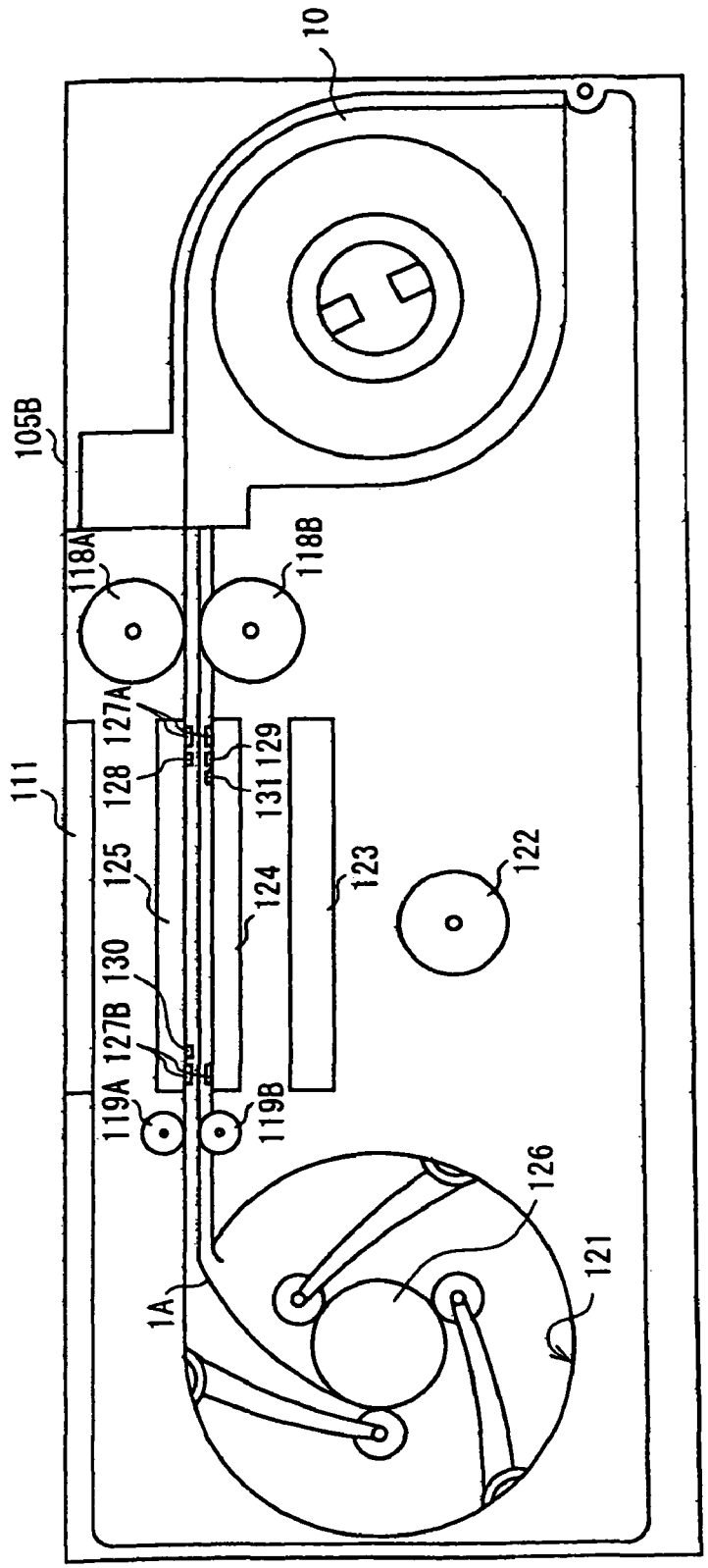
FIG. 13 is a schematic front view showing an interior configuration of a basement portion of a lower side body in a photographic image scanner.

Inside the basement portion 105B of the lower side body 105, there are contained a pair of film transport rollers 118A and 118B, a pair of idle roller 119A and 119B, and a film housing 121, and a lamp 122 opposed to the window 111, as shown in FIG. 13.

Further, a diffusion filter 123 and a pair of film guides 124 and 125 are disposed in a region from the lamp 122 to the window 111, each of film guides 124 and 125 being formed with an opening portion in accordance with an angle of view (i.e., angle of view having an aspect ratio of 9 to 16) for the exposing area 11 (FIG. 4) in the APS negative film 1A.

In the basement portion 105B, if a film cartridge 10 having a developed APS film (hereinafter referred to as an APS negative film) 1A contained is loaded into the cartridge loading chamber 110, the APS negative film 1A is drawn out of the film cartridge 10 by a film drawing mechanism (not shown), and the drawn APS negative film 1A is passed successively between the pair of film transport rollers 118A and 118B, between the film guides 124 and 125, and between the pair of idle rollers 119A and 119B, and wound around a film winding roll 126 within the film housing 121.

Between the film guides 124 and 125, the perforation detecting sensors 127A and 127B are provided in such a way as to carry the laboratory using area 7. (FIG. 2) of the APS negative film 1A drawn out of the film cartridge 10. Further, a user data magnetic head 128 and a frame number optical head 129 are provided in opposition to the user's camera using area 6 (FIG. 2), and a laboratory data magnetic head 130 and an initial data optical head 131 are provided in opposition to the laboratory using area 7.

Thereby, in the basement portion 105B, when the APS negative film 1A is drawn out of the film cartridge 10, the film position predicting perforation 8 (FIG. 2) and the film positioning square perforation 9 (FIG. 2) are detected in succession by means of the perforation detecting sensors 127A and 127B, so that the exposing area 11 can be positioned with respect to the opening portions of the film guides 124 and 125.

In the basement portion 105B, in a state where the exposing area 11 of the APS negative film 1A is positioned with respect to the opening portions of the film guides 124 and 125, a ray of light emitted from the lamp-122 is diffused through the diffusion filter 123 and radiated over an entire surface of the exposing area 11, a photographic image light having transmitted through the exposing area 11 being passed through the window 111 and received on a light receiving face of the charge coupled device in the upper side body 105A.

Thereby, in the photographic image scanner 101, the photographic image light received by the charge coupled device is converted photo-electrically, making it possible to generate the photographic image data of a photographic image exposed on the exposing area 11 of the APS negative film 1A.

In the photographic image scanner 101, the photographic image data for display is produced based on the photographic image data, and sent to the monitor 102 (FIG 11) to display a photographic image on the basis of the photographic image data for display.

Further, in the photographic image scanner 101, the photographic image data for printing is generated on the basis of the photographic image data, and sent to the printer 103 to produce a print photograph shop having a photographic image printed on the printing paper of a predetermined size (hereinafter referred to as a print size) on the basis of the photographic image data for printing.

In this connection, in the monitor adjustment panel 109 (FIG 12), there are provided a color adjustment switch 133, a zoom control switch 134, a focus control switch 135, a diaphragm control switch 136, and a main power indicator lamp 37. By manually operating the color adjustment switch 33, the zoom control switch 134, the focus control switch 135 and the diaphragm control switch 136, the quality of photographic image displayed on the monitor 102 can be adjusted.

Figure 14:
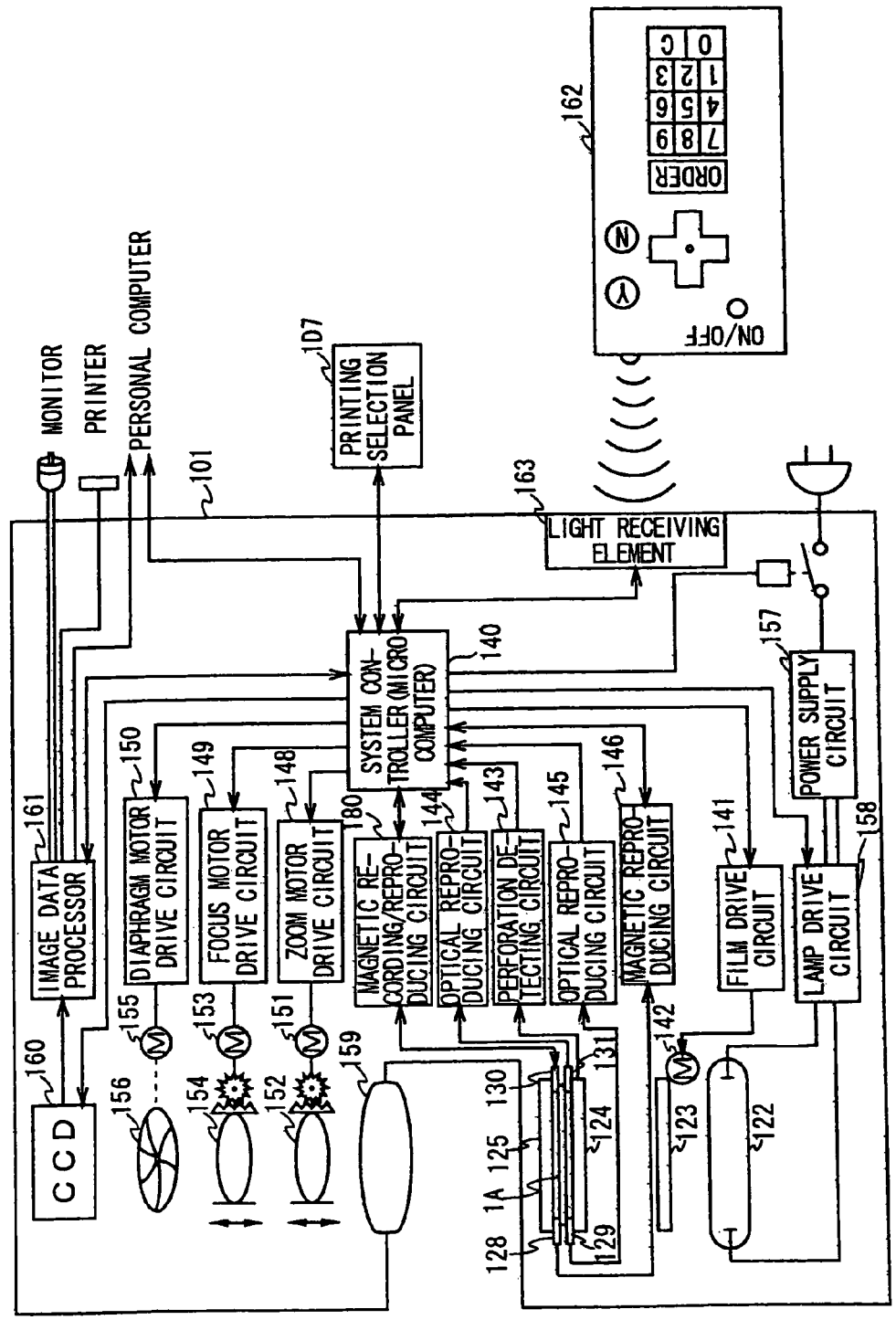
FIG. 14 is a block diagram showing a circuit configuration of a photographic image scanner.

In practice, in the photographic image scanner 101, a system controller 140 configured by a microcomputer is provided to control the overall system to automatically perform a process of producing the photographic image data which is executed in a series of steps, as shown in FIG 14.

If an APS negative film 1A is drawn out of the film cartridge 10 (FIG 13) loaded into the cartridge loading chamber 110 (FIG 13), the system controller 140 controls a film drive circuit 141.

Thereby, the film drive circuit 141 drives a film drive motor 142 to rotate the pair of film transport rollers 118A and 118B (FIG 13), the pair of idle rollers 119A and 119B (FIG 13), and the film winding reel 126 (FIG 13), to wind the APS negative film 1A around the film winding reel 126.

In accordance with a result of detecting the film position predicting perforation 8 (FIG. 2) and the film positioning square perforation 9 (FIG. 2) in the APS negative film 1A that is provided by a perforation detecting circuit 143 from the perforation detecting sensors 127A and 127B (FIG 13), the system controller 140 controls to stop the driving of the film drive motor 142 temporarily, and position the exposing area 11 (FIG. 4) of the APS negative film 1A with respect to the opening portion of the film guides 124 and 125.

In this way, the system controller 140 is adapted to perform alternately and successively the winding of the APS negative film 1A and the positioning of the exposing area 11 of the APS negative film 1A.

In addition, the system controller 140 controls the optical head for initial data 131 via an optical reproducing circuit 144, while transporting the APS negative film 1A, thereby reproducing the initial data from the laboratory using area 7 of the APS negative film 1A, and controls the optical head for frame number 129 via an optical reproducing circuit 145, thereby reproducing the frame number data from the user's camera using area 6 of the APS negative film 1A.

The system controller 140 controls the magnetic head for user data 128 via a magnetic reproducing circuit 146, thereby reproducing the user data from the user's camera using area 6 of the APS negative film 1A.

Also, the system controller 140 controls a zoom motor drive circuit 148, a focus motor drive circuit 149 and a diaphragm motor drive circuit 150, on the basis of various kinds of information including the photographing camera information, the subject brightness information, the information as to whether or not the artificial light source is used, and the subject image magnification with respect to the camera-to-subject distance, every time the user data corresponding to the exposing area 11 of the APS negative film 1A is reproduced.

Thereby, the zoom motor drive circuit 148 drives a zoom motor 151 to move a zoom lens 152 along an optical axis to adjust the magnification of photographic image light.

The focus motor drive circuit 140 drives a focus motor 153 to move a focus lens 154 along the optical axis to adjust the focusing of photographic image light.

Further, the diaphragm motor drive circuit 150 drives a diaphragm motor 155 to adjust a diaphragm 156 for the photographic image light via the diaphragm motor 155 in accordance with the magnification adjusted by the zoom lens 152.

In this way, the system controller 140 controls to adjust the zoom lens 152, the focus lens 154 and the diaphragm 156 to reproduce the photographing condition of photographic image, on the basis of the corresponding user data, every time the exposing area 11 of the APS negative film 1A is positioned with respect to the opening portions of the film guides 124 and 125. In this state, a power voltage is supplied from a power supply circuit 157 to a lamp drive circuit 158, so that the lamp 122 is lighted by the lamp drive circuit 158.

Thereby, a ray of light emitted from the lamp 122 is diffused through the diffusion filter 123, and radiated over an entire surface of the exposing area 11, so that the photographic image light transmitted through the exposing area 11 is passed through the window 111, an objective lens 159, the zoom lens 152, the focus lens 154 and the diaphragm 156 in succession and received on a light receiving face of a charge coupled device 160.

Herein, the light receiving face of the charge coupled device 160 has an aspect ratio of 9 to 16, like the exposing area 11, such that a photographic image exposed on the exposing area 11 is projected over an entire area of the light receiving face as a photographic image light with the same angle of view. And the charge coupled device 160 converts photo-electrically the photographic image light received over the entire area of the light receiving face, and sends a thus-obtained analog photoelectric signal to an image data processor 161.

The image data processor 161 converts the analog photoelectric signal supplied from the charge coupled device 160 into digital form under the control of the system controller 140, thereby reproducing the photographic image data for a photographic image exposed on the exposing area 11 of the APS negative film 1A.

Also, the image data processor 161 is supplied with the user data, the initial data and the frame number data from the system controller 140, and performs the data processing such as transforming the angle of view in accordance with the printing type, for the photographic image data on the basis of the user data, the initial data and the frame number data, so that the photographic image data for display is sent to the monitor 102 (FIG 11).

Thereby, the image data processor 161 displays a photographic image on the monitor 102, on the basis of the photographic image data for display, whereby the printing condition of the photographic image can be visually confirmed on the monitor before printing.

The image data processor 161 performs the data processing for the photographic image data, including appending the information as to the printing number of images contained in the user data to the photographic image data, and sends the photographic image data for printing to the printer 103 (FIG 11), so that the printer 103 can produce the print photograph shops in accordance with the printing number of images.

By the way, in the photographic image scanner 101, a remote controller 162 is provided to allow the input of a main power ON/OFF instruction, a transport instruction for the APS negative film 1A, a printing type change specifying instruction, and a printing number change specifying instruction.

In practice, if a photoelectric signal in accordance with a transport instruction for the APS negative film 1A is issued from the remote controller 162, the system controller 140 accepts the photoelectric signal via a light receiving element 163 and controls the film drive circuit 141 to drive the film drive motor 142 on the basis of the transport instruction, so that the exposing area 11 of the specified frame number among the exposing areas 11 of the APS negative film 1A is positioned with respect to the opening portions of the film guides 124 and 125.

If a photoelectric signal in accordance with a printing type change specifying instruction or a printing number change specifying instruction is issued from the remote controller 162, the system controller 140 accepts the photoelectric signal via the light receiving element 163, and sends the printing type change data or printing number change data in accordance with the accepted photoelectric signal to the image data processor 161.

Though the image data processor 161 usually sets up the printing type for the photographic image and the printing number of images on the basis of the user data supplied from the system controller 140, it changes the printing type or the printing number of images for the photographic image on the basis of the printing type change data, if the printing change data is supplied from the system controller 140.

In this connection, if the system controller 140 receives a photoelectric signal in accordance with a transport instruction for the APS negative film 1A, a printing type change specifying instruction, and a printing number change specifying instruction from the remote controller 162, the system controller 140 sends a selected image display instruction on the basis of the photoelectric signal to the image data processor 161.

Then, the image data processor 161 produces the selected image data on the basis of the selected image display instruction supplied from the system controller 140, synthesizes the image data with the photographic image data for display, and sends the synthesized image data to the monitor 102.

Figure 15:
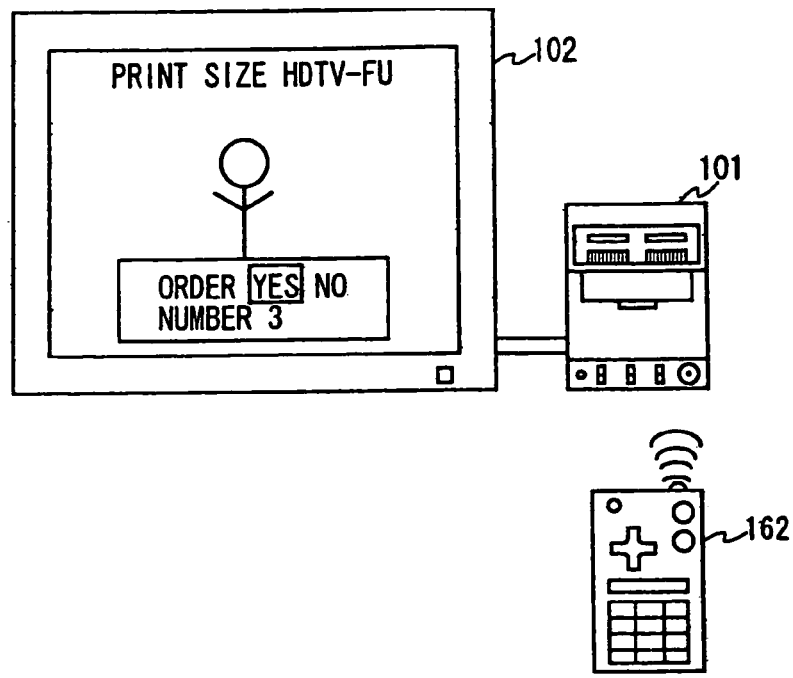
FIG. 15 is a schematic view for describing a selected image displayed on a monitor.

Thereby, on the monitor 102, there is displayed a selected image based on the selected image data superposed on a photographic image based on the photographic image data for display, for example, as shown in FIG 15. In accordance with the operation of the remote controller 162, the selected image can be changed consecutively, whereby one can readily instruct to transport the APS negative film 1A, change the printing type, or change the printing number by operating the remote controller 162 while viewing a display screen of the monitor 102.

Figure 16:
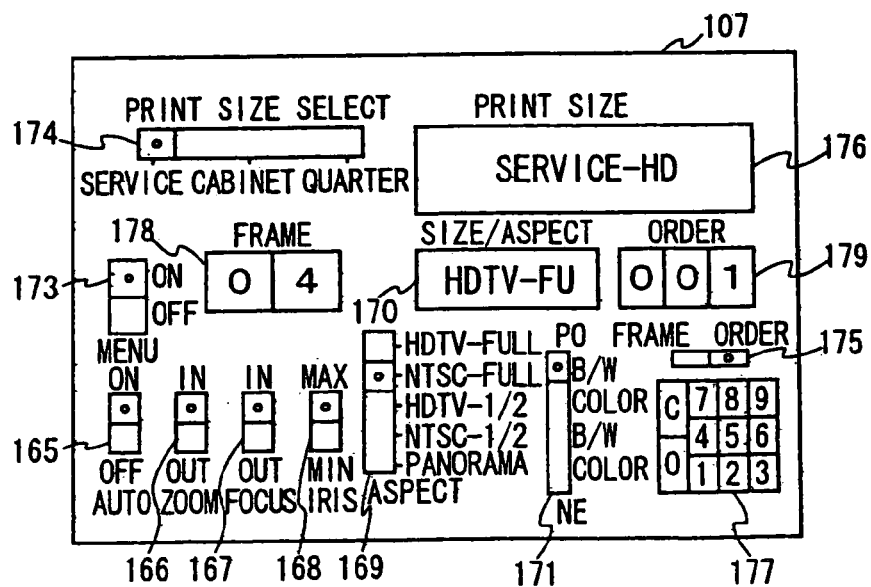
FIG. 16 is a schematic view showing a configuration of a printing selection panel.

In addition, on the printing selection panel 107 of the photographic image scanner 101, there are provided an automatic mode selection switch 165, a zoom control switch 166, a focus control switch 167, a diaphragm control switch 168, and an aspect ratio change switch 169, as shown in FIG 16.

The system controller 140 is placed in an automatic mode when the automatic mode selection switch 165 on the printing selection panel 107 is in the ON state, and controls the zoom motor drive circuit 148, the focus motor drive circuit 149 and the diaphragm motor drive circuit 150 on the basis of the user data, and permanently sets the aspect ratio to a ratio of 9 to 16 for the photographic image light which can be received on the light receiving face of the charge coupled device 160, as described previously.

On the contrary, the system controller 140 is placed in a manual mode when the automatic mode selection switch 165 of the printing selection panel 107 is in the OFF state, and if a zoom control switch 166, a focus control switch 167 or a diaphragm control switch 168 is manipulated, the system controller 140 controls the zoom motor drive circuit 148, the focus motor drive circuit 149 or the diaphragm motor drive circuit 150 on the basis of an operation instruction supplied from the printing selection panel 107 upon the manipulation.

Also, when the system controller 140 is in the manual mode, if an aspect ratio change switch 169 is manipulated, the system controller 140 changes the aspect ratio of the photographic image light that can be received on the light receiving face of the charge coupled device 160 on the basis of an operation instruction supplied from the printing selection panel 107 upon a manipulation of the aspect ratio change switch 169, and displays the sort of the aspect ratio selected by the aspect ratio change switch 169 on an aspect ratio indication section 170 of the printing selection panel 107.

Figure 17:
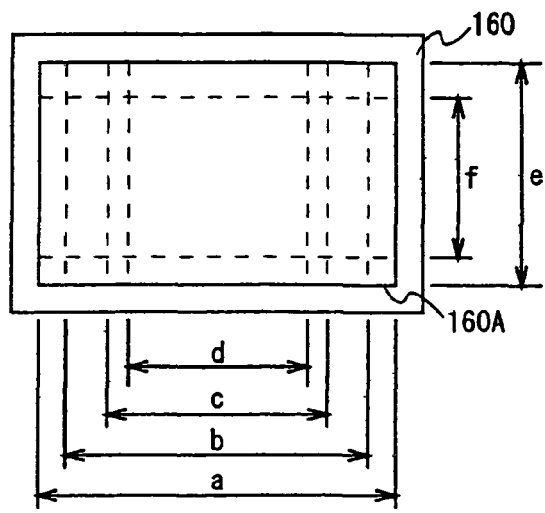
FIG. 17 is a schematic front view for describing control of a light receiving face of an electric charge coupled device.

In this connection, when the system controller 140 is in the manual mode, if the aspect ratio change switch 169 is manipulated, the system controller 140 selects the breadth of an effective light receiving area of the light receiving face 160A in the charge coupled device 160 to a predetermined length indicated by a, in the case where the aspect ratio of 9 to 16 or 1 to 3 is chosen, or selects the breadth of the effective light receiving area to a predetermined length indicated by b, in the case where the aspect ratio of 3 to 4 is chosen, or selects the breadth of the effective light receiving area to a predetermined length indicated by c, in the case where the aspect ratio of 9 to 16 in half size is chosen, or selects the breadth of the effective light receiving area to a predetermined length indicated by d, in the case where the aspect ratio of 3 to 4 in half size is chosen, as shown in FIG 17.

Further, the system controller 140 selects the longitudinal length of the effective light receiving area to a predetermined length indicated by e, in the case where the aspect ratio of 9 to 16 or 3 to 4, or the aspect ratio of 9 to 16 or 3 to 4 in half size is chosen, or selects the longitudinal length of the effective light receiving area to a predetermined length indicated by f, in the case where the aspect ratio of 1 to 3 is chosen.

In addition, on the printing selection panel 107 (FIG 16), there are provided an image type change switch 171, a monitor image changeover switch 172, a selected image display switch 173, a size selection switch 174 and a printing change switch 175.

If the image type change switch 171 is operated, the system controller 140 (FIG 14) controls the image data processor 161 (FIG 14) to produce either the black and white photographic image data or the color photographic image data from the photographic image (positive image or negative image) of the APS negative film 1A on the basis of an operation instruction issued from the printing selection panel 107 upon that operation.

If the monitor screen changeover switch 172 is operated, the system controller 140 controls the image data processor 161 to display either the photographic image or the selected image on the monitor 102 (FIG 11) on the basis of an operation instruction issued from the printing selection panel 107 upon that operation. Further, if the selected image display switch 173 is operated, the system controller 140 controls the image data processor 161 to display the selected image along with the photographic image on the monitor 102 (FIG 11) on the basis of an operation instruction issued from the printing selection panel 107 upon that operation.

Further, if the size selection switch 174 is manipulated, the system controller 140 controls the image data processor 161 to enable the printer 103 (FIG 11) to produce the print photograph shop in the service, cabinet or quarter print size on the basis of an operation instruction issued from the printing selection panel 107 upon that operation, and to display the print size selected by the size selection switch 174 on a size indication section 178 of the printing selection panel 107.

Further, if the printing change switch 175 is changed over to the frame number set-up side, the system controller 140 displays the frame number input via an input panel 177 on the printing selection panel 107 on a frame number indication section 178 of the printing selection panel 107, and controls the film drive circuit 141 to drive the film drive motor 142 on the basis of the input frame number, so that the exposing area 11 at the specified frame number among the exposing areas 11 of the APS negative film 1A is positioned with respect to the opening portions of the film guides 124 and 125.

If the printing change switch 175 is changed over to the printing number set-up side, the system controller 140 displays the printing number input via the input panel 177 on a printing number indication section 179 of the printing selection panel 107, and controls the image data processor 161 to enable the printer 103 (FIG 11) to produce the print photograph shops by the newly specified printing number, on the basis of the input printing number, instead of the user data.

Thereby, the system controller 140 can readily change the printing condition obtained on the basis of the user data, whereby the print photograph shops can be produced from the photographic image even under the other condition than that the user has specified as the user data at the photographing time.

After the print photograph shops are printed on the basis of the photographic image data that is produced from the photographic image of the APS negative film 1A, the system controller 140 (FIG 14) generates the laboratory data on the basis of the user data and a variety of sorts of information (print size, printing number, aspect etc.) given via the printing selection panel 107 and the remote controller 162, and sends the generated laboratory data to a magnetic recording circuit 180, which then magnetically records the laboratory data on the laboratory using area 7 of the APS negative film 1A by means of the magnetic head for laboratory data 130.

Thereby, the system controller 140 can preserve the history of photographic image such as the printing condition as the laboratory data in the laboratory using area 7 of the APS negative film 1A.

Accordingly, in the case where the APS negative film 1A once employed in printing the photographic image is used again to print the photographic image, the system controller 140 controls a magnetic recording/reproducing circuit 180 to reproduce the laboratory data from the laboratory using area 7 of the APS negative film 1A by means of the magnetic head for laboratory data 130, and execute the printing process of photographic image on the basis of the reproduced laboratory data, whereby the print photograph shops can be produced by reprinting the photographic image in the past.

In this connection, if the printing condition is changed to perform the printing process for the photographic image in the APS negative film 1A at the second time or beyond, the system controller 140 reproduces the laboratory data in accordance with the changed printing condition, so that the laboratory data in the laboratory using area 7 of the APS negative film 1A can be rewritten.

Figure 18:
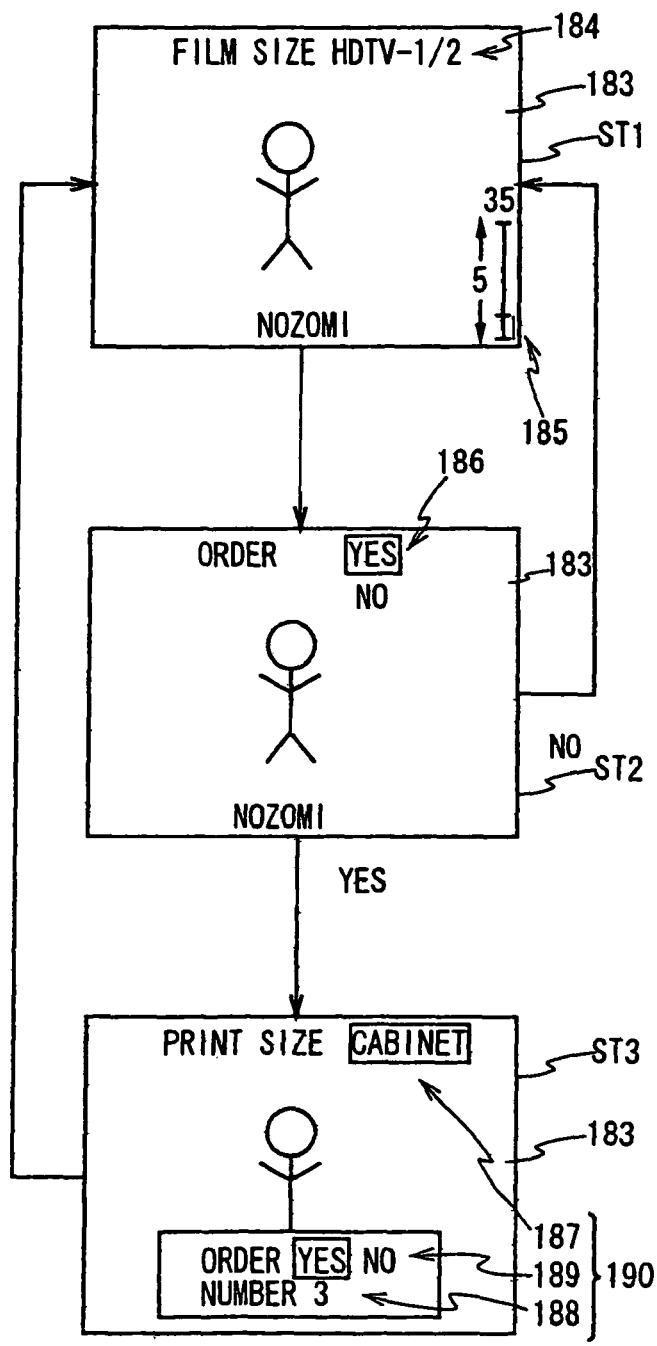
FIG. 18 is a flow chart showing a procedure of printing condition changing process.

Herein, the image data processor 161 (FIG 14) performs a printing condition changing process in accordance with the following procedure as shown in FIG 18 under the control of the system controller 140, in printing the photographic image.

That is, the image data processor 161 generates the photographic image data for display by applying a predetermined data processing to the photographic image data on the basis of the user data and sends the photographic image data for display to the monitor 102 (FIG 11) at step SP1, whereby a photographic image 183, as well as a printing type 184 and a frame number 185 are displayed on the monitor 102, on the basis of the photographic image data for display.

Subsequently, at step SP2, if a selected image display instruction is issued from the system controller 40 in accordance with the remote controller 162 (FIG 14) or an operation on the printing selection panel 107 (FIG 16), the image data processor 161 synthesizes the selected image data produced on the selected image display instruction and the photographic image data for display, and sends the synthesized image data to the monitor 102. Thereby, a selected image 186 for confirming the result of changing the printing condition, for example, on the basis of the selected image data is displayed in superposition on the photographic image 183 on the basis of the photographic image data for display on the monitor 102.

At step SP2, if the image data processor 161 is given a selected image display suspend instruction from the system controller 140, for example, when the remote controller 162 is operated to input an instruction for suspending to change the printing condition, the display of the selected image is suspended and the procedure returns to step SP1.

On the contrary, if the image data processor, 161 is given a selected image display update instruction from the system controller 140, for example, when the remote controller 162 is operated to input an instruction for updating the printing number at step SP2, the procedure goes to step SP3.

At step SP3, if the image data processor 161 is given a selected image display instruction for displaying the content of changing the printing condition from the system controller 40 in accordance with an operation of the remote controller 162 or the printing selection panel 107, the image data processor 161 synthesizes the selected image data produced on the basis of the selected image display instruction and the photographic image data for display, and sends the synthesized image data to the monitor 102, whereby a selected image 190 consisting of, for example, a print size 187, a printing number 188 and a confirmation section 189 for confirming the content of changing the printing condition on the basis of the selected image data, can be displayed in superposition on the photographic image 183 on the basis of the photographic image data for display on the monitor 102.

Thus, the image data processor 161 is configured to allow the user to change the printing condition while confirming visually the selected image displayed on the monitor 102.

Figure 19:
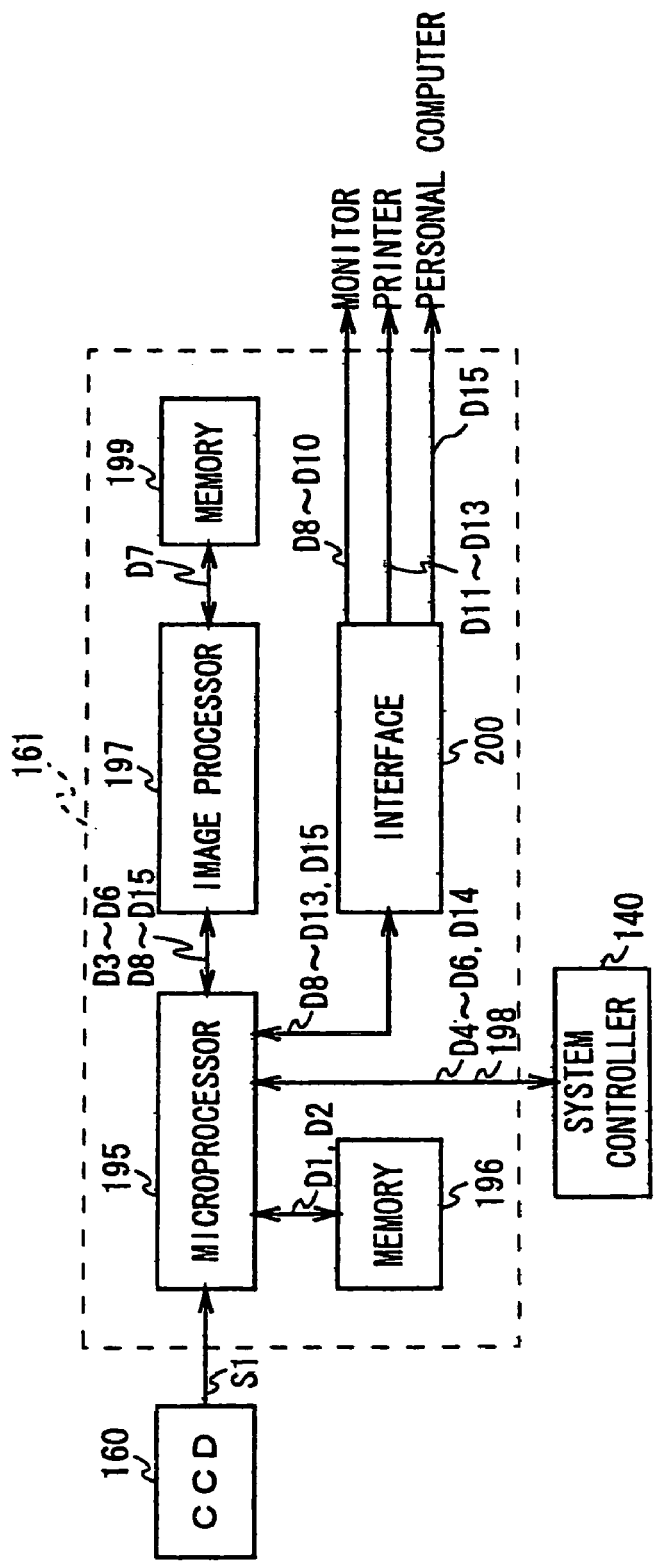
FIG. 19 is a block diagram showing a circuit configuration of an image data processor.

In practice, the image data processor 161 accepts a photoelectric signal S1 from the charge coupled device 160 into a microprocessor 195, as shown in FIG 19.

The microprocessor 195 operates under the control of the system controller 140 to cause an analog/digital conversion circuit provided internally (not shown) to convert the analog photoelectric signal S1 given from the charge coupled device 160 into digital form, thereby producing the Red Green Blue (RGB) data.

Also, the microprocessor 195 reads the correction data D1 and the color conversion data D2 stored in advance in a memory 196, performs a brightness correction process for the RGB data, on the basis of the correction data D1, and a color conversion process on the basis of the color conversion data D2, and then sends the thus-obtained correction conversion processed data D3 to an image processor 197.

In addition, the microprocessor 195 has been already given the user data D4, the initial data D5 and the frame number data D6 from the system controller 140, and also sends the user data D4, the initial data D5 and the frame number data D6 to the image processor 197.

In this connection, the correction data D1 is to correct for the conversion deviation in the charge coupled device and the analog/digital conversion circuit, and the color conversion data D2 is to effect conversion between the positive film and the negative film as well as to select either one of the black and white image and the color image in accordance with an operation on the printing selection panel 107 (FIG 16).

The image processor 197 operates with the intervention of the microprocessor 195 under the control of the system controller 140. Given the correction conversion processed data D3, the user data D4, the initial data D5 and the frame number data D6 from the microprocessor 195, the image processor 197 reads the corresponding sensitivity correction data D7 from the memory 199, which is stored therein in advance, on the basis of the information indicating the film type of the APS negative film 1A contained in the initial data D5.

The image processor 197 performs a sensitivity correction process for correcting the correction conversion processed data D3 for the film sensitivity deviation which is different for each film type on the basis of the sensitivity correction data D7, thereby producing the photographic image data in accordance with the photographic image of the APS negative film 1A.

In addition, the image processor 197 performs a deviation correction process for correcting the photographic image data for the monitor deviation, and a size adjustment process for adjusting the size of photographic image in accordance with the angle of view on the display screen of the monitor 102, after adjusting the angle of view for the photographic image on the basis of the user data D4 and in accordance with the printing type. Further, the image processor 197 performs a superimposing process of a variety of kinds of information obtained on the basis of the user data D4, thereby producing the photographic image data for display D8.

The image processor 197 sends the photographic image data for display D8 via the microprocessor 195 and an interface 200 to the monitor 102 (FIG 11).

In this connection, the image processor 197, which is given a selected image display instruction from the system controller 140 via the microprocessor 195, as required, produces the predetermined selected image data D9 on the basis of the selected image display instruction, and sends the selected image data D9, together with the photographic image data for display D8, via the microprocessor 195 and the interface 200 to the monitor 102.

After finishing the transfer of the selected image data D9, the image processor 197 produces the printing condition confirmation image data D10 on the basis of the photographic image data for display D8 amounting to one APS negative film 1A, and sends the printing condition confirmation image data D10 via the microprocessor 195 and the interface 200 to the monitor 102.

Figure 20A:
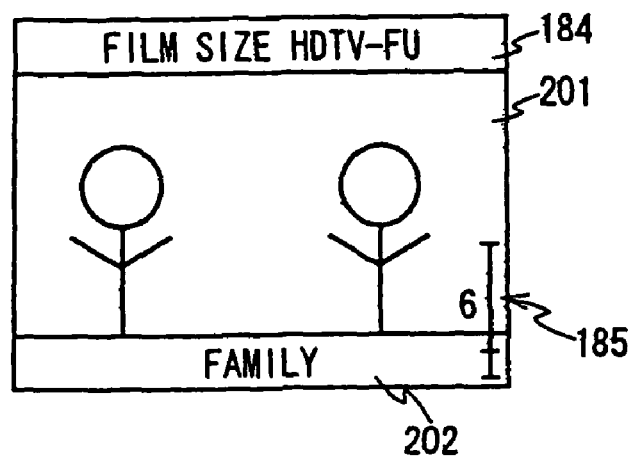
FIGS. 20A to 20C are schematic views for describing respective displays of photographic images.
Figure 20B:
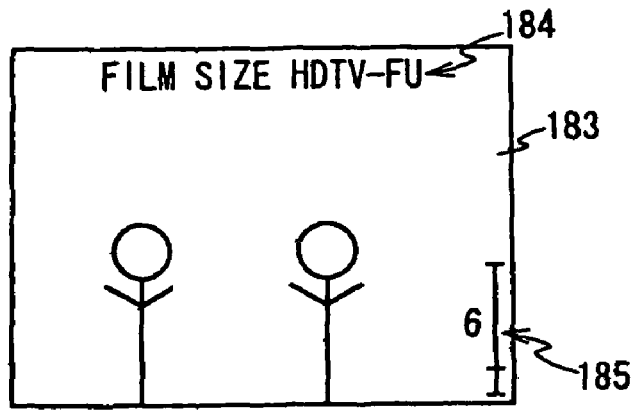
Figure 20C:
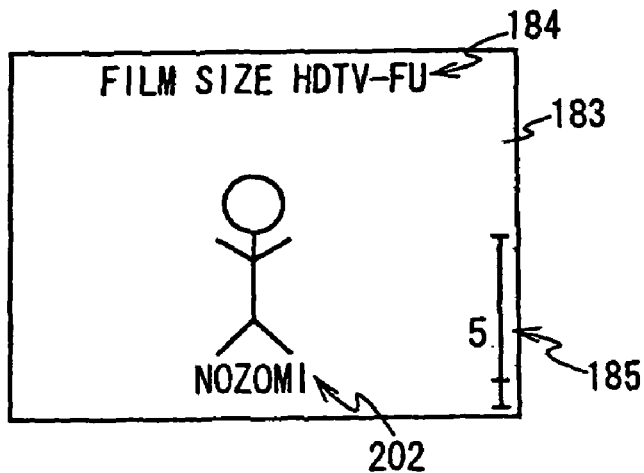

Thereby, in the photographic image scanner 101 (FIG 11), a photographic image 183 of predetermined size or an enlarged photographic image 201, along with the printing type 184, the frame number 185 and a title message 202 are displayed on the monitor 102, on the basis of the photographic image data for display D8, as shown in FIGS. 20A to 20C.

Figure 21:
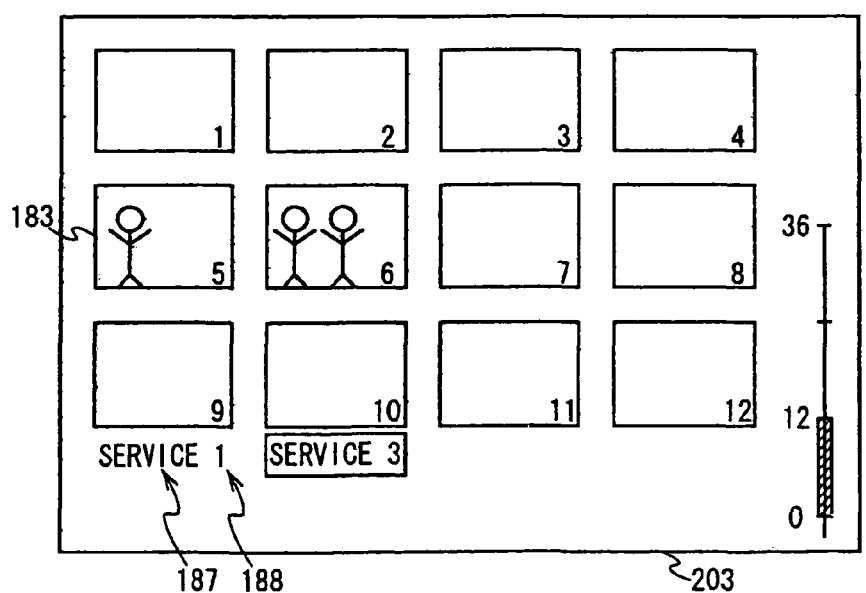
FIG. 21 is a schematic view showing a configuration of printing condition confirmation image.

In the photographic image scanner 101, after the photographic image 183 and the selected image 190 are displayed on the monitor 102 at step SP3 of FIG 18, a printing condition confirmation image 203 is displayed on the monitor 102, on the basis of the printing condition confirmation image data D10, as shown in FIG. 21. This printing condition confirmation image 203 is displayed with the photographic images 183 amounting to one APS negative film 1A as the thumb-nail image, and the print photograph shop size 187 and the printing number 188 are displayed below the thumb-nail image.

On the other hand, the image processor 197 (FIG 19) performs a deviation correction process for correcting the photographic image data for the printer deviation, and a size adjustment process for adjusting the size of photographic image in accordance with the print size, after adjusting the angle of view for the photographic image on the basis of the user data D4 in accordance with the printing type. Further, the image processor 197 synthesizes a title message contained in the user data D4, as required, thereby producing the photographic image data for printing D11.

The image processor 197 sends the photographic image data for printing D11, together with the printing condition data D12 including the printing number and the print size, via the microprocessor 195 and the interface 200 to the printer 103 (FIG 11).

In addition, the image processor 197 performs a deviation correction process for correcting the photographic image data amounting to one APS negative film 1A for the printer deviation, apart from the photographic image data for printing D11, and a predetermined process on the basis of the printing type contained in the user data D4. Then the image processor 197 synthesizes a title message contained in the user data D4, thereby producing the index image data D13.

Further, the image processor 197 sends the index image data D13 via the microprocessor 195 and the interface 200 to the printer 103.

Thereby, in the photographic image scanner 101 (FIG 11), the printer 103 prints a photographic image on the printing paper of specified print size in accordance with a specified printing type among the first to third printing types H, C and P, and on the basis of the photographic image data for printing D11 and the printing condition data D12, thereby producing the print photograph shops 205A, 205B and 205C, and also printing a user specified message 206 on the print photograph shop 205, as shown in FIGS. 22A to 22C.

Figure 23:
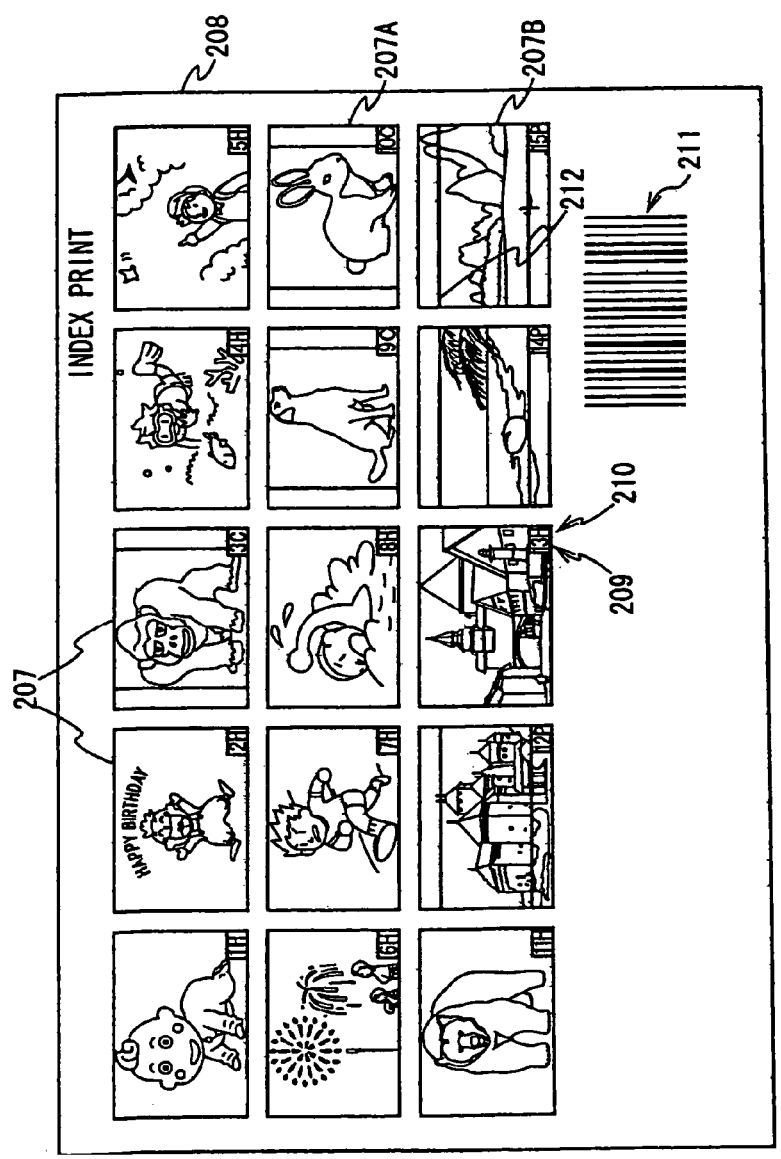
FIG. 23 is a schematic view showing a configuration of an index print.

In the photographic image scanner 101, the printer 103 can produce an index print 208 having the photographic images 207 amounting to one-APS negative film 1A displayed as the thumb-nail image on the basis of the index image data D13, as shown in FIG. 23, whereby a plurality of print photograph shops 205 and the index print 208, together with the film cartridge 10 (FIG. 3) containing the APS negative film 1A, can be delivered to the user.

In this connection, in the index print 208, each photographic image 207 is displayed in thumb-nail at an angle of view with the first printing type H, and has the frame number 209 and the printing type 210 on the lower right corner of the photographic image 207.

On the lower right corner of the index print 208, for example, the film ID is displayed with a bar code 211 to associate the index print 208 with the APS negative film 1A.

Further, the photographic image 207A, 207B specified with the second printing type C or third printing type P (FIG. 5) that is different from the first printing type H has a line 212 indicating the angle of view for the specified printing type.

Hence, in the index print 208, it is possible to visually confirm how the composition of the photographic image 207 having an angle of view with the first printing type H changes with reference to the line 212 indicating the angle of view for the second printing type C or the third printing type P specified by the user.

By the way, the image processor 197 (FIG 19) performs a predetermined data processing for the photographic image data, which can be handled by the personal computer (not shown), and converts the data format into a predetermined data format such as Bitmap, Tag Image File Format (TIFF), Graphics Interchange Format (GIF), or Joint Photographic coding Experts Group (JPEG), thereby producing the converted photographic image data.

The image processor 197, which is given the laboratory data D14 from the system controller 140 via the microprocessor 195, produces the photographic image header data consisting of the frame number and the printing condition of photographic image intrinsic to the converted photographic image data on the basis of that laboratory data D14, the user data D4 and the frame number data D6, and appends that produced photographic image header data to the top of the converted photographic image data.

Further, the image processor 197, which is given the predetermined transmission data from the personal computer via the system controller 140 and the microprocessor 195, produces the film header data on the basis of that transmission data and the initial data D5, and appends this film header data to the top of the converted photographic image data amounting to one APS negative film 1A to produce the film data D15. Then the image processor sends the produced film data D15 via the microprocessor 195 and the interface 200 to the personal computer (not shown).

Thereby, at the photograph shop stop where the photographic image printing machine 100 (FIG 11) is installed, a personal computer connected to the photographic image printing machine 100 performs various processing for the film data D15 to process the photographic image, or transmits the film data D15 to a desired remote site via the Internet. In the same way as the film data D15, digital camera data captured by a digital camera can be transmitted via a personal computer. However, the two data have different characteristics due to the difference of exposure characteristics between a film and CCD imager, which obliges appropriate correction amount for each data.

(3) Principle of Photographic Image Commercial Transactions System

A photographic image commercial transactions system that implements the electronic commercial transactions with the photographic image will be described below using the photographic image printing machine 100 as shown in FIG 11.

Figure 24:
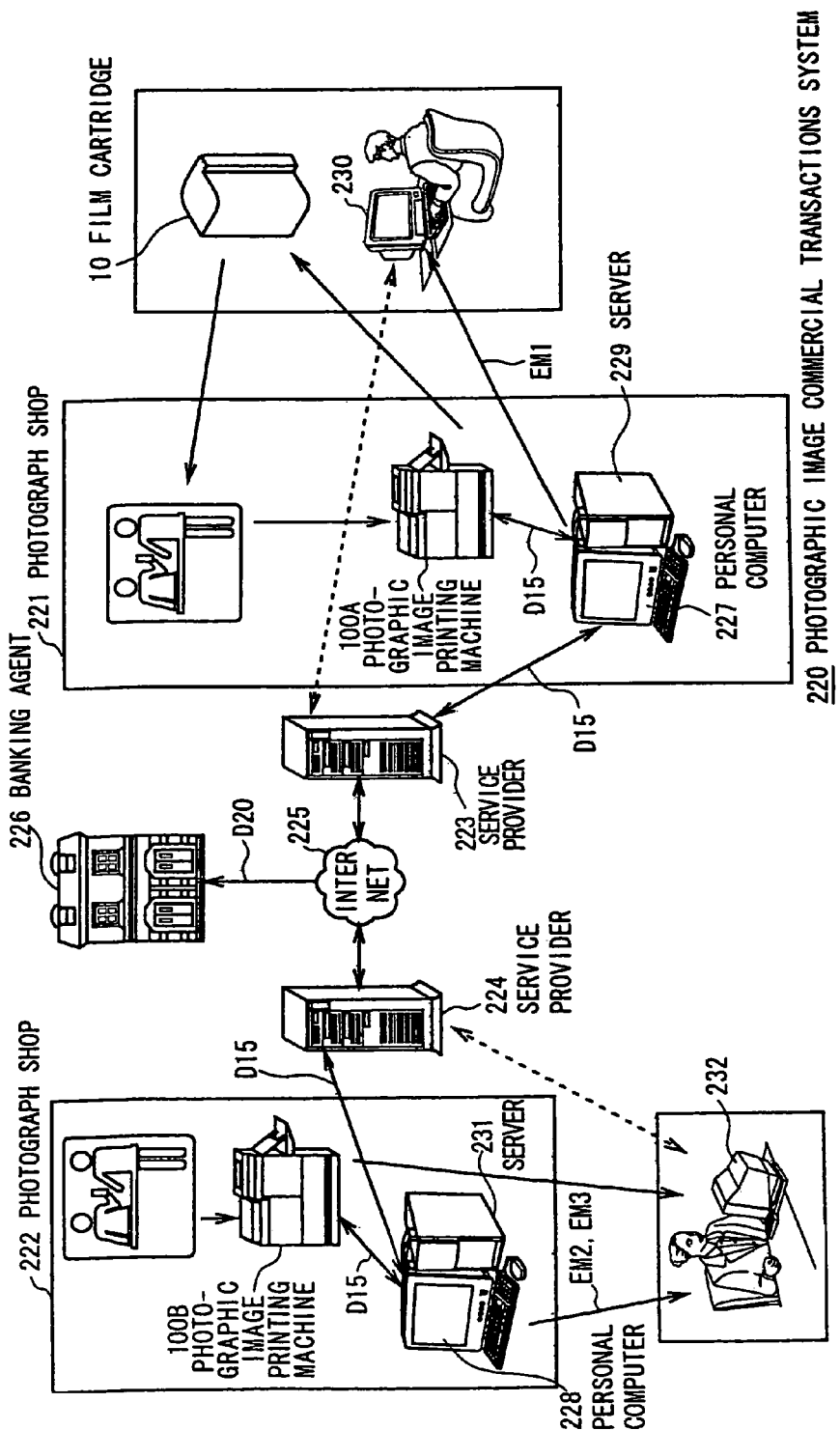
FIG. 24 is schematic conception view showing a principle on the entire configuration of photographic image commercial transactions system.

In the photographic image commercial transactions system 220 as shown in FIG. 24, a photograph shop 221 owned by the reception dealer concerned inside or outside the country (hereinafter referred to as a reception photograph shop), and a photograph shop 222 owned by the delivery dealer concerned (hereinafter referred to as a delivery photograph shop) are connected via a network constructed by a service provider 223 on the reception shop side and a service provider 224 on the delivery shop side, and the Internet 225, which is connected to a banking agency 226 owned by the charge accounting dealer.

In the reception photographic shop 221 and the delivery photographic shop 222, there are installed a photographic image printing machine 100A, 100B which is comprised of a photographic image scanner 101, a monitor 102 and a printer 103, and a personal computer 227, 228 connected to the photographic image printing machine. The photographic image printing machine 100A, 100B performs the printing process of photographic images, and the personal computer 227, 228 performs the data processing and the transmission or reception process of data.

In practice, in the reception photograph shop 221, the user who requests the printing of photographic images (hereinafter referred to as a printing request user) brings a film cartridge 10 containing an exposed APS film. If the user requests the printing of photographic images exposed on the APS film, the APS film is developed to produce an APS negative film.

In the reception photograph shop 221, a photographic image printing machine (hereinafter referred to as a reception shop photographic image printing machine) 100A performs the printing process as shown in FIGS 12 to 21, using the APS negative film, whereby the print photograph shops and the index print as shown in FIGS. 22 and 23 are produced from the photographic images of the APS negative film.

In the reception photograph shop 221, the delivery date and time for the print photograph shops is designated at the time of requesting the printing of photographic images. If the printing request user comes to the shop again after the delivery date and time for the print photographs, a plurality of print photograph shops and an index print, together with a film cartridge 10 containing the APS negative film, are delivered to the printing request user, in exchange of the development cost of the APS film and the printing cost of the print photographs.

By the way, the reception shop photographic image printing machine 100A produces the photographic image data from the photographic images of the APS negative film in the printing process of the photographic images, produces the film data D15 from the produced photographic image data, and sends the film data D15 to a personal computer (hereinafter referred to as a reception shop personal computer) 227.

If the reception shop personal computer 227 is given the film data D15 from the reception shop photographic image printing machine 100A, the reception shop personal computer 227 saves the film data D15 in a reception shop server 229, produces the index data D16 of the index image for displaying in thumb-nail the photographic images of equivalent composition and quality to the print photograph shops on the basis of the film data D15, and saves the produced index data D16 in the reception shop server 229.

In the reception photograph shop 221, when the printing process of photographic images is finished or when the printing request user does not come to the shop to receive the print photograph shops even greatly beyond the designated date and time of delivery, the reception shop personal computer 227 reads the corresponding index data D16 from the reception shop server 229, produces the notification data EM1 for electronic mail indicating the end of the printing process of photographic images, using the read index data D16, and then sends the thus-produced notification data EM1 via a public line network (not shown) to a personal computer 230 owned by the printing request user.

Thereby, in the reception photograph shop 221, the printing request user is notified on the monitor screen of the personal computer 230 that the printing process of photographic images has been finished, and can visually confirm the printed state of photographic images (i.e., a finished state of print photographs) by displaying the index image on the monitor.

In addition, in the reception photograph shop 221, if a request for the forwarding of print photograph shops is made by the user who desires the forwarding of print photograph shops (hereinafter referred to as a forwarding request user), the film data D15 is produced from the APS negative film (or APS film) which the forwarding request user has carried in, using the reception shop photographic image printing machine 100A. Then, the reception shop personal computer 227 sends the film data D15 via the reception shop side service provider 223, the Internet 225 and the delivery shop side service provider 224 to a photograph shop (referred to as a delivery photograph shop) 222 located closest to the user to whom the forwarding of print photograph shops is made (hereinafter referred to as a photograph shop reception user).

In this connection, in the reception photograph shop 221, when the film data D15 to be transferred upon a request of forwarding the print photograph shops has been already produced and saved in the reception shop server 229, the reception shop personal computer 227 reads out the corresponding film data D15 from the reception shop server 229, and sends the read film data D15 via the reception shop side service provider 223, the Internet 225 and the delivery shop side service provider 224 to the delivery photograph shop 222.

In the delivery photograph shop 222, the personal computer (referred to as a delivery shop personal computer) 228 receives the film data D15 transmitted from the reception photograph shop 221 and temporarily saves the received film data D15 in a delivery shop server 231. Also, the delivery shop personal computer 228 produces the index data D16 on the basis of the film data D15 and saves the index data D16 in the delivery shop server 231.

In the delivery photograph shop 222, the delivery shop personal computer 228 reads out the index data D16 from the delivery shop server 231, produces the notification data EM2 for electronic mail indicating the forwarding of print photographs, using the read index data D16, and transmits the produced notification data EM2 via the public line network (not shown) to a personal computer 232 owned by the photograph shop receipt user.

Thereby, in the delivery photograph shop 222, the photograph shop receipt user is notified on the monitor screen of the personal computer 232 that the print photograph shops have been forwarded to the address of the photograph shop receipt user, and can visually confirm the print photograph shops which are forwarded by displaying the index image on the monitor screen.

In the delivery photograph shop 222, the delivery shop personal computer 228 reads out the film data D15 from the delivery shop server 231, and forwards the read film data D15 to a photographic image printing machine (referred to as a delivery shop photographic image printing machine) 100B.

The delivery shop photographic image printing machine 100B produces the photographic image data for printing and the index image data, on the basis of the converted photographic image data of the film data D15 and the corresponding photographic image header data, so that the photographic image based on the converted photographic image data can be reproduced faithfully to the printing condition specified by the reception photograph shop 221 and/or the forwarding request user on the basis of the photographic image header data, thereby producing the print photograph shops and the index print on the printing paper.

Thereby, in the delivery photograph shop 222, the print photograph shops and the index print are delivered to the user when the photograph shop receipt user comes to the shop, or mailed to the address of the photograph shop receipt user.

Thus, in the photographic image commercial transactions system 220, the print photograph shops and the index print can be easily forwarded to the acquaintance located far away from the forwarding request user (referred to as a photograph shop receipt user), instead of the forwarding request user.

On the other hand, in the reception photograph shop 221, if the sale of the photographic images is requested by the user who desires the sale of the photographic images (referred to as a sale request user), the reception shop photographic image printing machine 100A is used to produce the film data S15 from the APS negative film (or APS film) which the sale request user has carried in, and also produce the index data D16 from the film data D15. The reception shop personal computer 227 saves the film data D15 and the index data D16 in the reception shop server 229, and publicizes the photographic images to be sold over the Internet 225, on the basis of the index data D16.

In this connection, in the reception photograph shop 221, when the index data D16 for use in the publication of photographic images has been already produced upon a request of selling the print photograph shops from the sale request user and saved in the reception shop server 229, the reception shop personal computer 227 reads out the corresponding index data D16 from the reception shop server 229, and makes public the photographic images to be sold over the Internet 225.

That is, if the reception shop personal computer 227 receives a request of reading the index data D16 from the personal computer 232 of the user who desires to purchase the photographic images (referred to as a purchasing demand user) via the delivery shop side service provider 224, the Internet 225 and the reception shop side service provider 223, the reception shop personal computer 227 reads out the corresponding index data D16 from the reception shop server 229 in accordance with the reading request, and transmits the read index data D16 via the reception shop side service provider 223, the Internet 225 and the delivery shop side service provider 224 to the personal computer 232 of the purchasing demand user.

Thereby, the personal computer 232 of the purchasing demand user displays the index image based on the received index data D16 on the monitor screen, thereby enabling a desired image to be selected and designated from among the photographic images to be sold displayed in thumbnail.

If a desired photographic image for the purchasing demand user is selected and designated to purchase, on the basis of the index image displayed on the monitor screen, the personal computer 232 of the purchasing demand user produces the notification data EM3 for electronic mail indicating the photographic image that has been selected and designated, and transmits the notification data EM3 via the public line network to the delivery shop personal computer 228 in the delivery photograph shop 222 to notify the delivery photograph shop 222 of a request of purchasing the print photographs, In the delivery photograph shop 222, upon accepting the request of purchasing the photographic images, the delivery shop personal computer 228 reads out the corresponding film data D15 from the reception shop personal computer 227 of the reception photograph shop 221 via the delivery shop side service provider 224, the Internet 225 and the reception shop side service provider 223, and sends the read film data D15 to the delivery shop photographic image printing machine 100B, which then produces the print photograph shops of the photographic images desired by the purchasing demand user on the basis of the film data D15.

Thereby, in the delivery photograph shop 222, the photographic images that the purchasing demand user desires to purchase are made the print photographs, and when the purchasing demand user comes to the shop, the print photograph shops are delivered, or mailed to the user's address. Incidentally, in the delivery photograph shop 222, the index print is produced in addition to the print photographs, and can be delivered to the purchasing demand user.

Thus, in the photographic image commercial transactions system 220, the photographic images taken by the selling request user such as a photographer can be readily sold to the remote customer (purchasing demand user), for example.

In addition to such a configuration, in the case of this photographic image commercial transactions system 220, when the film data D15 is transmitted in the reception photograph shop 221, the reception shop personal computer 227 produces the billing information including the credit card number of registration owned by the forwarding request user, selling request user or purchasing request user, the account number of the bank with which the reception photograph shop 221 has an account, and the forwarding fee in accordance with the forwarding or selling form of the print photographs, and transmits this billing information appended to the film data D15.

For example, when the film data D15 is sent, the reception shop side service provider 223 retrieves the billing information from the film data D15, and transmits this billing information as the chargeable data D20 via the Internet 225 to the banking agent 226.

Thereby, the banking agent 226 performs the charge accounting process for the forwarding of print photograph shops or the sale of photographic images on the basis of the chargeable data D25 supplied from the reception shop side service provider 223. As a result of the charge accounting process, the banking agent 226 electronically transfers the funds from one account to another for transactions among the forwarding request user, sale request user, purchasing demand user, reception-photograph shop 221, delivery photograph shop 222, reception shop side service provider 223 and delivery shop side service provider 224, thereby settling accounts for the forwarding of print photograph shops or the sale of photographic images, so that the electronic commercial transactions for the forwarding of print photograph shops or the sale of photographic images can be concluded.

In this connection, in the photographic image commercial transactions system 220, at the time of requesting the forwarding of print photographs, for example, the forwarding fee for the print photograph shops and the index print is paid from the account of the forwarding request user to the account of the reception photograph shop 221, the printing fee for the print photograph shops is paid to the account of the delivery photograph shop 222, and the service charge is paid to each account of the reception shop side service provider 223 and the delivery shop side service provider 224.

In the photographic image commercial transactions system 220, when there is a request for the sale of photographic images, for example, the printing fee for the print photograph shops is paid from the account of the purchasing demand user to the account of the delivery photograph shop 222, the selling price for the print photograph shops is paid to the account of the selling request user, a part of the selling price being paid as the forwarding fee for the print photograph shops and the index print from the account of the selling request user to the account of the reception photograph shop 221, and the service charge is paid to each account of the reception shop side service provider 223 and the delivery shop side service provider 224.

The personal computer 230 for the forwarding request user and the selling request user accepts the index data D16 from the reception shop personal computer 227 of the reception photograph shop 221 via the reception shop side service provider 223, and displays the index image based on the index data D16 on the monitor screen of the personal computer 230, whereby the user can visually confirm the print photograph shops to be forwarded and the photographic images to be sold on the monitor screen.

In the delivery photograph shop 222, the delivery shop personal computer 228 reads periodically the index data D16 from the reception shop personal computer 227, and sends the read index data D16 to the personal computer 232 of the purchasing demand user, whereby it is possible to introduce a variety of kinds of photographic images to be sold to the purchasing demand user on the monitor screen of the personal computer 232.

Further, in the delivery photograph shop 222, the delivery shop personal computer 228 reads a variety of kinds of index data D16 from the reception shop personal computer 227, and saves the read index data D16 in the delivery shop server 231. Also, the delivery shop personal computer 228 reads periodically the index data D16 from the delivery shop server 231, and provides the read index data D16 to the personal computer 232 of the purchasing demand user, whereby it is possible to introduce a variety of kinds of photographic images that are sellable to the purchasing demand user.

(4) First Embodiment

Figure 25:
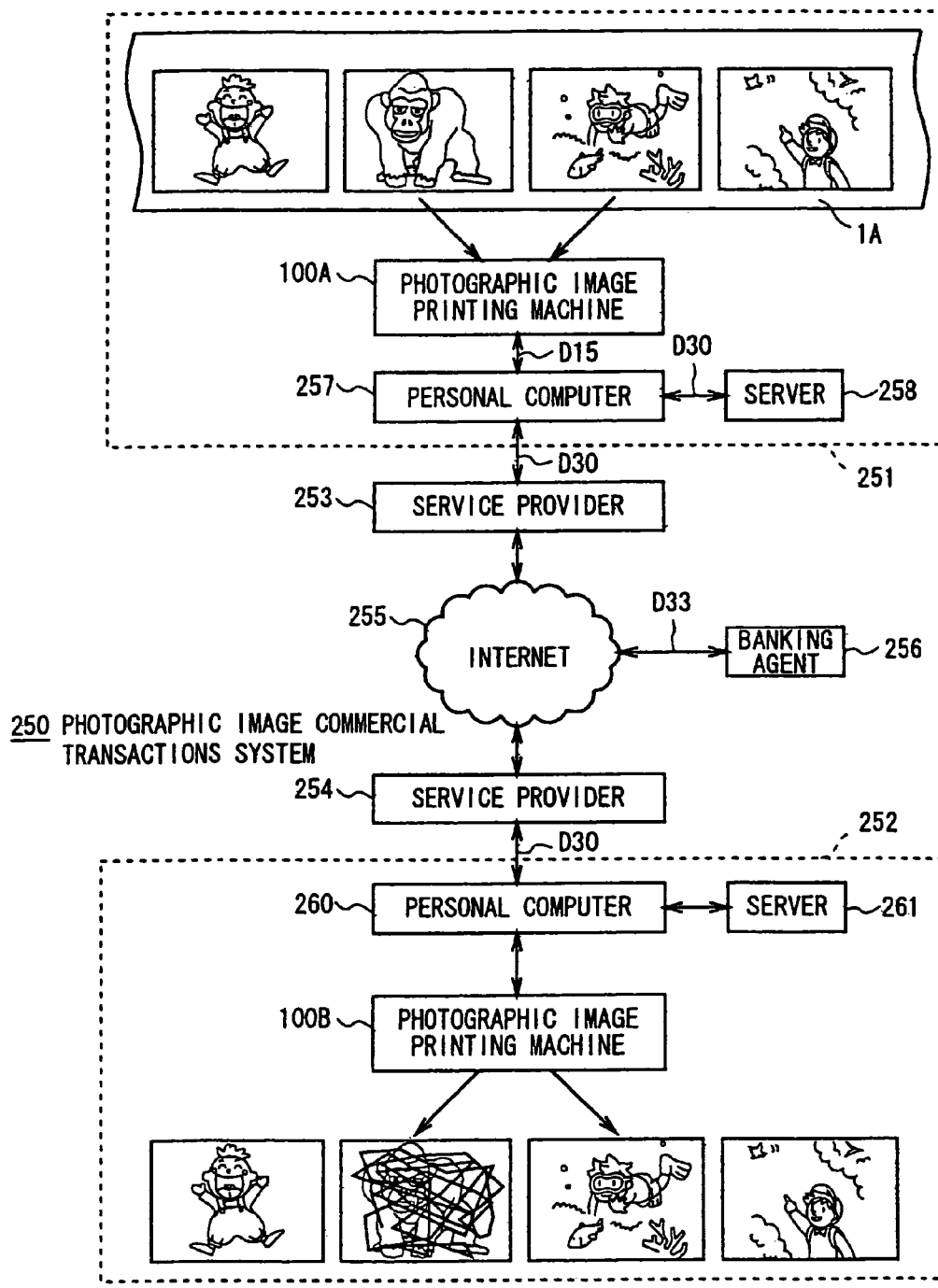
FIG. 25 is a block diagram showing a configuration of a photographic image commercial transactions system according to a first embodiment.

In FIG. 25, reference numeral 250 denotes a photographic image commercial transactions system as a whole according to a first embodiment of the invention. A reception photograph shop 251 and a delivery photograph shop 252 are connected via a network consisting of a reception shop side service provider 253 and a delivery shop side service provider 254, as well as the Internet 255, with a banking agency 256 connected to the Internet 255.

In the reception photograph shop 251, there are provided a reception shop photographic image printing machine 100A, a reception shop personal computer 257, and a reception shop server 258. Also, in the delivery photograph shop 252, there are provided a delivery shop photographic image printing machine 100B, a delivery shop personal computer 260, and a delivery shop server 261.

In the reception photograph shop 251, at the time of requesting the forwarding of print photographs, like the reception photograph shop 221 of the photographic image commercial transactions system 220 as shown in FIG. 24, the reception shop personal computer 257 is enabled to transmit the film data D15 comprised of the converted photographic image data, the photographic image header data having the printing condition, and the film header data.

In the reception photograph shop 251, at the time of requesting the forwarding of print photographs, if the photographic images to be forwarded and the photographic image not to be forwarded are specified among the photographic images of the APS negative film 1A, the reception shop personal computer 257 performs, for the film data D15 supplied from the reception shop photographic image printing machine 100A, a scrambling process for making the photographic images not to be forwarded an obscure (dim impression) state (referred to as a scrambled state), or a masking process for making the photographic images not to be forwarded white over the entire area of the image, or an invisible state (referred to as a masked state. A photographic image to be forwarded is replaced with another image or overlapped by another image and the upper one is displayed.), thereby producing the film data for forwarding D30. Instead of the scrambling process, it is also possible to apply an enciphering process.

The reception shop personal computer 257 saves the film data for forwarding D30 in the reception shop server 258, and transmits the film data for forwarding D30 via the reception shop side service provider 253, the Internet 255 and the delivery shop side service provider 254 to the delivery shop personal computer 260.

If the delivery shop personal computer 260 is given the film data for forwarding D30 from the reception shop personal computer 257, the delivery shop personal computer 260 saves the film data for forwarding D30 in the delivery shop server 261, and sends the film data for forwarding D30 to the delivery shop photographic image printing machine 100B.

Thereby, the delivery shop photographic image printing machine 100B prints on the printing paper the photographic images based on the converted photographic image data from the film data for forwarding D30, faithfully to the printing condition specified at the reception shop in accordance with the photographic image header data of the film data for forwarding D30, thereby producing the print photograph shops and the index print.

Thus, in the delivery photograph shop 253, the index print in which the photographic images to be forwarded that are designated by the forwarding request user are only made visible, and the remaining photographic images not to be forwarded are made a scrambled or masked state, among the photographic images of the APS negative film 1A, and the print photograph shops in which the photographic images to be forwarded are only printed, are delivered to the photograph shop recipient user.

By the way, in the reception photograph shop 251, at the time of forwarding the print photographs, the delivery shop side settling information including the account number of transaction for the delivery photograph shop 252, the printing fee of photographic images and so on is supplied from the delivery photograph shop 252. To the delivery shop side settling information, the billing information is produced by appending the reception shop side settling information including the credit card number of registration owned by the forwarding request user, the account number of transaction for the reception photograph shop 251, the account number s of transaction for the reception shop side service provider 253 and the delivery shop side service provider 254, and the forwarding fee in accordance with the number of forwarding the print photograph shops and the forwarding form. This billing information is saved in the film data for forwarding D30 and transmitted to the reception shop side service provider 253.

If the film data for forwarding D30 is transmitted from the reception photograph shop 251, the reception shop side service provider 253 retrieves the billing information from the film data for forwarding D30, and transmits this billing information as the chargeable data D33 via the Internet 255 to the banking agent 256.

Thereby, the banking agent 256 performs the charging process on the basis of the chargeable data D33 supplied from the reception shop side service provider 253, and executes the electronic settling process for forwarding the print photograph shops based on the results of the charging process, thereby closing an electronic commercial transaction for forwarding the print photographs.

Figure 26:
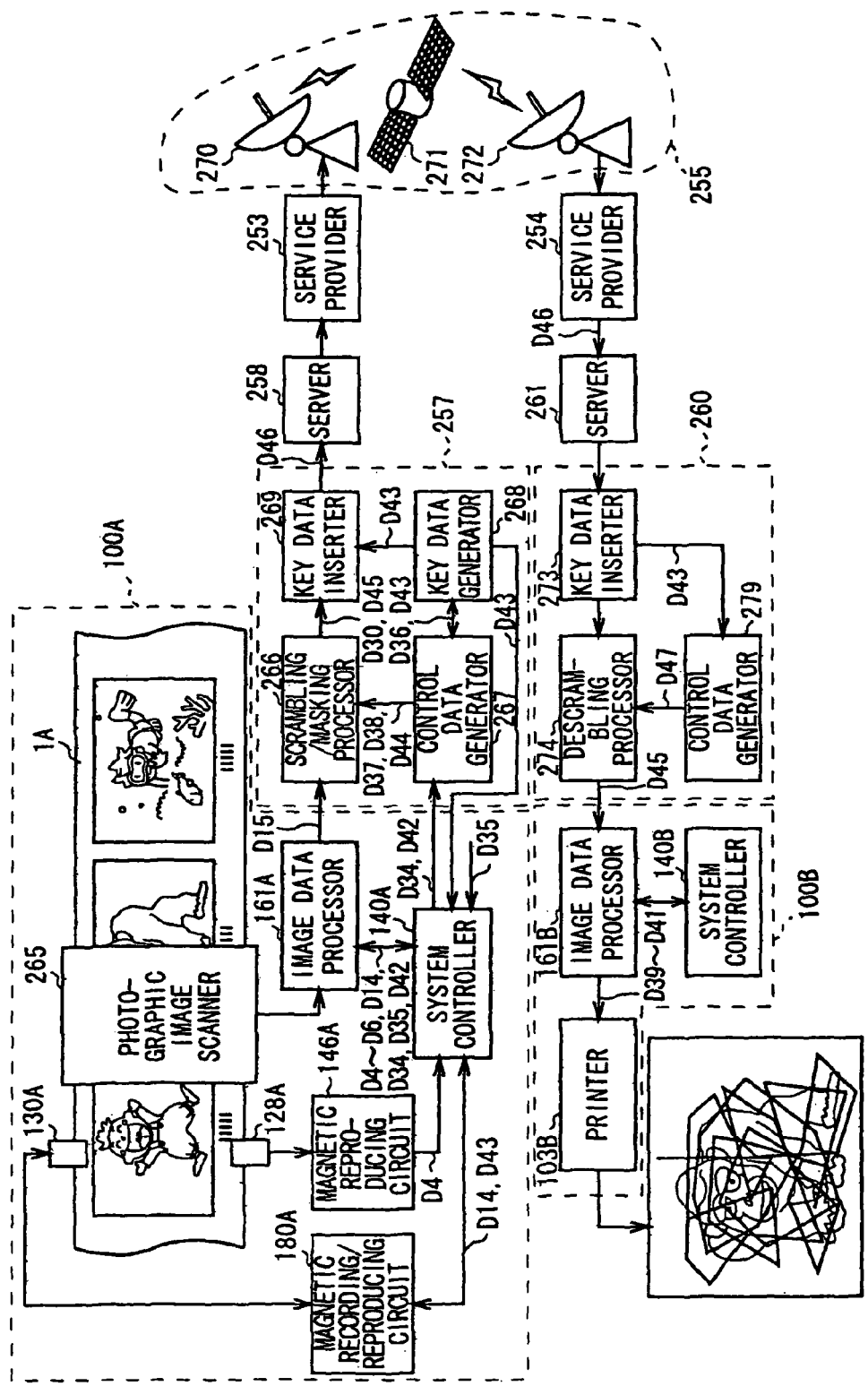
FIG. 26 is a block diagram showing a circuit configuration of a photographic image commercial transactions system.

In practice, in the reception shop photographic image printing machine 100A, as shown in FIG. 26, the photographic images of the APS negative film 1A are optically read in the order of frame number by means of a photographic image scanner 265 comprised of the optics from the lamp 122 to the charge coupled device 169, as shown in FIG 14, and the driver/controller thereof, and a photoelectric signal S1 as acquired is sent to an image data processor 161A.

At this time, the system controller 140A controls the magnetic reproducing circuit 146A to reproduce the user data D4 from the user's camera using area 6 (FIG. 2) of the APS negative film 1A by means of a magnetic head for user data 128A, and send the reproduced user data D4 to the image data processor 161A, as well as to send the frame number data D6 and the initial data D5 reproduced from the user's camera using area 6 and the laboratory using area 7 (FIG. 2) of the APS negative film 1A to the image data processor 161A.

The system controller 140A generates the laboratory data D14 on the basis of the printing condition set up by the forwarding request user or the printing operator of the reception photograph shop 251, and the user data D4, and sends the generated laboratory data D14 to the image data processor 161A.

In this connection, the system controller 140A controls the laboratory data D14 to be sent via the magnetic recording/reproducing circuit 180A to the magnetic head for laboratory data 130A, and saved in the laboratory using area 7 of the APS negative film 1A by means of the magnetic head for laboratory data 130A, whereby it is possible to preserve the history as to the printing condition in the APS negative film 1A as the laboratory data D14.

The system controller 140A controls the laboratory data D14 to be reproduced by the magnetic recording/reproducing circuit 180A via the magnetic head for laboratory data 130A, and sent to the image data processor 161A, when the APS negative film 1A is used to reprint the print photographs, because the laboratory data D14 has been already recorded in the laboratory using area 7.

In addition, the system controller 140A controls the remote controller 162 (FIG 14) to choose the photographic images to be forwarded and the photographic images not to be forwarded among the photographic images of the APS negative film 1A, and has received the selection specifying data D34 for specifying the scrambling or masking process for the photographic images not to be forwarded, whereby the system controller 140A sends the input selection specifying data D34 to the image data processor 161A.

The system controller 140A is provided with the transmission data D35 including the reception photograph shop ID or the reception shop side service provider ID from a predetermined circuit (not shown) of the reception shop personal computer 257, and also sends the transmission data D35 to the image data processor 161.

Thereby, the image data processor 161A produces the converted photographic image data of the photographic image exposed on the APS negative film 1A on the basis of a photoelectric signal S1 passed from the photographic image scanner 265, and produces the photographic image header data including the printing condition on the basis of the user data D4, the frame number data D6, the laboratory data D14 and the selection specifying data D34 corresponding to the converted photographic image data, thereby appending the produced photographic image header data to the corresponding converted photographic image data.

In this way, the image data processor 161A produces the converted photographic image data and the photographic image header data in accordance with all the photographic images of the APS negative film 1A. Then, the image data processor 161A generates the film header data including the billing information on the basis of the initial data D5 and the transmission data D35, and appends the generated film header data to the top of the series of data consisting of the converted photographic image data and the photographic image header data, thereby sending the thus-obtained film data D15 to a scrambling/masking processor 266 in the reception shop personal computer 257.

In this connection, the image data processor 161A sends the film header data and/or photographic image header data to the system controller 140A, which then controls the magnetic recording/reproducing circuit 180A to record the film header data and/or photographic image header data in the laboratory using area 7 of the APS negative film 1A by means of the magnetic head for laboratory data 130A. Hence, the history of the transmission of the film data D15 can be preserved in the APS negative film 1A.

Herein, in the reception shop personal computer 257, the selection specifying data D34 supplied from the system controller 140A of the reception shop photographic image printing machine 100A is received by a control data generator 267.

The control data generator 267 reads the predetermined key data D36 from a key data generator 268, and produces the scramble control data D37 for use in the scrambling process on the basis of the read key data D36, thereby sending the scramble control data D37 to a scrambling/masking processor 266, when it is specified to perform the scrambling process for the photographic images not to be forwarded on the basis of the selection specifying data D34.

The control data generator 267 sends the masking control data D38 stored in advance for use in the masking process to the scrambling/masking processor 266, when it is specified to perform the masking processing for photographic images not to be forwarded on the basis of the selection specifying data D34.

Thereby, the scrambling/masking processor 266 performs the scrambling/masking process only for the converted photographic image data of the photographic images not to be forwarded among the converted photographic image data of the film data D15 supplied from the image data processor 161A of the reception shop photographic image printing machine 100A, on the basis of the corresponding scramble control data D37 or masking control data D38 supplied from the control data generator 267.

The scrambling/masking processor 266 saves the information indicating whether the scrambling process or masking process is performed for the converted photographic image data corresponding to all the photographic image header data, and thereby saves the film data for forwarding D30 consisting of the converted photographic image data having passed through the scrambling process or masking process and the converted photographic image data of photographic images to be forwarded, via a key data inserter 269 in the reception shop server 258.

And the reception shop server 258 reads the film data for forwarding D30 under the control of the reception shop personal computer 257, and sends the film data for forwarding to the reception shop side service provider 253.

Thus, the reception shop side service provider 253 transmits the film data for forwarding D30 supplied from the reception shop server 258 via a transmitter 270, a communication satellite 271 and a receiver 272 that constitutes the Internet 255 to the delivery shop side service provider 254.

The delivery shop side service provider 254 sends the received film data for forwarding D30 to the delivery shop server 261 of the delivery photograph shop 252 (FIG. 25). The delivery shop server 261 saves the film data for forwarding D30 supplied from the delivery shop side service provider 254, and reads out and reads and sends the saved film data for forwarding D30 to the delivery shop personal computer 260 under the control of the delivery shop personal computer, 260.

Then the delivery shop personal computer 260 sends the film data for forwarding D30 read from the delivery shop server 261 via a key data extractor 273 and a descrambling processor 274 to the image data processor 161B of the delivery shop photographic image printing machine 100B.

Thereby, the image data processor 161B produces the printing photographic image data D39 for the photographic images faithfully to the printing condition specified in the reception shop side, the printing condition data D40 and the index image data D41 on the basis of the film data for forwarding D30 under the control of the system controller 140B, and sends the printing photographic image data D39 for the photographic images, the printing condition data D40 and the index image data D41 to the printer 103B.

Figure 27:
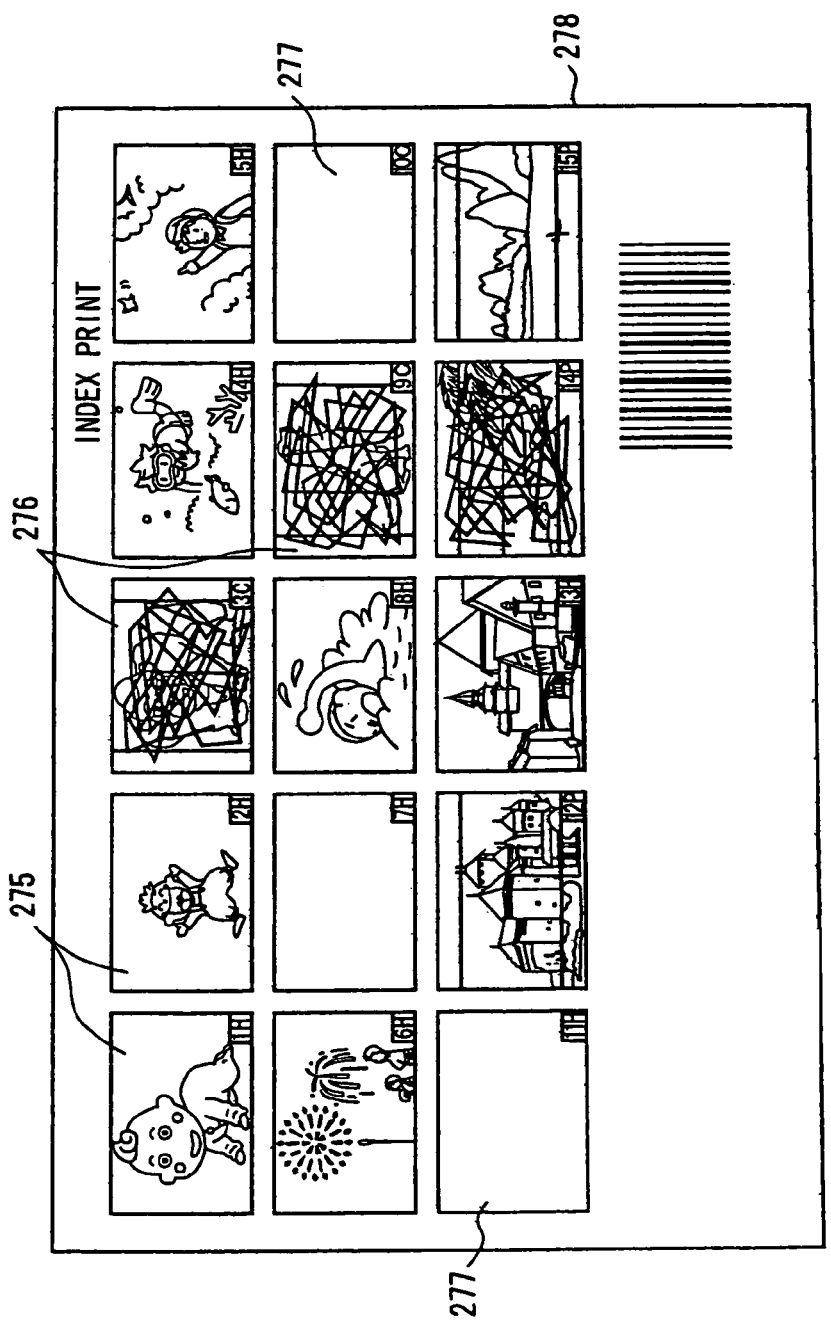
FIG. 27 is a schematic view showing a configuration of an index print.

Thus, the printer 103B produces the print photograph shops for the photographic images to be forwarded, and produces an index print 278 in which the photographic images in visible state to be forwarded 275, and the photographic images in scrambled state not to be forwarded 276 and/or the photographic images in masked state not to be forwarded 277 are printed as the index, as shown in FIG. 27.

In addition, in the case of this photographic image commercial transactions system 250, the system controller 140A of the reception shop photographic image printing machine 100A sends the selection specifying data D34 and the scramble transmission data D42 to the image data processor 161A and the control data generator 267 of the reception shop personal computer 257, if the selection specifying data D34 as well as the scramble transmission data D42 for specifying to transmit the photographic images to be forwarded having undergone the scrambling process are input via the remote controller 162, in producing the film data D15.

The image data processor 161A produces the converted photographic image data on the basis of a photoelectric signal S1 supplied from the photographic image scanner 265, and then produces the photographic image header data on the basis of the user data D4, the frame number data D6, the laboratory data D14, the selection specifying data D34 and the scramble transmission data D42 corresponding to the converted photographic image data, thereby appending the photographic image header data to the corresponding converted photographic image data.

In this way, the image data processor 161A produces the converted photographic image data and the photographic image header data in accordance with all the photographic images of the APS negative film 1A. Then the image data processor 161A appends the film header data to the top of the series of data consisting of the converted photographic image data and the photographic image header data, and sends the thus-obtained film data D15 to the scrambling/masking processor 266 of the reception shop personal computer 257.

In this connection, the system controller 140A reads the key data D43 used to effect the scrambling process for the photographic images to be forwarded from the key data generator 268 of the reception shop personal computer 257.

And the system controller 140A associates the key data D43 with the frame number of the photographic images to be forwarded, and sends the key data D43 together with the laboratory data D14 via the magnetic recording/reproducing circuit 180A to the magnetic head for laboratory data 130A, which then records the key data D43 and the laboratory data D14 in the laboratory using area 7 of the APS negative film 1A. Thereby, the system controller 140A can store the key data D43 for use in the transmission of the photographic images to be forwarded in addition to the history of transmission of the photographic images to be forwarded in the laboratory using area 7 of the APS negative film 1A.

On the other hand, the control data generator 267 of the reception shop personal computer 257 produces the scramble control data D37 or the masking control data D38 on the basis of the selection specifying data D34 supplied from the system controller 140A of the reception shop photographic image printing machine 100A, in the same manner as described above, and sends the scramble control data D37 or the masking control data D38 to the scrambling/masking processor 266.

The control data generator 267 reads the key data D43 from the key data generator 268 on the basis of the scramble transmission data D42 supplied from the system controller 140A, produces the scramble control data D44 for the photographic images to be forwarded on the basis of the read key data D43, and sends the scramble control data D44 to the scrambling/masking processor 266, as well as supplying the key data D43 from the key data generator 268 to the key data inserter 269.

Thereby, the scrambling/masking processor 266 performs the scrambling/masking process for the converted photographic image data of the photographic images not to be forwarded among the converted photographic images of the film data D15 supplied from the image data processor 161A, on the basis of the corresponding scramble control data D37 or masking control data D38.

The scrambling/masking processor 266 performs the scrambling process for the converted photographic image data for the photographic images to be forwarded among the converted photographic images of the film data D15, on the basis of the scramble control data D44, and sends the thus-obtained film data for transmission D45 to the key data inserter 269.

And the key data inserter 269 saves the key data D43 supplied from the key data generator 268 in the photographic image header data appended to the converted photographic image data for the photographic images to be forwarded among the photographic image header data obtained on the basis of the film data for forwarding D45, and sends the thus-obtained film data for forwarding D46 to the reception shop server 258, where the film data for forwarding D46 is saved.

Thus, the film data for forwarding D46 saved in the reception shop server 258 is read from the reception shop server 258 under the control of reception shop personal computer 257, and passed via the reception shop side service provider 253, the transmitter 270, the communication satellite 271, the receiver 272 and the delivery shop side service provider 254 to the delivery shop server 261, where the film data for forwarding D46 is saved, while the film data for forwarding D46 is read from the delivery shop server 261 under the control of the delivery shop personal computer 260 and supplied to the key data extractor 273.

The key data extractor 273 extracts the key data D43 from the photographic image header data appended to the converted photographic image data for the photographic images to be forwarded among the photographic image header data contained in the film data for forwarding D46 supplied from the delivery shop server 261, sends the extracted key data D43 to the control data generator 279, and sends the film data for forwarding D46 to the descrambling processor 274.

The control data generator 279 produces the descramble control data D47 to restore the original photographic image from the photographic image in scrambled state to be forwarded, on the basis of the key data D43 supplied from the key data extractor 273, and sends the descramble control data D47 to the descrambling processor 274.

And the descrambling processor 274 performs the descrambling process for the converted photographic image data of the photographic images to be forwarded among the converted photographic image data contained in the film data for forwarding D46 supplied from the key data extractor 273, in accordance with the descramble control data D47 supplied from the control data generator 279, and sends the thus-obtained film data for forwarding D45 to the image data processor 161B of the delivery shop photographic image printing machine 100B.

Thereby, the image data processor 161B produces the printing photographic image data D39 of each photographic image, the printing condition data D40, and the index image data D41 on the basis of the film data for forwarding D42 under the control of the system controller 140B, sends the printing photographic image data D39 of each photographic image, the printing condition data D40, and the index image data D41 to the printer 103B, which then prints the print photograph shops for the photographic images to be forwarded and the index print 278 as shown in FIG. 27.

In this way, in the photographic image commercial transactions system 250, the converted photographic image data for all the photographic images to be forwarded are subjected to the scrambling process, whereby the print photograph shops to be forwarded can be transferred with higher security.

And in this photographic image commercial transactions system 250, when the converted photographic image data for all the photographic images to be forwarded are subjected to the scrambling process, the forwarding fee is raised, for example, because more processing is performed for the converted photographic image data, in contrast to when the converted photographic image data for all the photographic images to be forwarded are sent without the scrambling process.

The system controller 140A of the reception shop photographic image printing machine 100A controls the image data processor 161A to produce the film data D15, on the basis of the selection forwarding data, selectively using only the converted photographic image data for the photographic images to be forwarded among all the converted photographic image data of the APS negative film 1A, if the selection forwarding data for selecting to forward only the photographic images to be forwarded is input via the remote controller 162.

Figure 28:
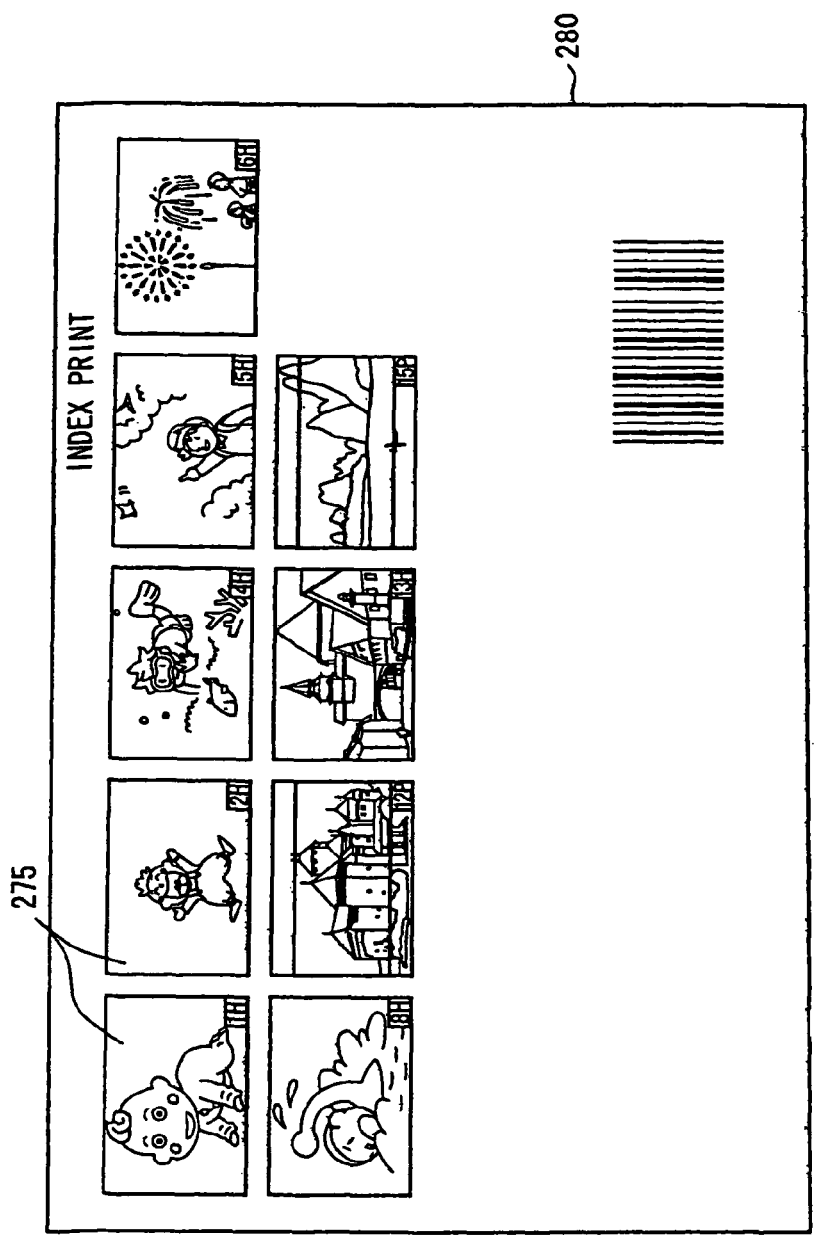
FIG. 28 is a schematic view showing a configuration of an index print.

Thereby, in the delivery photograph shop 252, when the film data D15 is transmitted, the delivery shop photographic image printing machine 100B can produce the print photograph shops for the photographic images to be forwarded, and an index print 280 having only the photographic images to be forwarded 275 printed, as shown in FIG. 28.

And in this reception photograph shop 251, when the film data D15 selectively including only the converted photographic image data for the photographic images to be forwarded is transmitted, the quantity of transmission data can be reduced as compared to that when the film data D15 including the converted photographic image data for the photographic images not to be forwarded is transmitted together with the converted photographic image data for the photographic images to be forwarded, whereby the forwarding fee of the print photograph shops can be lowered by the reduced quantity of transmission data.

Figure 29:
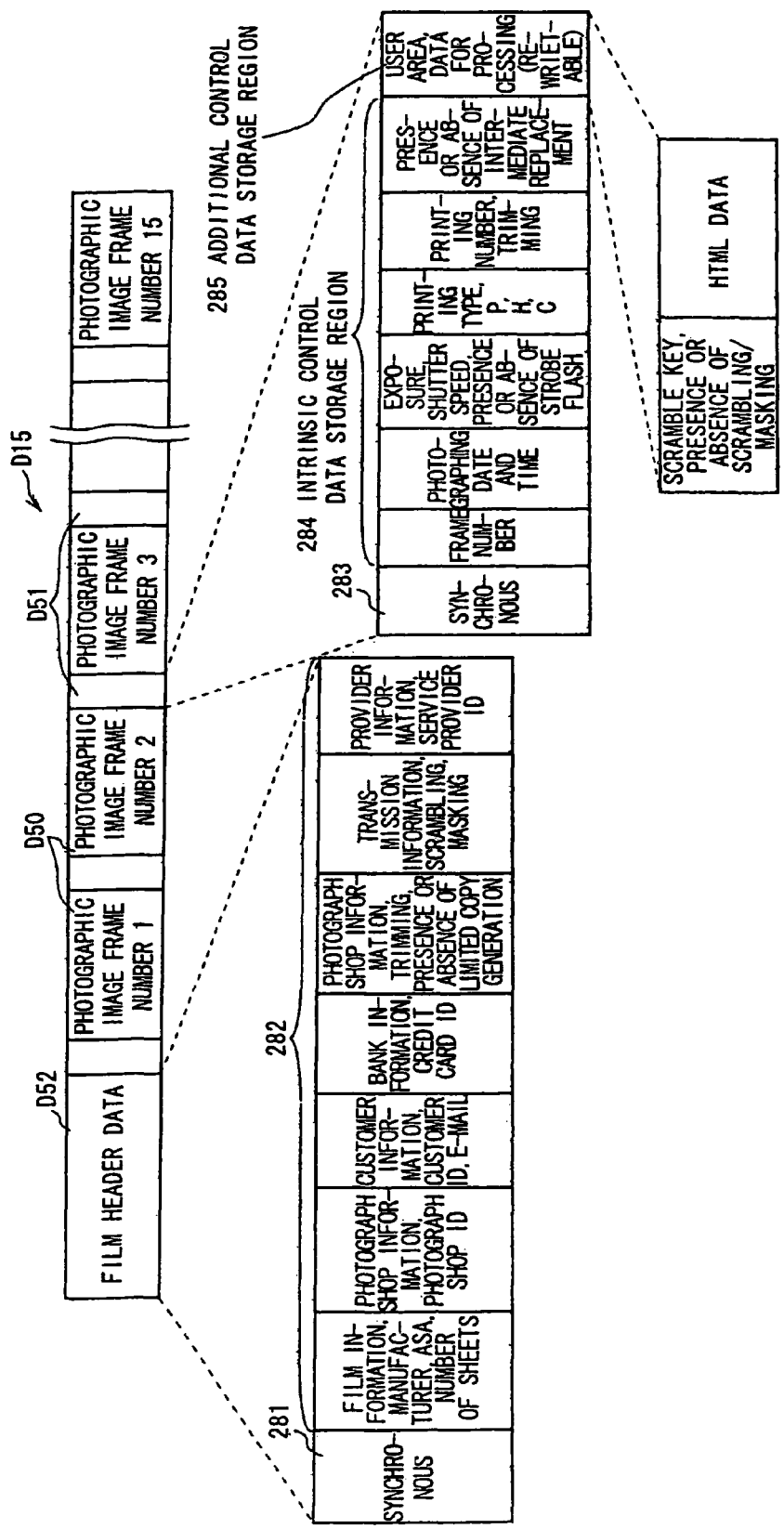
FIG. 29 is a schematic conception view showing a data format of film data according to a first embodiment.

By the way, the image data processor 161A of the reception shop photographic image printing machine 100A generates the film data D15 by appending the corresponding photographic image header data D51 to the header portion of the converted photographic image data D50, and further appending the film header data D52 to the top of the series of data consisting of the converted photographic image data D50 with the photographic image header data D51 appended, as shown in FIG. 29.

Herein, the film header data D52 consists of a sync data storage region 281 for storing the sync data of the film data D15, and a film header information storage region 282.

And the film header information storage region 282 can store some information that the forwarding request user or reception photograph shop 251 selects from among various kinds of billing information concerning the film information, photograph shop information, customer (forwarding request user) information, bank information, photograph shop information, transmission information or provider information.

In this connection, the film information consists of the allowable photographing number of APS film, or the number of photographic images to be forwarded, the film ID of APS film, the manufacturer's name of APS film, and the ISO speed. The photograph shop information consists of the ID assigned in advance to the reception photograph shop 251 and/or delivery photograph shop 252. The customer information consists of the forwarding request user's ID (e.g., APS camera ID owned by forwarding request user), the electronic mail address and the Internet homepage Uniform Resource Locator (URL) address created by the forwarding request user, the electronic mail address of photograph shop recipient user, and the Internet homepage URL address created by, the photograph shop recipient user.

The bank information consists of the credit card number of registration or the account number of the bank for the credit card owned by the forwarding request user, the credit card number of registration or the account number of the bank for the credit card owned by the photograph shop recipient user, the account number of the bank with which the reception photograph shop 251 has an account, the account number of the bank with which the delivery photograph shop 252 has an account, the account numbers of the banks with which the reception shop side service provider 253 and the delivery shop side service provider 254 have an account, the forwarding fee in accordance with the number of print photograph shops forwarded or the forwarding form, and the service charge that arose at the delivery photograph shop 252 in accordance with the forwarding of print photographs. The photograph shop information consists of the presence or absence of trimming the print photographs, and the information as to whether or not there is limited copy generation for the print photographs.

Further, the transmission information consists of the information as to whether there is a scrambling or masking process for the converted photographic image data within the film data D15. The provider information consists of the IDs assigned in advance to the reception shop side service provider 253 and the delivery shop side service provider 254.

On the other hand, the photographic image header data D51 includes a sync data storage region 283 for storing the sync data of the corresponding converted photographic image data D50, an intrinsic control data storage region 284 for storing the control data intrinsic to the converted photographic image data D50 such as the printing condition (referred to as the intrinsic control data), and an additional control data storage region 285 for storing the new control data for processing the converted photographic image data D50 (referred to as the additional control data).

In practice, the intrinsic control data storage region 284 stores at least some information, as the intrinsic control data, which the forwarding request user or reception photograph shop 251 selects from among various kinds of information including the frame number, photographing data and time, stop value, shutter speed, exposure compensation, presence or absence of strobe flash, and photographing lens focal length, and the printing condition such as printing type, printing number, trimming information, and presence or absence of intermediate replacement of film cartridge.

The additional control data storage region 285 stores at least some information, as the processing control data, which the forwarding request user or reception photograph shop 251 selects from among various kinds of information including the information as to whether there is a scrambling or masking process for the corresponding converted photographic image data D50 and the key data D43 useful in the scrambling process to improve the security, whereby the reception shop and the deliver shop can make sure which processing has been performed for the corresponding converted photographic image data D50.

In this connection, the additional control data storage region 285 can store the Hyper Text Markup Language (HTML) data (tag) indicating the pasting position, for example, when a photographic image based on the corresponding converted photographic image data D50 is pasted at the home page of the Internet.

In the photographic image commercial transactions system 250, the film data for forwarding D45 can be transmitted to the personal computer owned by the photograph shop recipient user, whereby the corresponding photographic image can be readily linked to the home page of the photograph shop recipient user, on the basis of the HTML data.

By the way, in the reception photograph shop 251, the forwarding request user and/or the reception photograph shop 251 may arbitrarily choose some kinds of information from among various kinds of information stored in the film header data D52 of the film data D15 and various kinds of information stored in each photographic image header data D51, thereby reducing the quantity of information stored in the film header data D52 and the photographic image header data D51, whereby the amount of information in the film data D15 to be transmitted can be decreased to enable the setting for the cheaper forwarding fee of print photographs.

In the reception photograph shop 251, the intrinsic control data consisting of various kinds of information arbitrarily chosen can be only stored, with the sync data, in the photographic image header data D51, but the additional control data not stored. With this, the quantity of data in the film data D15 can be further reduced to enable the setting for the significantly cheaper forwarding fee of print photographs.

In this first embodiment of the invention, the reception photograph shop 251 and the delivery photograph shop 252 can store the film data for forwarding D45 and D46 in the reception shop server 258 and the delivery shop server 261, respectively, and thereafter read the film data for forwarding D45 and D46 freely in accordance with a request from the forwarding request user or the photograph shop recipient user, and transmit the read film data to the designated customer, while making the electronic settling process to close a commercial transaction.

The reception photograph shop 251 and the delivery photograph shop 252 can store in the reception shop server 258 and the delivery shop server 261, together with the film data for forwarding D45 and D46, a list of forwarding request users and photograph shop recipient users who employ the shop, or various kinds of information including the history of using the forwarding of print photographs, availability of printing, selection trend of film maker, the hobbies of forwarding request user and photograph shop recipient user, birth date, and wedding anniversary. Using these various kinds of information, a wide variety of services such as introduction of events or new products, and offering the premiums to the uses can be deployed to the forwarding request user and the photograph shop recipient user.

In the above configuration, in the photographic image commercial transactions system 250, the reception shop photographic image printing machine 100A of the reception photograph shop 251 produces the converted photographic image data D50 from each photographic image of the APS negative film 1A, and produces the photographic image header data D51 having the intrinsic control data that is generated on the basis of the user data D4 and the frame number data D6 recorded in the APS negative film 1A, and the printing condition set up by the forwarding request user or the reception photograph shop 251, thereby producing the film data D15 by appending the film header data D52 to the series of data obtained by appending the corresponding, photographic image header data D51 to each converted photographic image data D50.

In addition, in the reception photograph shop 251, the reception shop personal computer 257 performs the scrambling and/or masking process for the film data D15 generated by the reception shop-photographic image printing machine 100A, as required, and transmits the thus-obtained film data for forwarding D45 or D46 via the reception shop side service provider 253, the Internet 255 and the delivery shop side service provider 254 to the delivery photograph shop 252 at the destination.

And in the delivery photograph shop 252, the delivery shop personal computer 260 performs the descrambling process for the film data for forwarding D45 or D46, as required, produces the print photograph shops and an index print 278 or 280 in which the photographic image to be forwarded are printed by the delivery shop photographic image printing machine 100B, on the basis of the converted photographic image data D50 and the intrinsic control data contained in the obtained film data D15, and delivers the print photograph shops and the index print to the recipient (photograph shop recipient user) designated by the forwarding request user.

In this photographic image commercial transactions system 250, when the print photograph shops are forwarded upon request of the forwarding request user from the reception photograph shop 251 to the delivery photograph shop 252, the forwarding fee of the print photograph shops is calculated, and the electronic settling process is performed on the basis of the calculated forwarding fee to close an electronic commercial transaction for the forwarding of the print photographs.

Accordingly, in this photographic image commercial transactions system 250, the forwarding request user only makes a request of forwarding the print photograph shops at the reception photograph shop 251. Then, the photographic images to be forwarded are converted into the digital data (converted photographic image data D50) and transmitted directly via the Internet 255 from the reception photograph shop 251. Hence, the forwarding procedure of the print photograph shops can be significantly simplified without having to reprint the print photograph shops for forwarding or bring the reprint photograph shops to the mail company.

In the photographic image commercial transactions system 250, the print photograph shops for the photographic images to be forwarded are transmitted via the Internet 255, whereby the print photograph shops can be forwarded in shorter time to the recipient (photograph shop recipient user) than when the print photograph shops are mailed to the user's address.

Further, in the photographic image commercial transactions system 250, the photographic images based on the converted photographic image data D50 are printed on the printing paper in accordance with the intrinsic control data containing the printing condition (or handling condition) within the corresponding photographic image header data D51 in the delivery photograph shop 252. Hence, even if the photographic images to be forwarded are converted into the digital data and transmitted to the destination, the print photograph shops can be reproduced faithfully to the printing condition specified on the reception photograph shop 251 side.

And in the photographic image commercial transactions system 250, the forwarding fee taken upon request of forwarding the print photograph shops is paid totally by electronic settling. Hence, the electronic settling can eliminate the trouble of making several payments separately that arise in different sites, such as payment for the reprint charge of print photograph shops at the photograph shop or payment for the forwarding fee of print photograph shops at the mailing company, which are conventionally needed in forwarding the print photographs, and can significantly simplify the payment for the forwarding fee.

With the above configuration, in the reception photograph shop 251, the converted photographic image data D50 for the photographic images to be forwarded is produced, and the photographic image header data having the intrinsic control data containing the printing condition of the photographic images is produced. Then, the film data D15 comprised of the converted photographic image data D50 and the photographic image header data is transmitted via the network to the delivery photograph shop 252, to deliver the print photograph shops in which the photographic images are printed on the basis of the intrinsic control data, to the recipient. At this time, the forwarding fee is electronically settled by the banking agency 256. Consequently, even if the photographic images are transmitted in the form of digital data to the recipient, the print photograph shops can be reproduced on the basis of the intrinsic control data, faithfully to the printing condition specified by the forwarding side, and delivered to the customer, whereby a photographic image commercial transactions system can be materialized which is able to forward the print photograph shops to the intention of the forwarding side readily and securely.

(5) Second Embodiment

Figure 30:
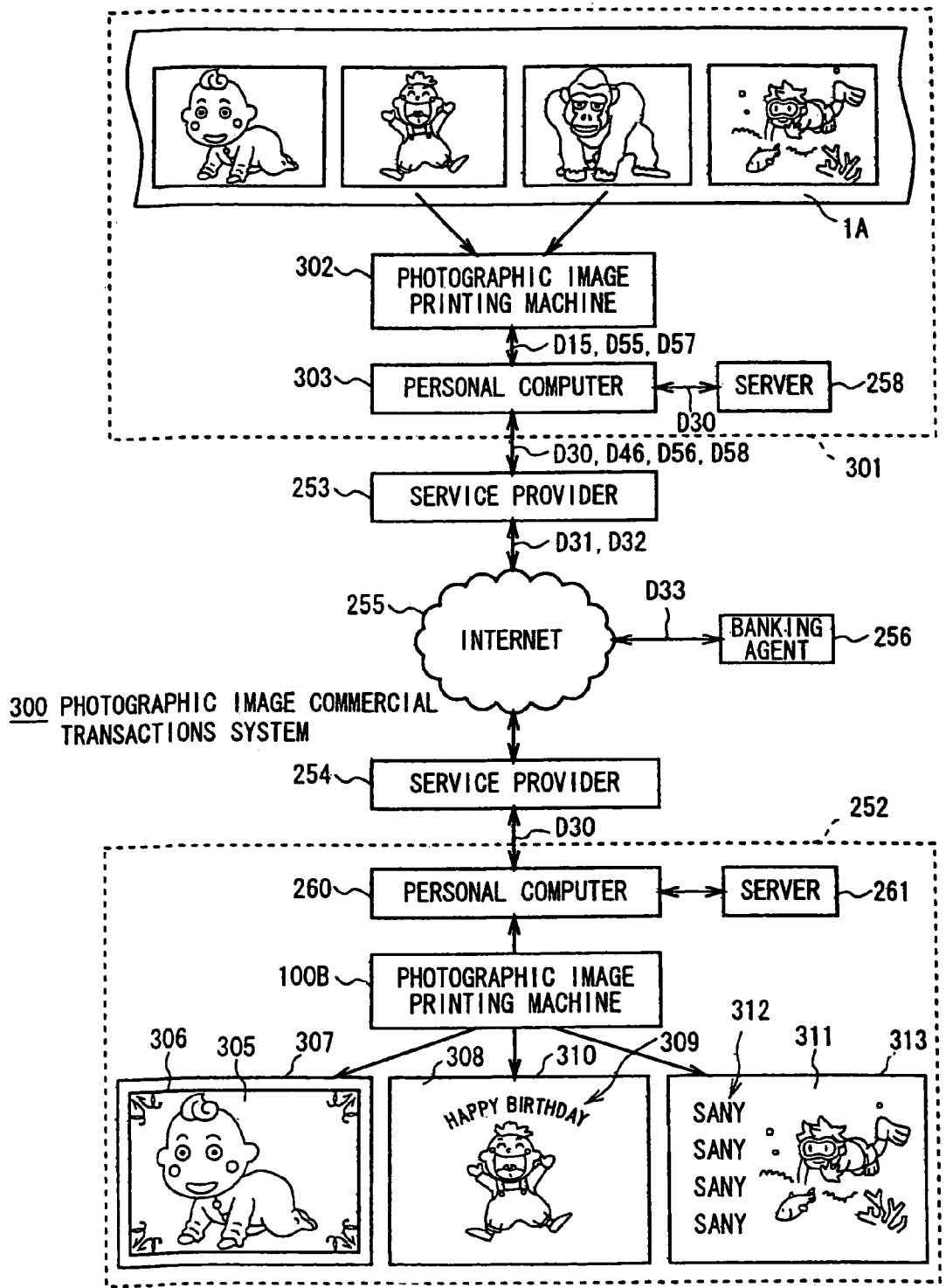
FIG. 30 is a block diagram showing a configuration of a photographic image commercial transactions system according to a second embodiment.

FIG. 30 illustrates a photographic image commercial transactions system 300 according to a second embodiment of the invention, wherein the corresponding parts are designated by the same numerals as in FIG 25. The photographic image commercial transactions system 300 according to the second embodiment is configured in the same manner as the photographic image commercial transactions system 250 according to the first embodiment, except for the configuration of a reception shop photographic image printing machine 302 and a reception shop personal computer 303 in a reception photograph shop 301.

In the reception photograph shop 301, the reception shop photographic image printing machine 302 receives, upon a request of forwarding the print photographs, the processing indication data D55 including the frame number data, the frame ornamenting data (processing information) and the message data (text information) of the photographic image designated by the forwarding request user via a remote controller (not shown), and transmits the input processing indication data D55, together with the film data D15, to the reception shop personal computer 303.

The reception shop personal computer 303 performs a synthetic process of the frame ornamenting data and/or message data with the corresponding converted photographic image data of the film data D15 on the basis of the processing indication data D55 provided from the reception shop photographic image printing machine 302. The thus-obtained processing film data D56 is stored in the reception shop server 258, and transmitted via the reception shop side service provider 253, the Internet 255 and the delivery shop side service-provider 254 to the delivery photograph shop 252.

In the delivery photograph shop 252, the delivery shop personal computer 261 receives the processing film data D56 from the reception photograph shop 301. The received processing film data D56 is stored in the delivery shop server 261 and sent to the delivery shop photographic image printing machine 100B.

Thereby, the delivery shop photographic image printing machine 100B produces, on the basis of the processing film data D56, a print photograph shop 307 having a photographic image 305 and a predetermined frame ornament 306 printed on the printing paper, a print photograph shop 310 having a photographic image 308 and a predetermined message 309 printed on the printing paper, and an index print (not shown) having the photographic images with the frame ornament or message appended.

Thus, the delivery photograph shop 252 can deliver the print photograph shops having the photographic images synthesized with the frame ornament or message, and the index print displaying in thumbnail the photographic images synthesized with the frame ornament or message, to the photograph shop recipient user designated by the forwarding request user.

In addition to the above configuration, in the case of this photographic image commercial transactions system 300, the clerk asks the forwarding request user whether or not advertisement is inserted in the print photograph shops to be forwarded in the reception photograph shop 301. If the user consents to the insertion of advertisement, the photographic image designation data D57 indicating the photographic images into which advertisement is inserted is input into the reception shop photographic image printing machine 302 via the remote controller.

In the reception photograph shop 301, the reception shop photographic image printing machine 302 produces the film data D15, and sends the produced film data D15 together with the photographic image designation data D57 to the reception shop personal computer 303.

Though the reception photograph shop 301 keeps the advertisement data for a certain company with which the propaganda contract is concluded such as the reception shop side service provider 253 (hereinafter referred to as a propaganda request company), the reception shop personal computer 303, which is given the film data D15 and the photographic image designation data D57 from the reception shop photographic image printing machine 302, then performs the synthesis process for synthesizing the corresponding converted photographic image data of the film data D15 with the advertisement data on the basis of the photographic image designation data D57. And the thus-obtained advertisement inserting film data D58 is stored in the reception shop server 258, and transmitted via the reception shop side service provider 253, the Internet 255 and the delivery shop side service provider 254 to the delivery photograph shop 252.

In the delivery photograph shop 252, the delivery shop personal computer 261 receives the advertisement insertion film data D58 from the reception photograph shop 301. The received processing film data D58 is stored in the delivery shop server 261 and sent to the delivery shop photographic image printing machine 100B.

Thereby, the delivery shop photographic image printing machine 100B produces a print photograph shop 313 having a photographic image 311 synthesized with a predetermined advertisement image 312 such as an advertisement text on the printing paper, and an index print (not shown) displaying in thumbnail the photographic images synthesized with the advertisement image, on the basis of the advertisement insertion film data D58.

Thus, the delivery photograph shop 252 can deliver to the photograph shop recipient user designated by the forwarding request user, the print photograph shops to be forwarded specified by the forwarding request user in the reception photograph shop 301, the print photograph shops into which advertisement text is inserted, and the index print.

Herein, the reception photograph shop 301 demands the forwarding fee for transmitting the film data D15 directly and moreover the processing charge, in the case where there is a user's request that the frame ornament or message is applied to the print photograph, because the synthesis process for synthesizing the frame ornament data or message data with the film data D15 must be additionally performed.

On the contrary, if advertisement is inserted into the print photograph shop with consent of the forwarding request user, the reception photograph shop 301 can set the forwarding fee at lower price by reducing the forwarding fee of print photograph shops by the propaganda fee, because advertisement for the merchandise of the propaganda request company is effected by the print photograph shops which the forwarding request user forwards to the photograph shop recipient user.

And the reception photograph shop 301 allows the forwarding request user to select the quantity of advertisement inserted into the print photograph shops for transfer. Hence, if the quantity of advertisement inserted into the print photograph shops is appreciably significant, the forwarding fee can be reduced greatly (or for nothing).

Accordingly, in the reception photograph shop 301, in the case where there is a request of the forwarding request user to synthesize the print photograph shops for transfer and the frame ornament or message, leading to a comparatively high price or forwarding fee, if the insertion of advertisement is made with consent of the forwarding request user, the print photograph shops can be forwarded at particularly reduced price owing to the insertion of advertisement into the print photographs.

Figure 31:
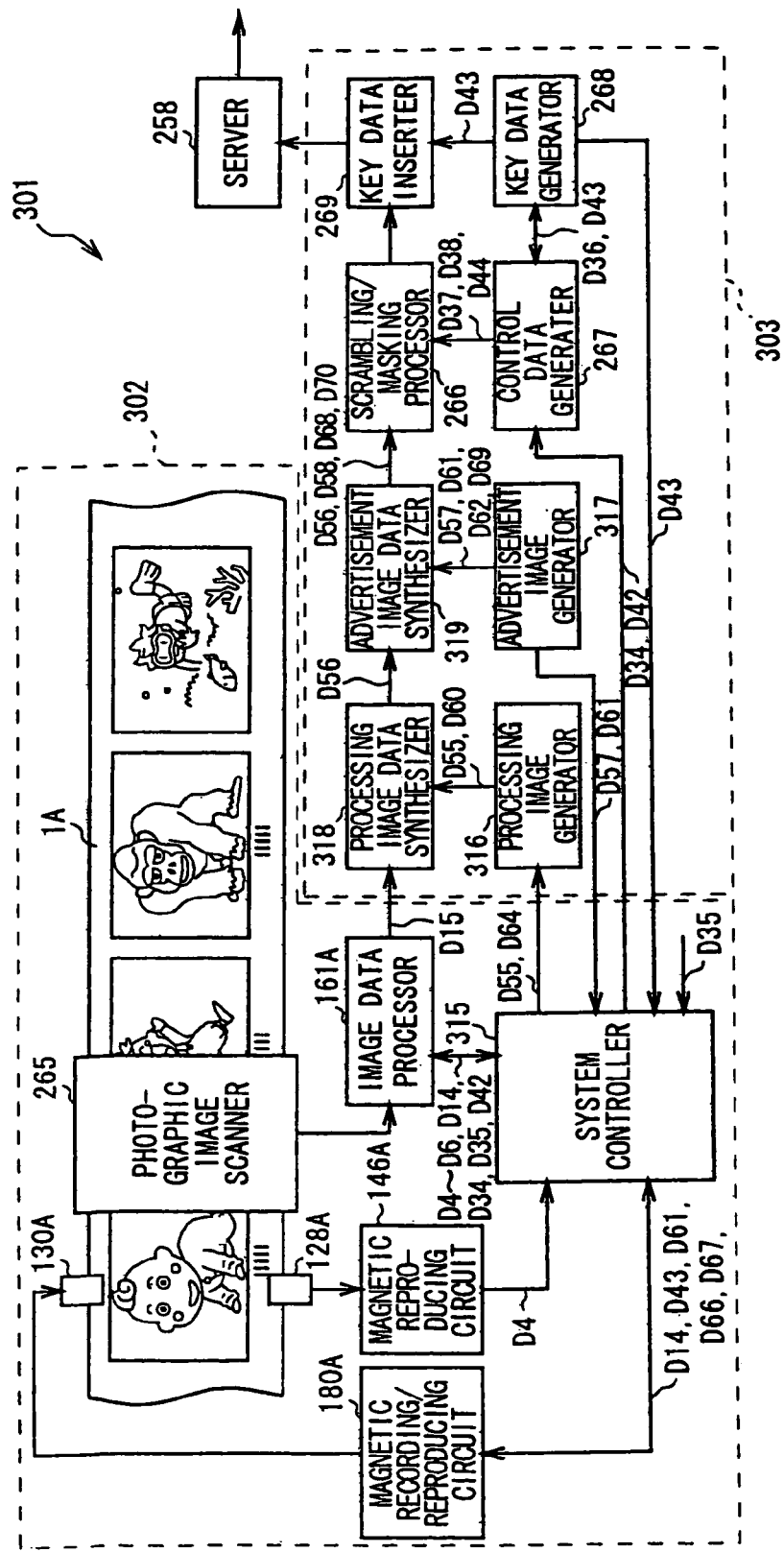
FIG. 31 is a block diagram showing a circuit configuration of a reception shop photographic image-printing machine and a reception shop personal computer.

FIG. 31 illustrates a circuit configuration of a reception shop photographic image printing machine and a reception shop personal computer, wherein the corresponding parts are designated by the same reference numerals in FIGS 26 and 31. In FIG. 31, if the processing indication data D55 and the photographic image designation data D57 are input via the remote controller (not shown), a system controller 315 of the reception shop photographic image printing machine 302 sends the input processing indication data D55 to a processing image generator 316 of the reception shop personal computer 303, and sends the photographic image designation data D57 to an advertisement image generator 317 of the reception shop personal computer 303.

If the processing indication data D55 is passed from the system controller 315, the processing image generator 316 generates the processing image data D60 of frame ornament and/or message on the basis of the frame ornamental data and/or message data obtained from the processing indication data D55, and sends the generated processing image data D60 with the processing indication data D55 to a processing image data synthesizer 318.

The processing image data synthesizer 318 synthesizes the corresponding processing image data D60 with the converted photographic image data having a frame number indicated on the basis of the processing indication data D55 among the converted photographic image data of the film data D15 provided from the image data processor 161A of the reception shop photographic image printing machine 302, and sends the thus-obtained processing film data D56 to an advertisement data synthesizer 319.

On one hand, the advertisement image generator 317 holds in advance the advertisement data D61 of characters or images representing the advertisement content. If the photographic image designation data D57 is given from the system controller 315, the advertisement image generator 317 generates the advertisement image data D62 on the basis of the advertisement data D61, and sends the generated advertisement image data D62 with the photographic image indication data D57 to the advertisement image data synthesizer 319.

The advertisement image data synthesizer 319 synthesizes the advertisement image data D62 with the converted photographic image data designated on the basis of the photographic image designation data D57 among the converted photographic image data of the processing film data D56 provided from the processing image data synthesizer 318, and sends the advertisement insertion film data D58 to the scrambling/masking processor 266.

In this connection, the advertisement image data synthesizer 319 synthesizes the advertisement image data D62 with the film data D15 provided via the processing image data synthesizer 318 from the image data processor 161A of the reception shop photographic image printing machine 302, when no processing indication data D55 is input to the system controller 315 of the reception shop photographic image printing machine 302, and sends the obtained advertisement insertion film data D58 to the scrambling/masking processor 266.

Also, the advertisement image data synthesizer 319 sends the processing film data D56 provided from the processing image data synthesizer 318 directly to the scrambling/masking processor 266, when no photographic image designation data D57 is input to the system controller 315 of the reception shop photographic image printing machine 302.

If the processing film data D56 or the advertisement insertion film data D58 is obtained from an output stage of the advertisement image data synthesizer 319, the reception shop personal computer 303 performs the scrambling/masking process for the processing film data D56 or the advertisement insertion film data D58 in the scrambling/masking processor 266, as required, and sends the processing film data D56 or the advertisement insertion film data D58 thus scrambled or masked via the key data inserter 269 and the reception shop server 258 to the reception shop side service provider 253 (FIG. 30).

Thereby, in the delivery photograph shop 252 (FIG. 30), the delivery shop personal computer 260 receives the processing film data D56 or the advertisement insertion film data D58 transmitted from the reception photograph shop 301 via the reception shop side service provider 253, the Internet 255 and the delivery shop side service provider 254. The received processing film data D56 and advertisement insertion film data D58 is sent to the delivery shop server 261 and stored therein, and further passed to the delivery shop photographic image printing machine 100B.

Figure 32A:
FIGS. 32A to 32C are schematic views for describing a print photograph shop with frame ornament as well as message printed thereon.
Figure 32B:
Figure 32C:
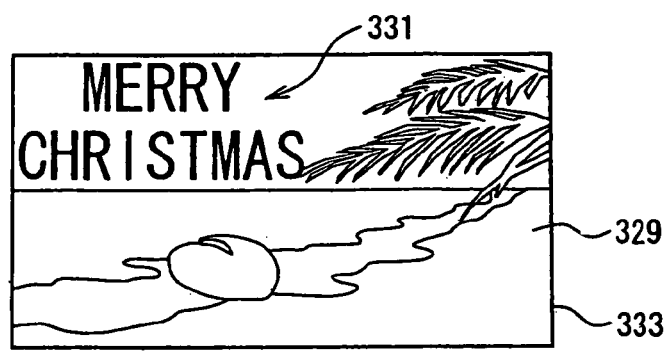

In this way, in the delivery photograph shop 252, the delivery shop photographic image printing machine 100B produces a print photograph shop 327 having a frame ornament 325 and a message 326 synthesized on a photographic image 324, print photograph shops 332 and 333 having the messages 330 and 331 synthesized on the photographic images 328 and 329, on the basis of the processing film data D56, as shown in FIGS. 32A to 32C. Then, the delivery photograph shop 252 can deliver the produced print photograph shops to the photograph shop recipient user.

Figure 33A:
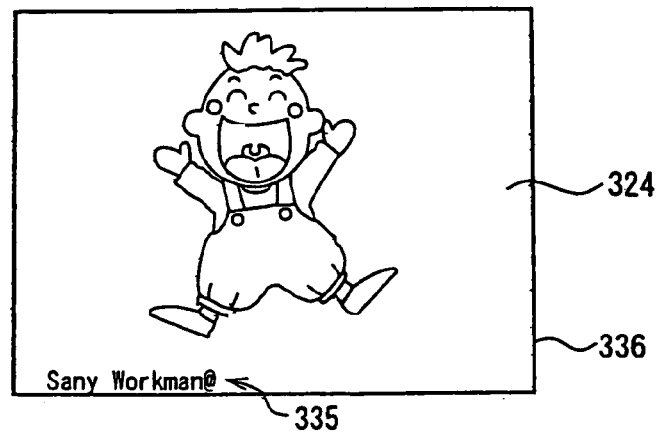
FIGS. 33A to 33C are schematic views for describing a print photograph shop with advertisement printed thereon.
Figure 33B:
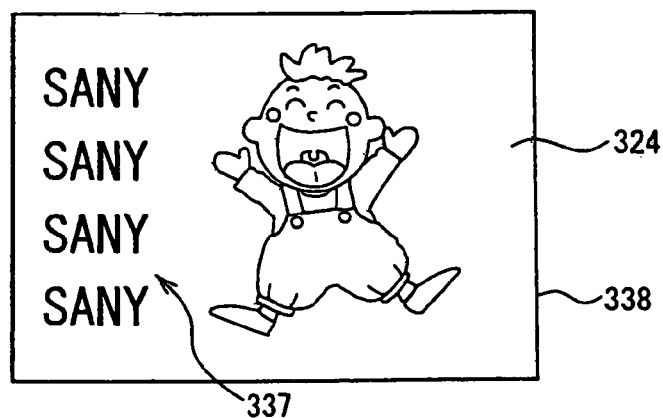
Figure 33C:
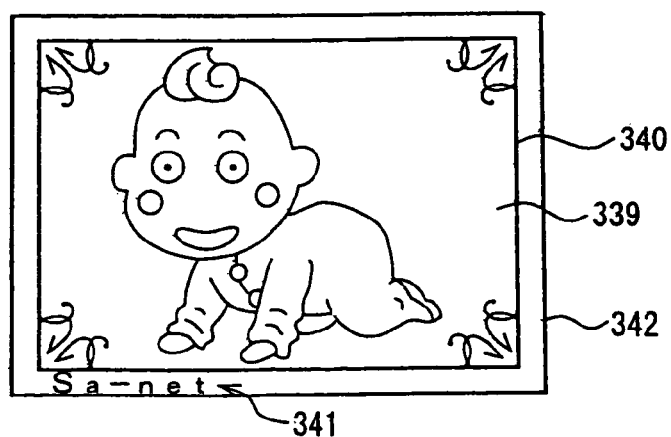

Also, in the delivery photograph shop 252, the delivery shop photographic image printing machine 100B produces a print photograph shop 336 having an advertisement character string 335 synthesized on the lower side of a photographic image 324, a print photograph shop 338 having several advertisement character strings 337 synthesized on an open area of the printing paper which is made by shifting the photographic image 324 from the central part of the printing paper, and a print photograph shop 342 having a frame ornament 340 and an advertisement text 341 synthesized on a photographic image 339, on the basis of the advertisement insertion film data D58, as shown in FIGS. 33A to 33C. Then, the delivery photograph shop 252 can deliver the produced print photograph shops to the photograph shop recipient user.

Figure 34:
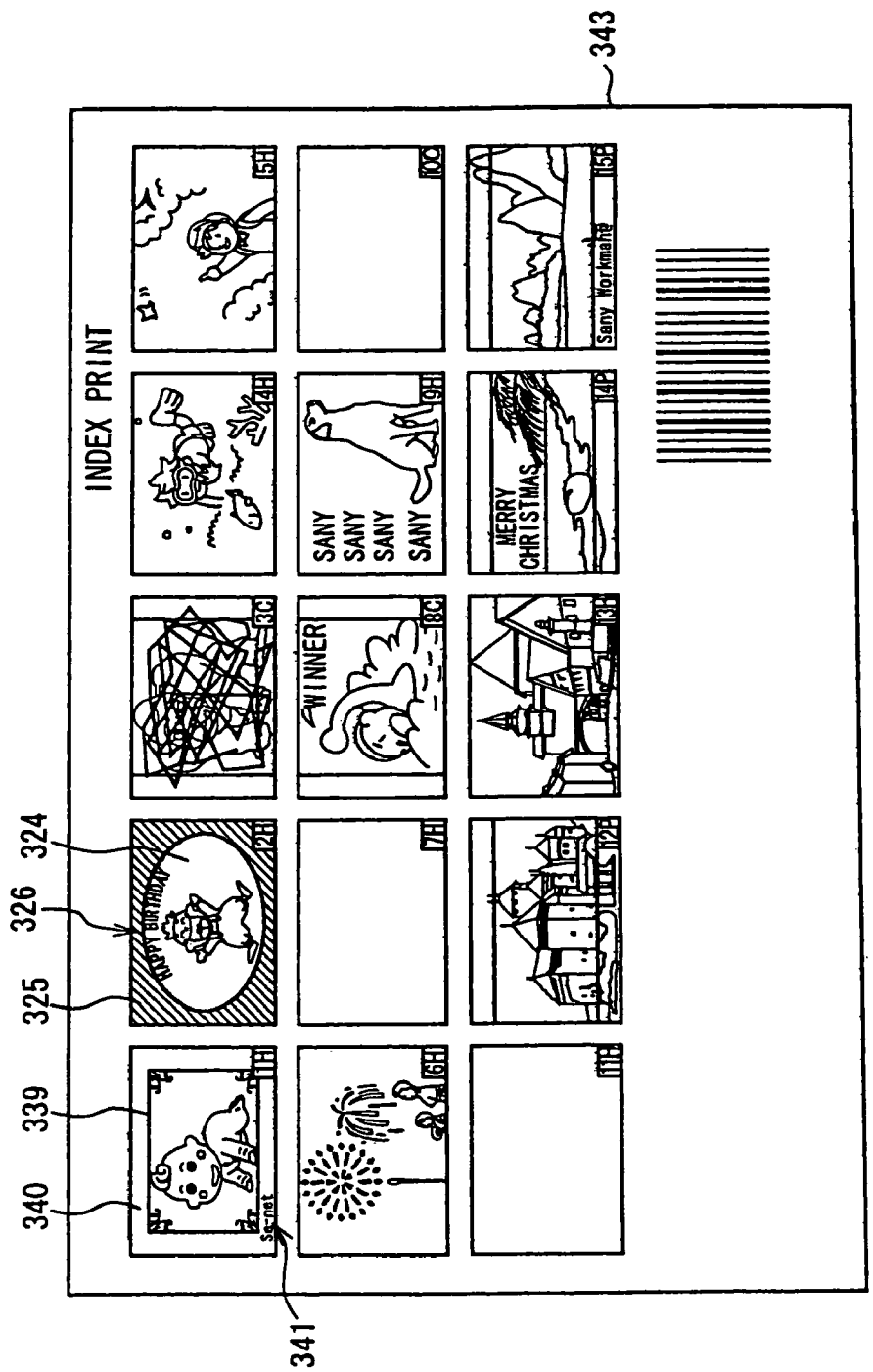
FIG. 34 is a schematic view showing a configuration of an index print.

And in the delivery photograph shop 252, the delivery shop photographic image printing machine 100B produces an index print 343 which displays in thumbnail the photograph shop image 324 having the frame ornament 325 and/or the message 326 synthesized, the photographic image 339 having the advertisement text 341 synthesized, and so on, on the basis of the processing film data D56 or the advertisement insertion film data D58, as shown in FIG. 34. Then, the delivery photograph shop 252 can deliver the produced index print 343 the photograph shop recipient user.

This index print 343 can display, in addition to a variety of kinds of photographic images 324 and 339, a photographic image 344 in scrambled state and a photographic image 345 in masked state at the same time.

By the way, the advertisements insertable into the print photograph shop and the index print may include the company name of propaganda request company, name of merchandise, propaganda text of propaganda request company, advertisement character string such as the logo of propaganda request company, propaganda pamphlet, and advertisement photograph shop for propaganda of merchandise.

And in the reception shop personal computer 303 (FIG. 31), the advertisement image data synthesizer 319 inserts the advertisement image data D62 of the propaganda pamphlet or advertisement photograph shop for propaganda of merchandise into the film data D15 or the processing film data D56, and can transmit the obtained advertisement insertion film data D68.

Figure 35A:
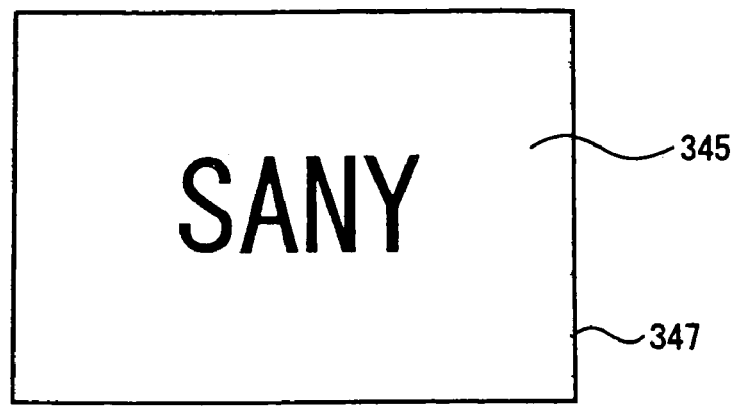
FIGS. 35A and 35B are schematic views for describing a print photograph shop of advertisement image.
Figure 35B:

In this way, in the delivery photograph shop 252, when the advertisement insertion film data D68 is transmitted, the delivery shop photographic image printing machine 100B produces the print photographs, as shown in FIGS. 32A to 33C, on the basis of the advertisement insertion film data D58. Further, the delivery shop photographic image printing machine 100B produces the print photograph shops 347 and 348 having the advertisement images 345 and 346 alone printed on the printing paper, as shown in FIGS. 35A and 35B, on the basis of the advertisement image data D62 of the advertisement insertion film data D58. The delivery photograph shop 252 delivers the print photograph shops of photographic images, as well as the print photograph shops 347 and 348 of the advertisement images 345 and 346, to the photograph shop recipient user.

Figure 36:
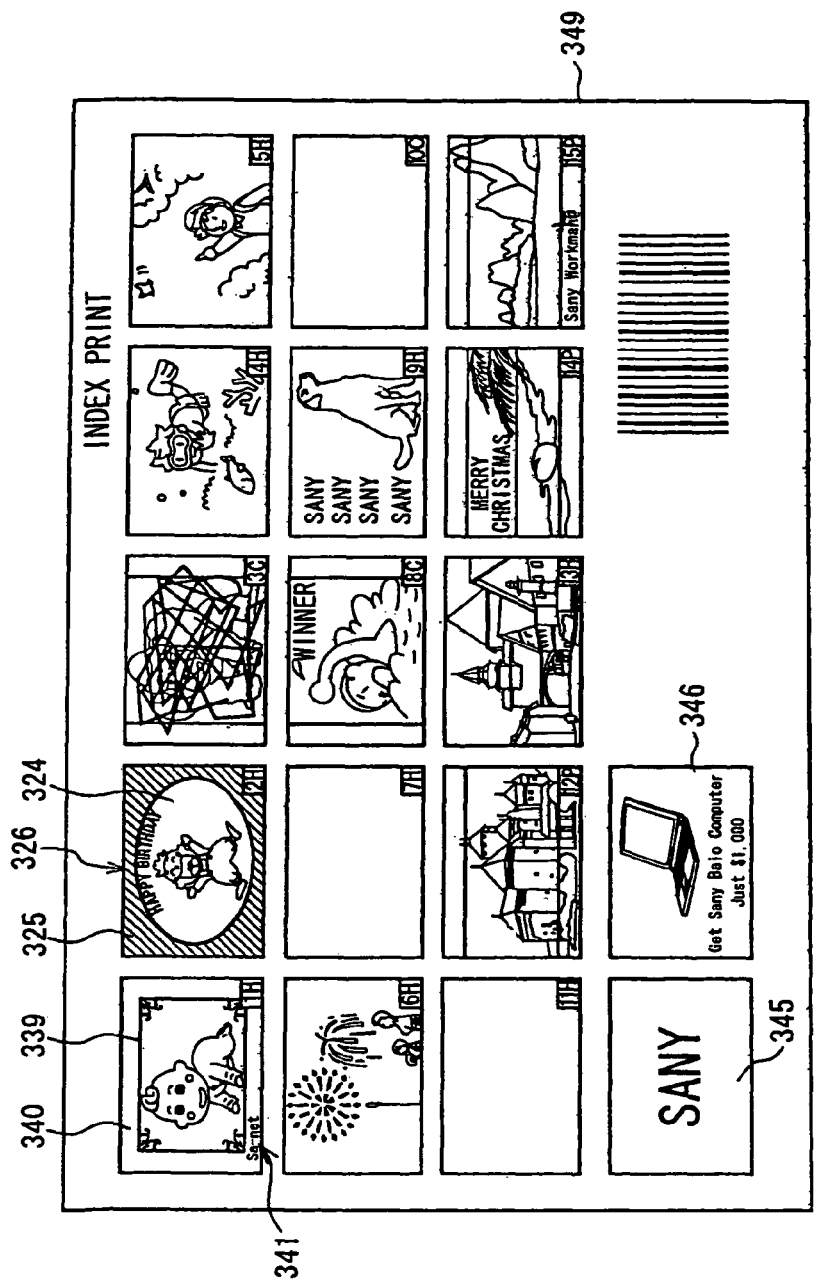
FIG. 36 is a schematic view showing a configuration of an index print with advertisement images displayed therein.
Figure 37:
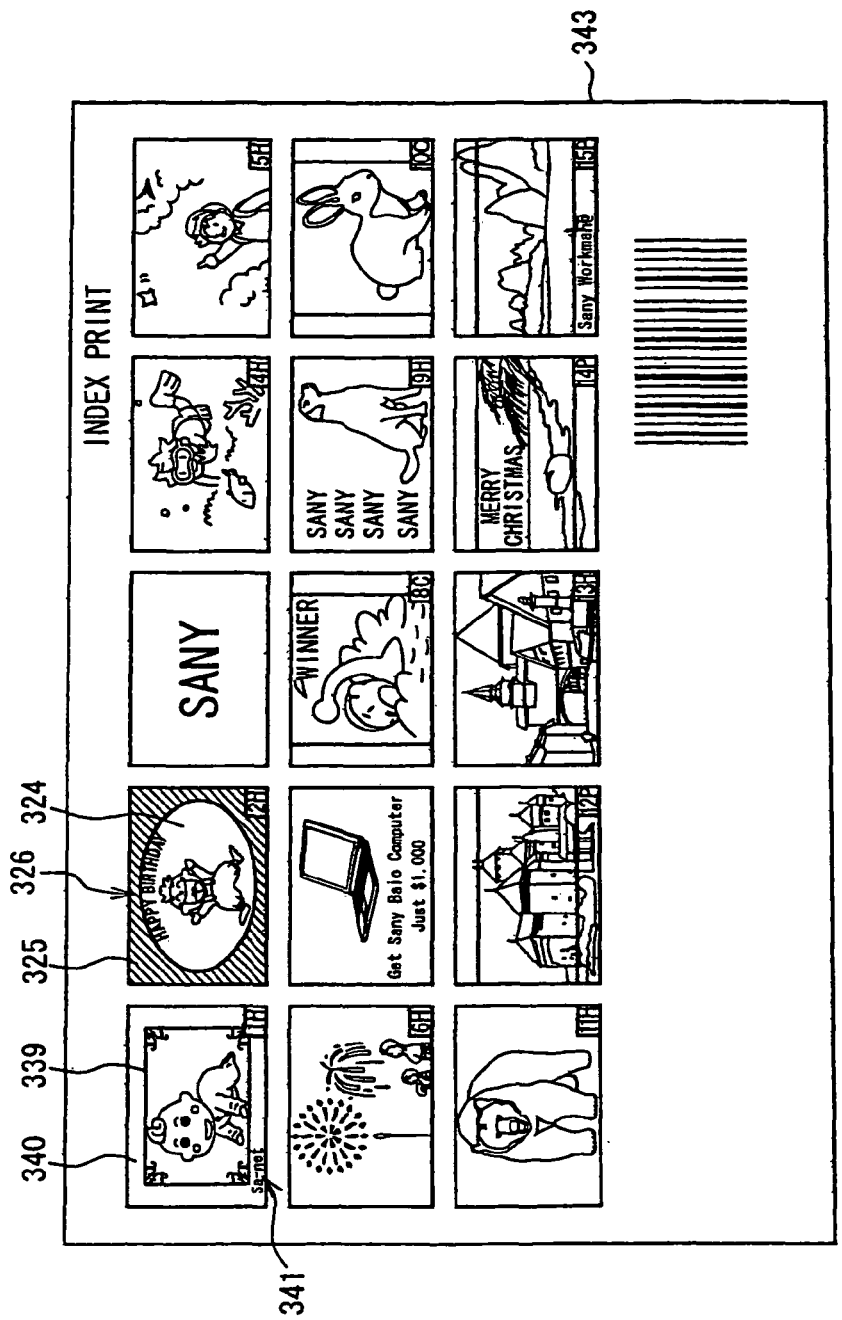
FIG. 37 is a schematic view showing a configuration of an index print with advertisement images displayed therein.

Also, in the delivery photograph shop 252, the delivery shop photographic image printing machine 100B produces the index prints 349 and 350 displaying in thumbnail the photographic images 324 and 339, and the advertisement images 345 and 346, on the basis of the advertisement insertion film data D68, as shown in FIGS. 36 and 37. The delivery photograph shop 252 delivers these index prints to the photograph shop recipient user. In these index prints 349 and 350, the advertisement images 345 and 346 are printed after the photographic images, or can be printed in place of the photographic images not to be forwarded.

In addition, the reception shop personal computer 303 (FIG. 31) enables the advertisement image data synthesizer 319 to insert the advertisement image data D69 for index print into the film data D15 or the processing film data D56, and send the obtained advertisement insertion film data D70.

Figure 38:
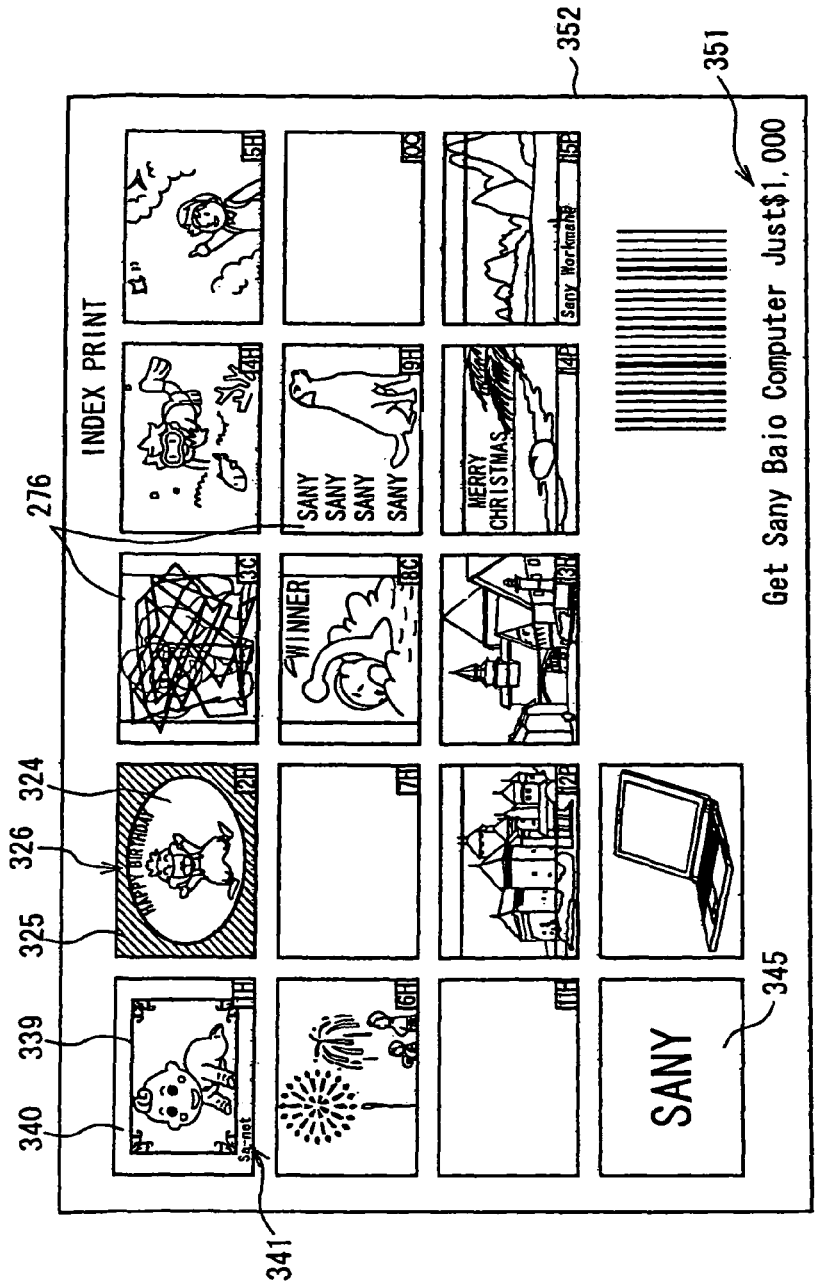
FIG. 38 is a schematic view showing a configuration of an index print with an advertisement character string displayed therein.

And in the delivery photograph shop 252, when the advertisement insertion film data D70 is transmitted, the delivery shop photographic image printing machine 100B produces an index print 352 displaying in thumbnail an advertisement character string 351, along with the photographic images 324 and 339 as well as the advertisement images 345 and 346, on the basis of the advertisement insertion film data D70, as shown in FIG. 38. The delivery photograph shop 252 may deliver the index print 352 to the photograph shop recipient user.

In this connection, the system controller 315 (FIG. 31) of the reception shop photographic image printing machine 302 produces the processing indication data D64 from the corresponding frame-number data and its title and/or message and sends the obtained processing indication data D64 to the processing image generator 316, if there is any title and/or message to be printed in the photograph shop contained in the user data reproduced from the user's camera using area 6 (FIG 2) of the APS negative film 1A using the user data magnetic head 128A and the magnetic reproducing circuit 146A.

In this way, the processing image generator 316 produces the processing image data D65 on the basis of the processing indication data D64, and sends the processing image data D65 to the processing image data synthesizer 318.

Thus, the processing image data synthesizer 318 synthesizes the processing image data D65 with the corresponding photographic image data of the film data D15, thereby enabling the title or message that has been set via the APS camera (not shown) in taking the photographic image, to be printed on the print photograph.

The system controller 315 (FIG. 31) of the reception shop photographic image printing machine 302 sends the frame ornament data D66 and/or message data D67 contained in the processing indication data D55 via the magnetic recording reproducing circuit 180A to the laboratory data magnetic head 130A, on the basis of the frame number data contained in the processing indication data D55 input via the remote controller. Then the laboratory data magnetic head 130A records the frame ornament data D66 and/or message data D67 in the laboratory using area 7 of the APS negative film 1A. Thereby, it is possible to preserve the history of synthesis process of synthesizing the frame ornament and/or message with the photographic images specified in the APS negative film 1A.

Further, the system controller 315 reads the advertisement data D61 from the advertisement image generator 317 on the basis of the photographic image designation data D57 input via the remote controller, and sends the read advertisement data D61 via the magnetic recording reproducing circuit 180A to the laboratory data magnetic head 130A, which then records the advertisement data D61 in the laboratory using area 7 of the APS negative film 1A. Thereby, it is possible to preserve the history of synthesis process of synthesizing the advertisement image with the photographic images specified in the APS negative film 1A.

Figure 39:
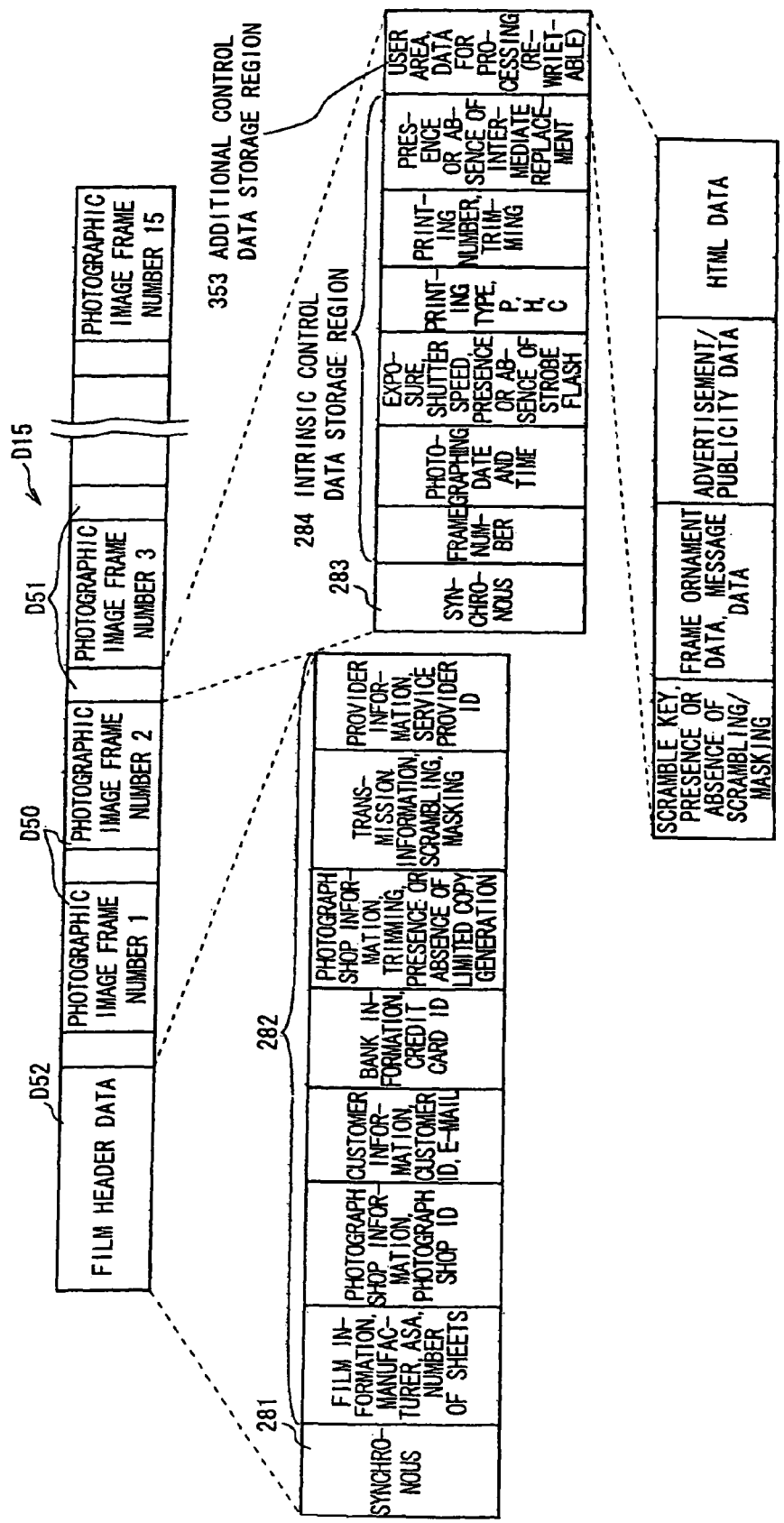
FIG. 39 is a schematic conception view showing a data format of film data according to a second embodiment.

FIG. 39 shows the data format of film data according to the second embodiment of the invention, wherein the corresponding parts are designated by the same reference numerals in FIGS 29 and 39. In FIG. 39, the film data D15 enables the frame ornament data and/or message data, and the advertisement data D61 to be stored rewritably in an additional control data storage area 353 of the photographic image header data D51 corresponding to each converted photographic image data D50.

Accordingly, the processing image data synthesizer 318 (FIG. 31) stores the frame ornament data and/or message data obtained on the basis of the processing indication data in the additional control data storage area 353 of the photographic image header data D51 corresponding to the converted photographic image data synthesized with the processing image data D60, in performing the synthesis process for the processing image data D60, thereby making it possible to preserve the history of synthesis process of synthesizing the processing image data D60 with the converted photographic image data.

The advertisement image data synthesizer 319 is given the advertisement data D61 from the advertisement image generator 317, in performing the synthesis process for the advertisement image data D62. Then, the advertisement image data synthesizer 319 stores the advertisement data D61 in the additional control data storage area 353 of the photographic image header data D51 corresponding to the converted photographic image data synthesized with the advertisement image data D62, thereby making it possible to preserve the history of synthesis process of synthesizing the advertisement image data with the converted photographic image data.

In this way, in the delivery photograph shop 252 (FIG. 30), when the processing film data D56 and the advertisement insertion film data D58 are received, the frame ornament data and message data stored in the additional control data storage area 353 of the photographic image header data D51, or the advertisement data D61, are compared with the frame ornament and message or the advertisement actually synthesized with the print photograph shops and the index print, making it possible to confirm whether or not the frame ornament and message or the advertisement actually synthesized with the print photograph shops and the index print are falsified unreasonably in the course of transmitting the processing film data D56 and the advertisement insertion film data D58.

With the above configuration, in the photographic image commercial transactions system 300, upon a request of forwarding the print photograph shops to the reception photograph shop 301, if the advertisement is inserted with consent of the forwarding request user, the reception shop personal computer 303 of the reception photograph shop 301 performs the synthesis process for synthesizing the advertisement image data D62 with the converted photographic image data D50 of the film data D15 provided from the reception shop photographic image printing machine 302, and then transmits the obtained advertisement insertion film data D58 via the reception shop service provider 253, the Internet 255 and the delivery shop side service provider 254 to the delivery photograph shop 252.

In the delivery photograph shop 252, the delivery shop personal computer 260 receives the advertisement insertion film data D58 from the reception photograph shop 301, and transfers the received advertisement insertion film data D58 to the delivery shop photographic image printing machine 100B. Thereby, the print photograph shops in which the photographic images and the advertisement image are synthesized and an index print having photographic images synthesized with the advertisement image are produced on the basis of the advertisement insertion film data D58, and delivered to the photograph shop recipient user designated by the forwarding request user.

Accordingly, in this photographic image commercial transactions system 300, since the advertisement of propaganda advertising company is made public on the print photograph shops requested for transfer from the forwarding request user, the forwarding fee of the print photograph shops can be reduced, so that the forwarding request user can request the transfer of print photograph shops at ease.

In the photographic image commercial transactions system 300, in the reception photograph shop 301, when the forwarding request user makes a request of forwarding the print photograph shops with the synthesis of the photographic images and the frame ornament or message, the frame ornament or message corresponding to the converted photographic image data specified of the film data D15 are synthesized with the photographic images. Thereafter, the thus-obtained processing film data D56 is transmitted to the delivery photograph shop 252. In the delivery photograph shop 252, the print photograph shops in which the photographic images and the frame ornament or message are synthesized on the basis of the processing film data D56, and an index print having the photographic images synthesized with the frame ornament or message are produced, and delivered to the photograph shop recipient user.

Accordingly, in this photographic image commercial transactions system 300, the print photograph shops which the forwarding request user transfers to the photograph shop recipient user are also effective to inform the present situation of housemoving or childbirth, or offer congratulations for the photograph shop recipient user, and utilized as an invitation note, whereby it is possible to make full use of the print photograph shops in a wide variety of ways.

And in the photographic image commercial transactions system 300, if the print photograph shops synthesized with the frame ornament or message are transferred, the forwarding fee can be raised by the charge for synthesis process, in contract to when the print photograph shops are transferred without processing. However, if the advertisement insertion is also requested with the processing of photographic images, the forwarding fee of print photograph shops can be made equivalent to or less than that when the print photograph shops are transferred without processing, whereby it is possible to make effective use of the print photograph shops at ease.

With the above configuration, the reception shop personal computer 303 synthesizes the advertisement image data D62 with the converted photographic image data D50 of the film data D15 produced in the reception shop photographic image printing machine 302, and sends the obtained advertisement insertion film data D58 via the network to the delivery photograph shop 252. In the delivery photograph shop 252, the print photograph shops in which the photographic images and the advertisement image are synthesized on the basis of the advertisement insertion film data D58 are produced, and delivered to the photograph shop recipient user designated by the forwarding request user. As a result, in addition to the effects obtained in the first embodiment of the invention, the forwarding fee of print photograph shops can be reduced, whereby the photographic image commercial transactions system that is easy to use can be realized.

(6) Third Embodiment

Figure 40:
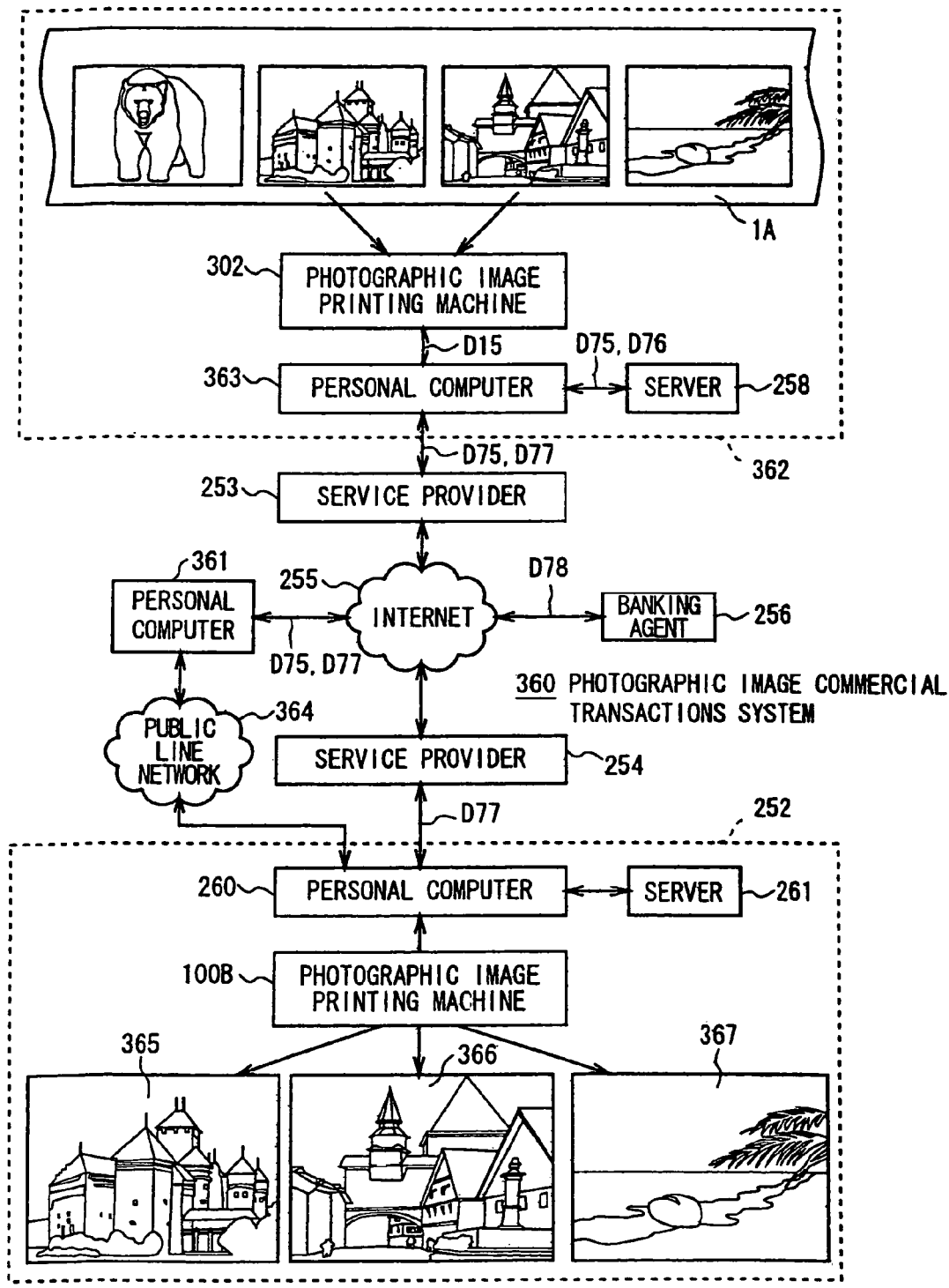
FIG. 40 is a block diagram showing a configuration of a photographic image commercial transactions system according to a third embodiment.

FIG. 40 shows a photographic image commercial transactions system 360 according to a third embodiment of the invention, wherein the corresponding parts are designated by the same reference numerals in FIGS. 30 and 40. The photographic image commercial transactions system 360 according to the third embodiment of the invention is configured in the same way as the photographic image commercial transactions system 300 of the second embodiment of the invention, except that a personal computer of the purchasing demand user (hereinafter referred to as a user personal computer) 361 is connected to the Internet 255, and for the configuration of a reception shop personal computer 363 in a reception photograph shop 362.

In the reception photograph shop 362, if the selling request user carries in a film cartridge (not shown) containing the APS film (not shown), and makes a request of selling the photographic images, the APS film is developed to produce the APS negative film 1A.

In the reception photograph shop 362, the reception shop photographic image printing machine 302 produces the converted photographic image data of photographic images on the basis of the APS negative film 1A, produces the photographic image header data, using the intrinsic control data having the printing condition specified on the basis of the user data reproduced from the APS negative film 1A, and produces the film data D15 by appending the film header data to the converted photographic image data and the photographic image header data. The produced film data D15 is then passed to the reception shop personal computer 363.

For the film data D15 provided from the reception shop photographic image printing machine 302, the reception shop personal computer 363 performs processes of synthesizing the processing image data, synthesizing the advertisement image data, scrambling and/or masking, as required, to produce the sale subject film data D75, and produce the index data D76 on the basis of the selling film data D75 thus produced. The produced index data D76, together with the selling film data D75, is stored in the reception shop server 258.

In the reception photograph shop 362, the reception shop personal computer 363 publicizes the index image for the photographic images 365 to 367 to be sold over the Internet 255, on the basis of the index data D16 stored in the reception shop server 258.

That is, in the reception photograph shop 362, if the reception shop personal computer 363 is accessed from the user personal computer 361 via the Internet 255 and the reception shop side service provider 253, the reception shop personal computer 363 read the index data D16 from the reception shop server 258, and transmits the read index data D16 via the reception shop side service provider 253 and the Internet 255 to the user personal computer 361.

Thereby, the user personal computer 361 displays on the monitor an index image representing in thumbnail the photographic images to be sold 365 to 367 on the basis of the index data D16 provided from the reception photograph shop 362, enabling the purchaser to select the photographic images from the index image.

Herein, to sell the photographic images, there are two ways of selling the photographic images 365 to 367 to be sold in the form of print photographs, seal prints, printed matter such as poster (hereinafter referred to as a print selling form) and in the form of digital data (hereinafter referred to as a data selling form).

Accordingly, the user personal computer 361 notifies a request of purchasing the print photographs, along with the results of selecting and specifying the photographic images and the credit card number owned by the purchasing demand user, over a public line network 364 to the delivery photograph shop 252 located near the user, if the purchasing demand user selects and specifies the photographic image to be purchased and the selling form with reference to the index image displayed on the monitor.

In the delivery photograph shop 260, accepting a notification of the purchasing request from the user personal computer 361, the delivery shop personal computer 260 has access to the reception shop personal computer 363 in the reception photograph shop 362 in accordance with the notification of the purchasing request.

Thereby, the reception shop personal computer 363 of the reception photograph shop 362 reads out the corresponding selling film data D76 from the reception shop server 258 in accordance with the purchasing request from the purchasing demand user, produces the selling film data D77 having the converted photographic image data of photographic images 365 to 367 designated for the purchase among the converted photographic image data of the read selling film data D76, and the corresponding photographic image header data, and then transmits the selling film data D77 via the reception shop side service provider 253, the Internet 255 and the delivery shop side service provider 254 to the delivery shop personal computer 260 of the delivery photograph shop 252.

In the delivery photograph shop 252, when the print selling form is selected in accordance with the notification of the purchasing request from the purchasing-demand user, the selling film data D77 accepted by the delivery shop personal computer 260 is passed to the delivery shop photographic image printing machine 100B.

Thereby, in the delivery photograph shop 252, the delivery shop photographic image printing machine 100B prints on the printing paper the photographic images 365 to 367 based on the converted photographic image data of the selling film data D77, on the basis of the intrinsic control data within the photographic image header data, faithfully to the printing condition specified on the reception shop side, thereby producing the print photographs, seal prints, and/or poster, which are then delivered to the purchasing demand user.

In the delivery photograph shop 252, when the data selling form is selected in accordance worth the notification of the purchasing request from the purchasing demand user, the selling film data D77 accepted by the delivery shop personal computer 260 is recorded in the recording medium (e.g., magnetic disk, magnetic tape, or semiconductor memory) specified by the purchasing demand user, or transmitted from the delivery shop personal computer 260 via various networks such as the public line network 364 and the Internet 255, for delivery to the purchasing demand user.

Thereby, if the purchasing demand user accepts the selling film data D77 in the recording medium, when the photographic images are purchased in the data selling form, the selling film data D77 is reproduced from the recording medium, using a corresponding reproducing apparatus (e.g., user personal computer 361, digital video camera, digital still camera, projector, etc.). Thus, the purchaser can display, for pleasure, on the monitor the photographic images 365 to 367 based on the converted photographic image data of the selling film data D77 reproduced, in accordance with the intrinsic control data within the photographic image header data, with the composition and image quality regenerated faithfully to the printing condition specified on the reception shop side.

The purchasing demand user, accepting the selling film data D77 via the recording medium or over the communication network into the user personal computer 361, can make effective use of the photographic images 365 to 367 (with the composition and image quality regenerated faithfully to the printing condition specified on the reception shop side) obtained on the basis of the selling film data D77 accepted, in various ways of utilization that are by no means realized in the print selling form, such as employing them for one's own home page for the Internet, or as a background image („wall paper) for the disk screen displayed during activation of the user personal computer 361.

In this way, in the reception photograph shop 362, it is easier to buy the photographic images by providing the print and data selling forms for the photographic images to the purchasing demand user, and even if the photographic image is converted into digital data, the purchaser is enabled to regenerate the digital image faithfully to the printing condition specified on the reception photograph shop 362 side.

In this connection, in the case where it is specified to buy the photographic images 365 to 367 desired by the purchasing demand user in the data selling form, the user personal computer 361 can gain access to the personal computer 363 in the reception photograph shop 362 via the Internet 255 and the reception shop side service provider 253, but without intervention of the delivery photograph shop 252, thereby receiving the selling film data D77 directly from the reception photograph shop 362.

By the way, in the reception photograph shop 362, upon request of buying the photographic images, the delivery shop side settling information is acquired via the delivery photograph shop 252, or in accordance with a notification of purchasing request directly provided from the user personal computer 361, including the credit card number of registration owned by the purchasing demand user, the account number of transaction for the delivery photograph shop 252, and some charges (reproduction charge of print photographs, a recording fee of the selling film data D77 onto the recording medium, etc.) arising at the delivery photograph shop 252 in accordance with the selling form of photographic images.

In the reception photograph shop 362, at the time of producing the selling film data D77, the billing information is created by appending to the delivery shop side settling information, the reception shop side settling information consisting of the credit card number of registration owned by the purchasing demand user, the account number of transaction for the reception photograph shop 362, the number of photographic images designated for the purchase, the forwarding form of photographic images (with or without intervention of the delivery photograph shop 252), and the forwarding fee in accordance with the selling form. This billing information is transmitted with the selling film data D77.

If the selling film data D77 is sent from the reception photograph shop 362, the reception shop side service provider 252 retrieves the billing information from the selling film data D77, and transmits the billing information as the charging data D78 via the Internet 255 to the banking agent 256.

The banking agent 256 executes the charge accounting process on the basis of the charging data D78 provided from the reception shop side service provider 253. As a result of the charge accounting process, the banking agent 226 electronically transfers the funds from one account to another for transactions among the selling request user, purchasing demand user, reception, photograph shop 362, delivery photograph shop 252, reception shop side service provider 253 and delivery shop side service provider 254, thereby settling accounts for the sale of photographic images, to close an electronic commercial transaction for the sale of the photographic images.

In this way, in this photographic image commercial transactions system 360, the purchasing demand user can selectively purchase a desired photographic image from among a plurality of photographic images to be sold, while operating the computer at home, and settle the purchase price of photographic image electronically. Thus, everyone can readily participate in the transaction to purchase the photographic image.

Figure 41:
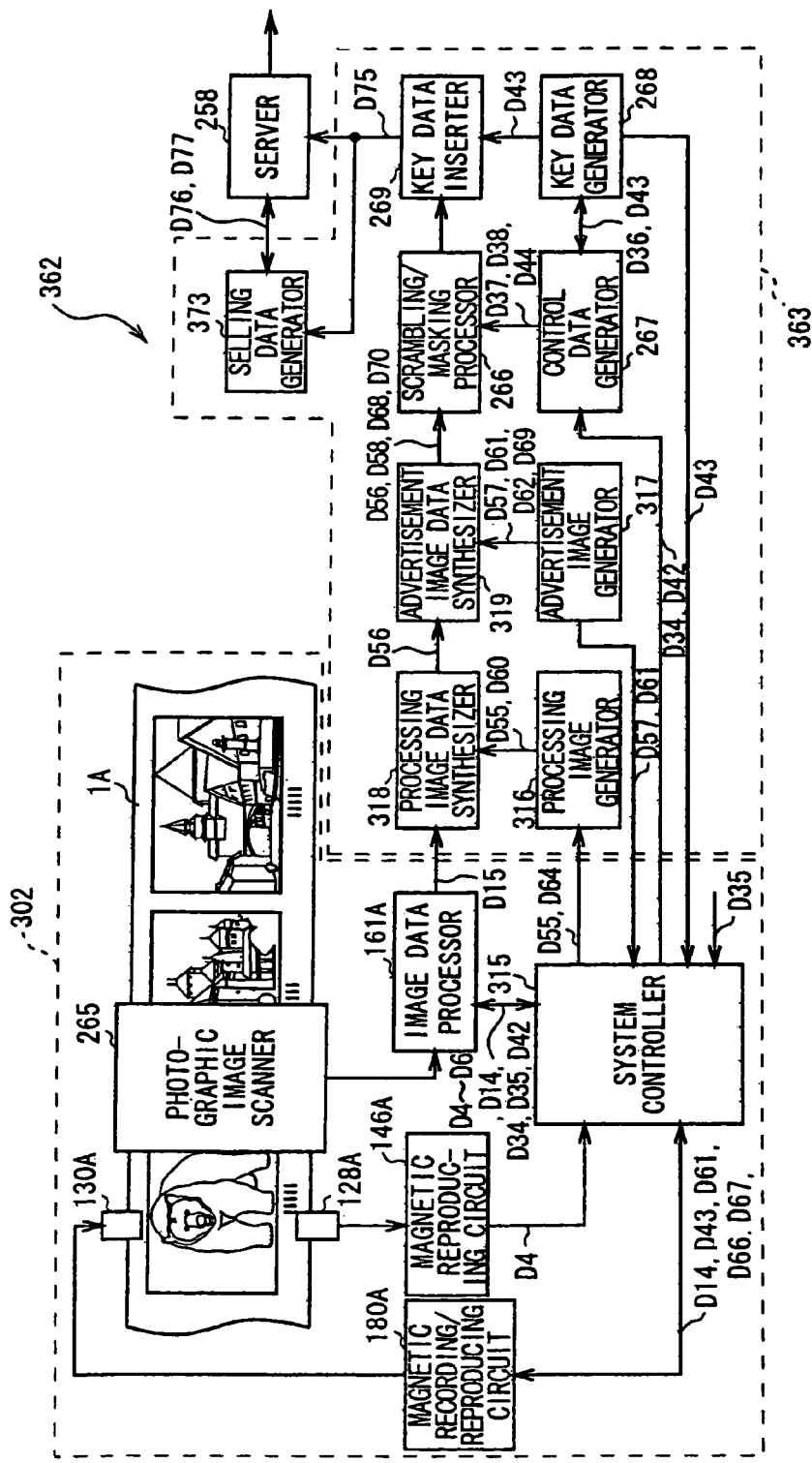
FIG. 41 is a block diagram showing a circuit configuration of a reception shop personal computer.

FIG. 41 shows a circuit configuration of the reception shop personal computer, wherein the corresponding parts are designated by the same reference numerals in FIGS. 31 and 41. At the time of requesting the sale of photographic images, the reception shop personal computer 363 of the reception photograph shop 362 enables the film data D15 provided from the reception shop photographic image printing machine 302 to pass through the processing image data synthesizer 318, the advertisement image data synthesizer 319, the scrambling/masking processor 266, and the key data inserter 269, and the synthesis process of the processing image data D60, the synthesis process of the advertisement image data D62, the scrambling and/or masking process, and the insertion process of the key data D43, as required, and stores the thus-obtained selling film data D75 in the reception shop server 258.

Figure 42:
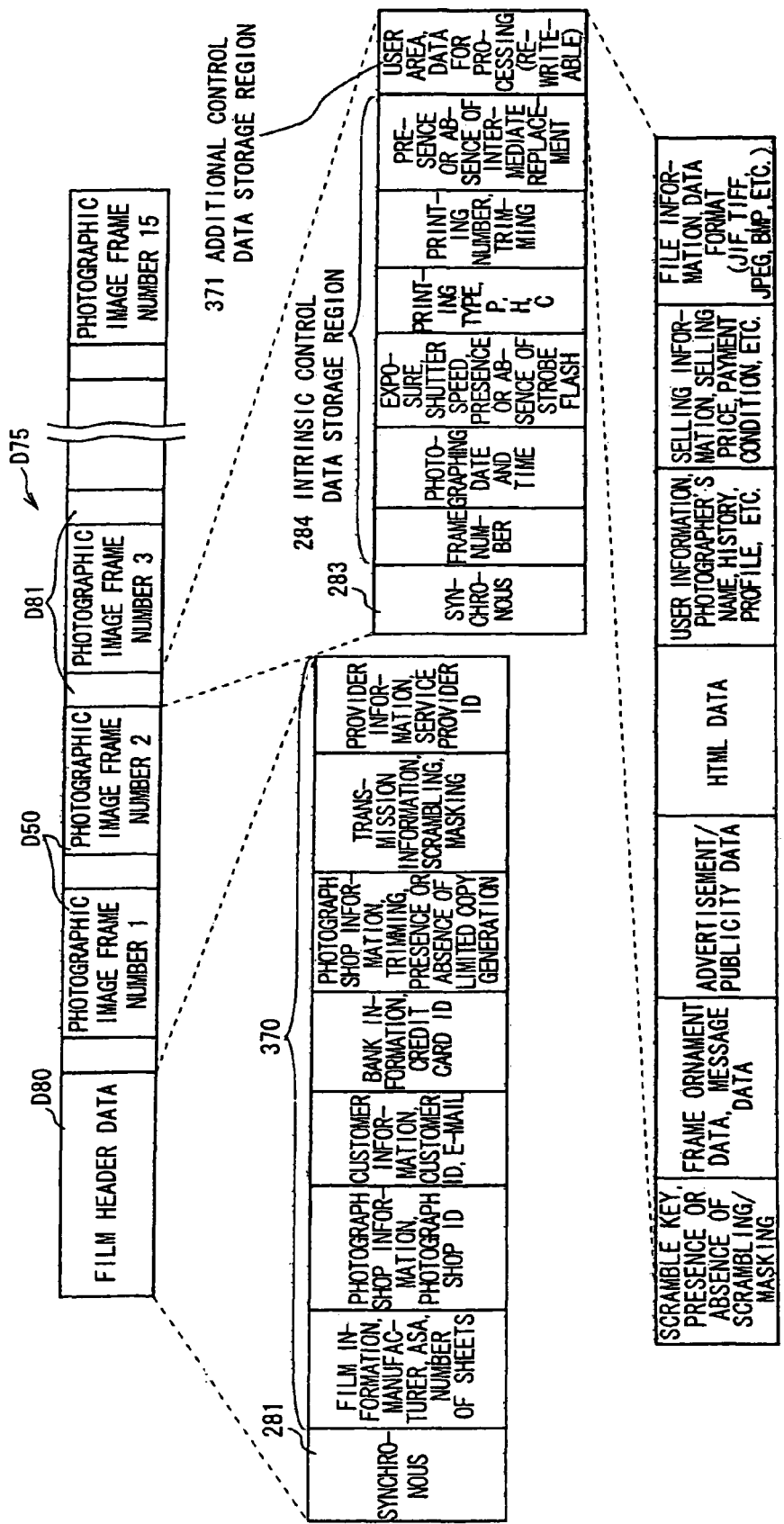
FIG. 42 is a schematic conception view showing a data format of selling film data.

Herein, the selling film data D75 provided from an output stage of the key data inserter 269 has the data format as shown in FIG. 42, wherein the corresponding parts are designated by the same reference numerals in FIGS. 39 and 42.

The bank information stored in the film header data D80 includes, instead of the forwarding fee in accordance with the number of the forwarding the print photograph shops and the forwarding form in the bank information as shown in FIG. 39 and described previously, the distribution fee in accordance with the selling number of photographic images, the selling form, and the selling route (with or without intervention of the delivery photograph shop 252 and the delivery shop side service provider 254).

Of the intrinsic control data storage area 284 and the additional control data storage area 371 in the photographic image header data D81, the reception shop personal computer 363 stores in the additional control data storage area 371, for example, in addition to various kinds of information as shown in FIG. 39, the name, the photographing history (history as the camera man), and the profile of the selling request user (e.g., photographer) as the selling request user information, or the comment for the photographic image concerning the photographing place and so on, the selling price in accordance with the selling form of corresponding photographic images, and the payment condition of selling price, as the selling information, and the data format (JIF, TIFF, JPEG, BMP, etc.) of the corresponding converted photographic image data D50 as the file information.

In this connection, the additional control data storage area 371 of the photographic image header data D81 may store some information designated by the selling request user and/or reception photograph shop among various kinds of information as above cited.

The forwarding film data D75 (FIG. 41) is also passed to the selling data generator 373, as well as the reception shop server 258, from the key data inserter 269.

If the forwarding film data D75 is provided from the key data inserter 269, the selling data generator 373 produces the index data D76 having at least the converted photographic image data D50 and the photographic image header data D81, and displaying the photographic images with the corresponding film ID, frame number, selling request user information and selling information, on the basis of the forwarding film data D75, and saves the produced index data D76 in the reception shop server 258.

Thereby, in the reception photograph shop 362, at the time of publicizing the photographic images to be sold, it is possible to provide the purchasing demand user who has called the index data D76 with the photographic images with the composition and image quality regenerated faithfully to the printing condition designated on the reception photographic shop 362 side on the basis of the intrinsic control data of the photographic image header data D81, and various kinds of information regarding the purchase of photographic images, by means of the index image on the basis of the index data D76. Accordingly, the purchasing demand user can readily buy the desired photographic image only by choosing the film ID, frame number and selling form to be displayed among the various kinds of information.

The selling data generator 373, at the time of selling the photographic images, reads out the forwarding film data D75 from the reception shop server 258 on the basis of the film ID designated by the purchasing demand user, appends the film header data of the forwarding film data D75 to the top of the series of data resulted from the corresponding converted photographic image data and photographic image header data chosen among each converted photographic image data and the photographic image header data of the forwarding film data D75 as read, on the basis of the frame number designated by the purchasing demand user, and stores the selling film data D77 obtained in the reception shop server 258.

In this connection, when the purchasing demand user designates the purchase of the photographic image on the basis of all the converted photographic image data of the sale subject film data D76, the selling data generator 373 stores the sale subject film data D75 as the selling film data D77 in the reception shop server 258.

Thereby, in the reception photograph shop 362, the reception shop personal computer 363 reads the selling film data D77 from the reception shop server 258, and transmits the read selling film data D77 to the destination (user personal computer 361 of the purchasing demand user or the delivery photograph shop 252) in accordance with the selling form designated by the purchasing demand user. As a result, the photographic images can be distributed.

By the way, in the reception photograph shop 362 (FIG. 40), the index data D76 useful to publicize the photographic images to be sold is produced and stored in the reception shop server 256 every time the sale request user makes a request of selling the photographic images. Hence, the user personal computer 361 can have access to the index data D76 at any time, and the purchaser can select the desired photographic image from among the photographic images taken by a number of sale request users.

In the reception photograph shop 362, when the photographic images to be sold are publicized on the basis of the index data D76 over the Internet 255, the scrambling process is effected for the particular photographic image demanded by the sale request user to sell at relatively high price among the photographic images to be sold, making the particular photographic image obscure.

Further in the reception photograph shop 362, if the purchasing demand user complies with the payment of a certain amount of money to view the particular scrambled photographic image, the key data D43 is transmitted from the reception shop personal computer 363 to the user personal computer 361, which then performs the descrambling process for the particular photographic image to be viewable.

Thereby, in the reception photograph shop 362, an electronic commercial transaction can be closed even at the time of publicizing the photographic images to be sold.

In the reception photograph shop 362, when the purchasing demand user demands that the frame ornament or message is removed from the photographic image demanded for the purchase, or that the frame ornament or message is replaced with different frame ornament or message, although the frame ornament or message has been synthesized with the photographic image upon a desire of the sale request user, at the time of publicizing the photographic images to be sold, the photographic image that has been changed in accordance with a desire of the purchasing demand user, with consent of the sale request user, as required, is sold by changing the selling price.

Thereby, in the reception photograph shop 362, the photographic images can be sold in the selling form that is easy to employ for not only the sale request user but also the purchasing demand user.

In this connection, in the reception photograph shop 362, in the case where the photographic images to be sold are publicized on the basis of the index data D76 over the Internet 255, although the number of photographic images to be publicized, or the publicity fee according to the term of publicity is involved, when advertisement is inserted into the index image with consent of the sale request user, the publicity fee is set at lower price or no charge in accordance with the amount of advertisement insertion.

In the reception photograph shop 362, in the case where the publicity fee is taken to publicize the photographic images to be sold, there are three settling methods of settling the publicity fee via the banking agent 256 within the publicity term of photographic images periodically, settling the publicity fee collectively at the end of publicity term, and offsetting the publicity fee with the selling price of photographic images purchased by the purchasing demand user, whereby the settling process is effected in accordance with a method selected by the sale request user.

With the above configuration, in this photographic image commercial transactions system 360, the reception photograph shop 362 produces the converted photographic image data from the photographic images of the APS negative film 1A, upon a request of the sale request user, produces the intrinsic control data on the basis of the user data recorded in the APS negative film. 1A, and in accordance with the printing condition designated by the sale request user and/or the reception photograph shop 362, and then produces the sale subject film data D75 having the converted photographic image data and the intrinsic control data and the index data D76.

In the reception photograph shop 362, the photographic images to be sold are publicized over the Internet 255 in terms of the index image based on the index data D76. If the photographic images demanded for the purchase are selected by the purchasing demand user viewing the index image, the selling film data D77 is produced from the corresponding sale subject film data D75 in response to the selection, and transmitted over the network 255 to the destination designated by the purchasing demand user.

In this photographic image commercial transactions system 360, the selling charge in accordance with the number of photographic images to be sold to the purchasing demand user, and the selling form, is electronically settled by the banking agent 256 to close an electronic commercial transaction.

Accordingly, in this photographic image commercial transactions system 360, the photographic images to be sold is handled by appending the intrinsic control data containing the printing condition designated on the reception photograph shop 362 side to the converted photographic image data, and hence the user who has bought the photographic images is allowed to utilize the photographic images with the composition and image quality regenerated faithfully to the printing condition designated on the reception photograph shop 362 side on the basis of the intrinsic control data. As a result, even though the photographic images to be sold is converted into the digital data, it is possible to sell the photographic images with the composition and image quality regenerated faithfully to the printing condition designated by the seller side.

With the above configuration, the reception photograph shop 362 sells the photographic images via the network by appending the intrinsic control data having the printing condition designated on the user data regenerated from the APS negative film 1A to the converted photographic image data of the photographic images in the APS negative film 1A, and the selling charge is electronically settled by the banking agent 256 when the photographic images are purchased. Hence, the digital data of photographic images sold to the purchaser can be reproduced faithfully to the printing condition designated on the seller side on the basis of the intrinsic control data. Thus, it is possible to provide a photographic image commercial transactions system that can readily sell the photographic images regenerated faithfully to the printing condition according to the intention of the seller side even though the photographic images to be sold is converted into digital data.

(7) Fourth Embodiment

Figure 43:
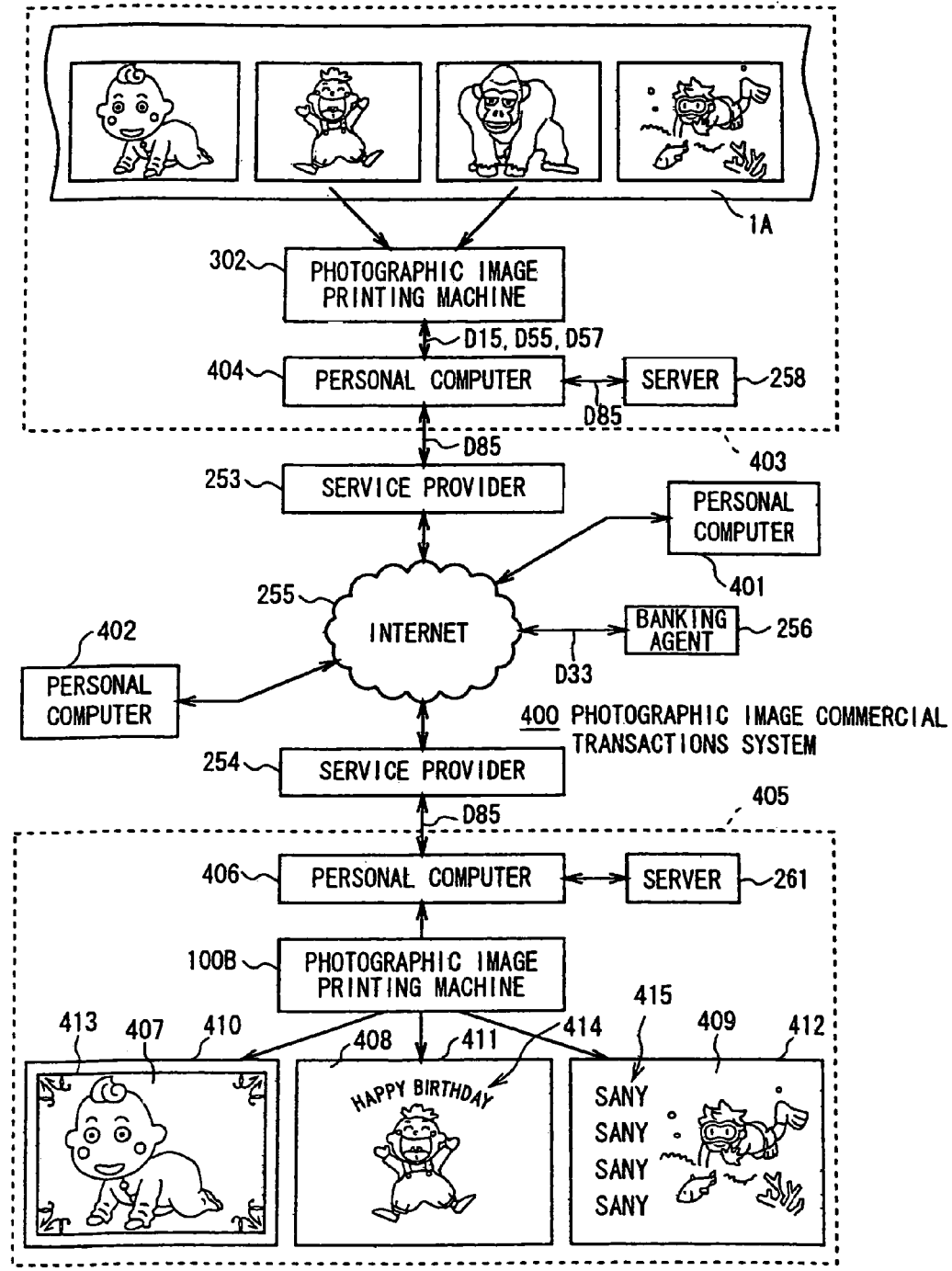
FIG. 43 is a block diagram showing a configuration of photographic image commercial transactions system according to a fourth embodiment.

FIG. 43 shows a photographic image commercial transactions system 400 according to a fourth embodiment of the invention, wherein the corresponding parts are designated by the same reference numerals in FIGS. 30 and 43. The photographic image commercial transactions system 400 according to the fourth embodiment of the invention is configured in the same way as the photographic image commercial transactions system 300 according to the second embodiment of the invention, except that a personal computer 401 owned by the forwarding request user and a personal computer 402 owned by the photograph shop recipient user are provided, and for the configuration of a reception shop personal computer 404 of a reception photograph shop 403 and a delivery shop personal computer 406 of a delivery photograph shop 405.

In the reception photograph shop 403, if the forwarding request user makes a request for forwarding the print photographs, the reception shop photographic image printing machine 302 produces the film data D15 on the basis of the APS negative film 1A. The produced film data D15 is then passed to the reception shop personal computer 404.

For the film data D15 of the above data format as shown in FIG. 39 that is provided from the reception shop photographic image printing machine 302, the reception shop personal computer 404 performs processes of synthesizing the processing image data, synthesizing the advertisement image data, scrambling and/or masking, as required, to produce the forwarding film data D85, and send the obtained forwarding film data D85 to the reception shop server 258, where the forwarding film data D85 is saved. The forwarding film data D85 is transmitted via the reception shop side service provider 253, the Internet 255 and the delivery shop service provider 254 to the delivery photograph shop 405.

In the delivery photograph shop 405, the delivery shop personal computer 406 receives the forwarding film data D85 from the reception photograph shop 403, and passes the received forwarding film data D85 to the delivery shop photographic image printing machine 100B. The delivery shop photographic image printing machine 10B produces the print photograph shops 410 to 412 of the photographic images 407 to 409 regenerated faithfully to the printing condition designated on the reception shop side and an index print, on the basis of the forwarding film data D85. The print photograph shops 410 to 412 and the index print are delivered to the photograph shop recipient user.

In this connection, for the print photograph shops 407 to 409 and the index print delivered to the photograph shop recipient user, by the synthesis process of synthesizing the converted photographic image data of the film data D15 and the processing image data, a frame ornament 413 and a message 414 is synthesized with the corresponding photographic images 407 and 408. By the synthesis process of synthesizing the converted photographic image data and the advertisement image data, an advertisement image 415 is synthesized with a corresponding photographic image 409.

Also, for the print photograph shops 407 to 409 and the index print, by the scrambling/masking process for the converted photographic image data of the film data D15, the corresponding photographic image is scrambled or masked (not shown).

And the reception shop side service provider 253 retrieves the billing information consisting of the delivery shop side settling information and the reception shop side settling information contained in the forwarding film data D85 transferred from the reception photograph shop 403, and transmits the retrieved billing information as the charge accounting data D33 via the Internet 255 to the banking agent 256.

Thereby, the banking agent 256 executes the charge accounting process on the basis of the charge accounting data D33. As a result of the charge accounting process, the banking agent 256 electronically transfers the funds from one account to another for transactions among the forwarding request user, reception photograph shop 403, delivery photograph shop 405, reception shop side service provider 253 and delivery shop side service provider 254, thereby settling accounts for the forwarding of print photographs, to close an electronic commercial transaction for the forwarding of the print photographs.

In addition to the above configuration, in the case of this photographic image commercial transactions system 400, the reception shop personal computer 404 of the reception photograph shop 403 reads the corresponding forwarding film data D85 from the reception shop server 258, for example, ahead of forwarding the print photographs, and transmits the read forwarding film data D85 via the reception shop side service provider 253 and the Internet 255 to the personal computer 401 of the forwarding request user.

Figure 44:
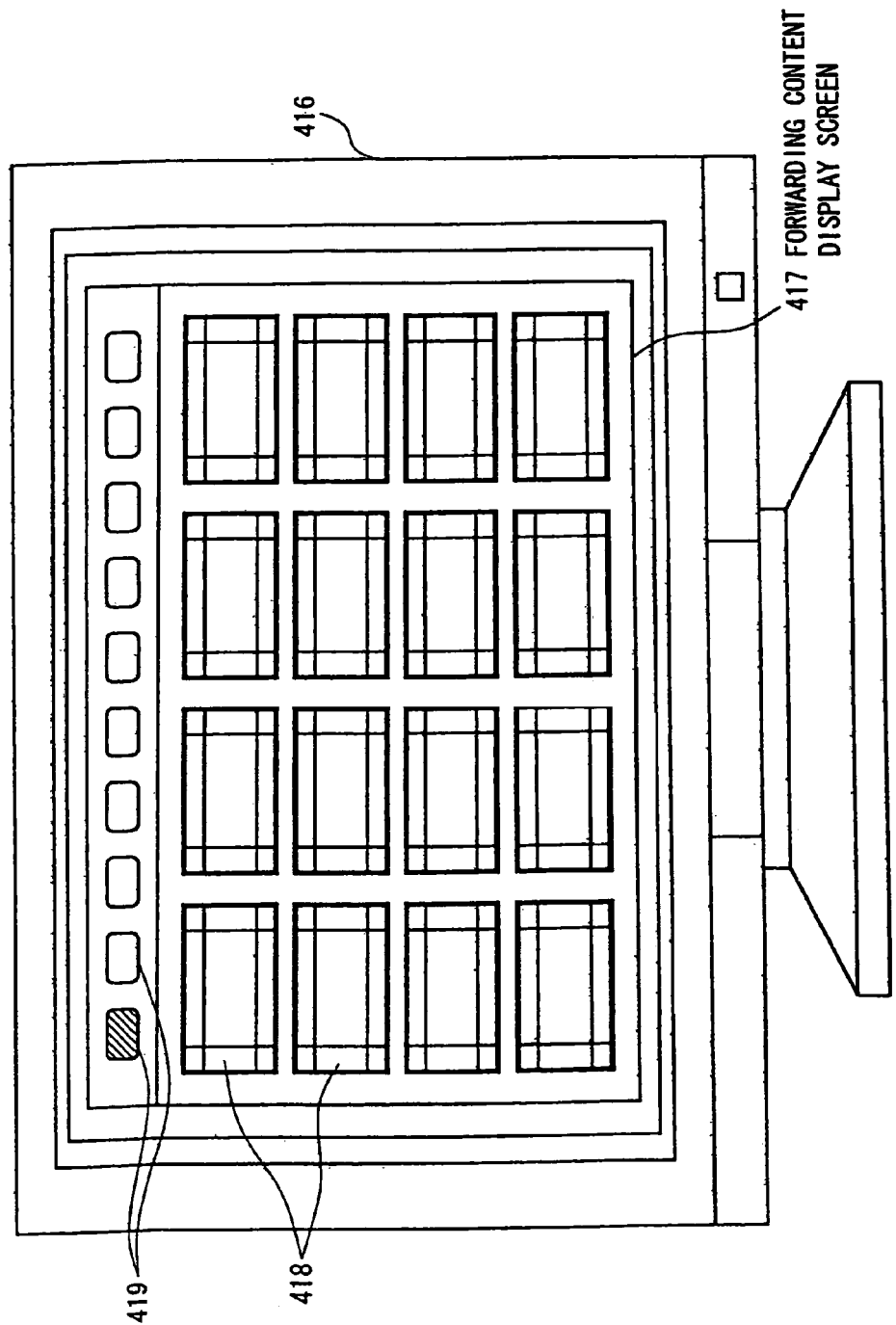
FIG. 44 is a schematic view showing a configuration of a forwarding content display screen displayed on a monitor.

The personal computer 401 of the forwarding request user produces the display data for displaying the forwarding contents including the printing condition and the forwarding fee (hereinafter referred to as the forwarding content display data) on the basis of the forwarding film data D85 provided from the reception photograph shop 403, and transfers the forwarding content display data to a monitor 416, as shown in FIG. 44. As a result, a forwarding content display screen 417 on the basis of the forwarding content display data appears on the monitor 416.

On this forwarding content display screen 417, each photographic image 418 regenerated in accordance with the printing condition of print photograph shop to be forwarded (design, composition and image quality, state of additional processing with frame ornament and message, advertisement, etc.) is displayed in thumbnail as the forwarding content of print photographs, and various kinds of information including the printing condition and the forwarding fee is displayed to be selectable in terms of a variety of kinds of icon 419 provided on the forwarding content display screen 417.

Thereby, the personal computer 401 of the forwarding request user enables the forwarding request user to confirm, on the forwarding content display screen 417, the forwarding content consisting of the photographic image that is regenerated from the print photograph shop to be forwarded and various conditions such as the printing condition of the photographic image.

Figure 45:
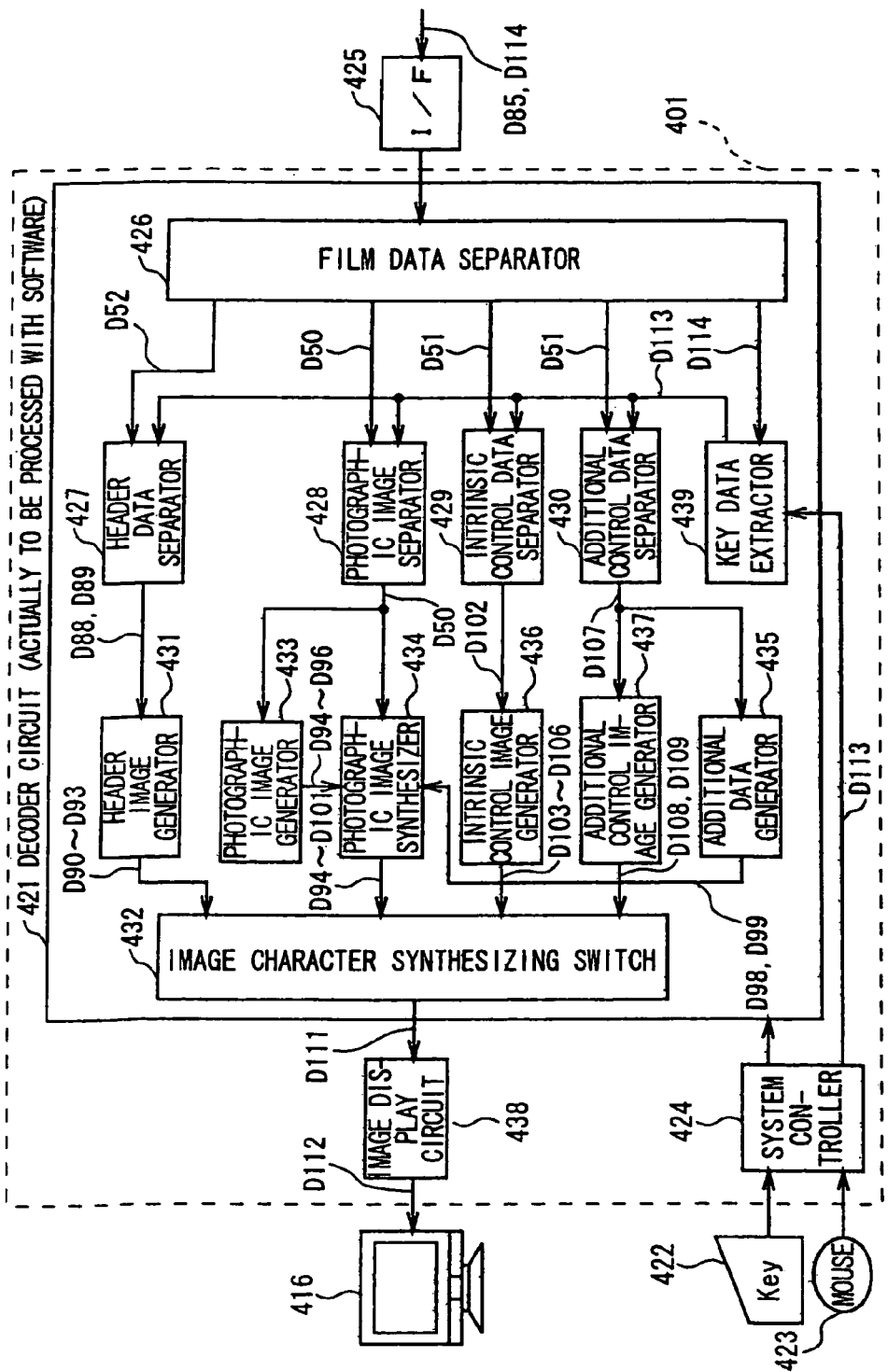
FIG. 45 is a block diagram showing a circuit configuration of a personal computer of a forwarding request user.

In practice, the personal computer 401 of the forwarding request user accepts the forwarding film data D85 into a decoder circuit 421 via a predetermined interface 420 such as an external modem or a cable, the forwarding film data D85 being transmitted from the reception photograph shop 403 (FIG. 43) via the reception shop side service provider 253 and the Internet 255 as shown in FIG. 45.

In the decoder circuit 421, the following processing is executed by a predetermined software under the control of a system controller 424 into which a display selection instruction is input by means of a keyboard 422 and a mouse 423, thereby switching the display content of the forwarding content display screen 417 (FIG. 44). For clear understanding, each functional block of the software will be described below separately.

That is, in the decoder circuit 421, the forwarding film data D85 given via an interface 425 is captured in a film data separating portion 426.

The film data separating portion 426 separates the film header data D52 from the forwarding film data 85, and separates the converted photographic image data D50 and the photographic image header data D51 in succession from the remaining data row, sends such film header data D52 to a header data separating portion 427, and sends the converted photographic image data D50 to a photographic image separating portion 428 and sends the photographic image header data D51 to an inherent control data separating portion 429 and an additional control data separating portion 430.

Then, the header data separating portion 427 fetches from the film header data D52 given from the film data separating portion 426 billing information and photograph shop information stored therein, and sends the same to a header image generating portion 431 as billing information data D88 and photograph shop information data D89.

The header image generating portion 431 generates billing icon data D90 for selecting the display of the billing information, and generates photograph shop icon data D91 for selecting the display of the photograph shop information and sends these data to an image composition switching portion 432.

In addition, if the display of the billing information is requested, the header image generating portion 431 generates billing information image data D92 constituted by letter strings, symbols and the like for displaying the content of the billing information on the basis of the charge account information data D88 given from the header data separating portion 427 and sends the same to the image composition switching portion 432, and if the display of the photograph shop information is requested, the header image generating portion generates the photograph shop information image data D93 constituted by letter strings, symbols and the like for displaying the content of the photograph shop information on the basis of the photograph shop information data D89 given from the header data separating portion 427 and sends the same to the image composition switching portion 432.

Also, a photographic image separating portion 428 separates from the converted photographic image data D50 given from the film data separating portion 426 the processing image data and the advertisement image data synthesized with the converted photographic image data D50, and sends the processing image data and the advertisement image data to a photographic image generating portion 433 and a photographic image synthesizing portion 434.

If the display of any of photographic images with angles of view in accordance with first to third printing types is requested, the photographic image generating portion 433 generates first to third photographic image data D94 to D96 with angles of view in accordance with the corresponding first to third printing types on the basis of the converted photographic image data D50 given from the photographic image separating portion 428, and sends the first to third photographic image data D94 to D96 to a photographic image synthesizing portion 434.

Also, if the batch display of photographic images of all printing types is requested, the photographic image synthesizing portion 434 generates batch photographic image data D97 that has an angle of view in accordance with the first printing type and in which lines showing angles of view in accordance with the second and third printing types are synthesized, on the basis of the converted photographic image data D50 given from the photographic image separating portion 428, and sends the batch photographic image data D97 to the image composition switching portion 432, and if the display of any of photographic images with angles of view in accordance with the first to third printing types is requested, the photographic image synthesizing portion 434 sends the corresponding first to third photographic image data D94 to D96 given from the photographic image generating portion 433 to the image composition switching portion 432.

In this connection, if process trimming display is requested, the photographic image synthesizing portion 434 sends processing image data D98 of frame ornament and/or messages and advertisement image data D99 of advertisement to the image composition switching portion 432 together with the corresponding batch image photographic image data D97 or the first to third photographic image data D94 to D96.

In addition, the photographic image synthesizing portion 434 generates display icon data D100 for selecting the display of the photographic image based on the batch photographic image data D97 and the first to third photographic image data D94 to D96, and process display icon data D101 for selecting the process trimming display, and sends the display icon data D100 and the process display icon data D101 to the image composition switching portion 432.

On the other hand, the inherent control data separating portion 429 separates inherent control data D102 from the photographic image header data D51 given from the film data separating portion 426, and sends the inherent control data D102 to an inherent control image generating portion 436.

Then, the inherent control image generating portion 436 generates inherent icon data D103 for selecting the display of the inherent control data D102 and sends the inherent icon data D103 to the image composition switching portion 432, and if the display of the inherent control data D102 is requested, the inherent control image generating portion 436 generates inherent control image data D104 constituted by letter strings and symbols for displaying its content on the basis of the inherent control data D102, and sends the inherent control image data D104 to the image composition switching portion 432.

In addition, the inherent control image generating portion 436 generates order icon data D105 for selecting the display of information of printing types and printing volumes (hereinafter, they are together referred to as order information) and sends the order icon data D105 to the image composition switching portion 432, and if the display of the order display is requested, the inherent control image generating portion 436 generates order information image data D106 constituted by letter strings and symbols for displaying the content of the order display, and sends the order information image data D106 to the image composition switching portion 432.

Also, the additional control data separating portion 430 separates additional control data D107 from the photographic image header data D51 given from the film data separating portion 426 and sends the additional control data D107 to an additional control image generating portion 437 and a process data generating portion 435.

The additional control image generating portion 437 generates additional icon data D108 for selecting the display of the additional control data D107 and sends the additional icon data D108 to the image composition switching portion 432, and if the display of the additional control data D107 is requested, the additional control image generating portion 437 generates additional control image data D109 constituted by letter strings, symbols and the like for displaying its content on the basis of the additional control data D107 given from the additional control data separating portion 430, and sends the additional control image data D109 to the image composition switching portion 432.

If the display of process trimming is requested, the process data generating portion 435 generates the process image data D98 of frame ornaments and messages synthesized with the corresponding converted photographic image data D50 on the basis of frame ornament data and message data stored in the additional control data D107 and generates the advertisement image data D99 of advertisement synthesized with the corresponding converted photographic image data D50 on the basis of the advertisement data stored in the additional control data D107, and sends these data to the photographic image synthesizing portion 434.

And every time a display selection instruction is inputted in the system controller 424, the image composition switching portion 432 synthesizes in accordance with the display selection instruction the aforesaid each data given from the header image generating portion 431, the photographic image synthesizing portion 434, the inherent control image generating portion 436 and the process control image generating potion 437, and sends obtained composition image data D111 to an image display circuit 438.

Thereby, the image display circuit 438 generates forwarding content display data D112 on the basis of the composition image data D111 given from the decoder circuit 421 and sends the forwarding content display data D112 to the monitor 416, thereby displaying on the monitor 416 the forwarding content display screen 417 (FIG. 44) based on the forwarding content display data 112.

In this connection, in the reception photograph shop 403 (FIG. 43), in addition to scrambling process for every converted photographic image data D50, the entire forwarding film data D85 may also be subjected to the scrambling process and is sent, thereby enhancing their concealment.

And in the reception photograph shop 403, when the forwarding film data D85 subjected to the scrambling process is sent to the forwarding request user's personal computer 401, transmission data D114 including key data D113 is transmitted to the forwarding request user's personal computer 401 together with or at a different timing with the forwarding film data D85 subjected to the scrambling process, and in addition to this transmission data, the key data D113 is provided to the forwarding request user.

Thus, when the forwarding film data D85 subjected to the scrambling process is transmitted from the reception photograph shop 403, the forwarding request user's personal computer 401 (FIG. 45) captures the transmission data D114 that is transmitted together with or separately with the forwarding film data D85 in the film data separating portion 426 of the decoder circuit 421 via the interface 425 and sends the captured transmission data D114 to a key data extracting portion 439.

Also, in the forwarding request user's personal computer 401, the key data D113 is inputted via a keyboard 435 by the forwarding request user provided with the key data D113 (that is coded data, for example) from the reception photograph shop 403, and the inputted key data D113 is sent from the system controller 424 to the key data extracting portion 439.

And the key data extracting portion 439 extracts the key data D113 (that is coded data, foe example) from the transmission data D114 given from the film data separating portion 426, but compares the extracted key data D113 with the key data D113 given from the system controller 424 and the key data D113 only when they match each other is sent to the header data separating portion 427, the photograph shop image separating portion 428, the inherent control data separating portion 429 and the additional control data separating portion 430.

Thereby, the header data separating portion 427, the photographic image separating portion 428, the inherent control data separating 429 and the additional control data separating portion 430 give descrambling process to the each corresponding film header data D52, converted photographic image data D50, inherent control data D102 and additional control data D107, on the basis of the key data D113.

Also, in the reception photograph shop 403, even when only the converted photographic image data. D50 is subjected to the scrambling process, it is possible to make the forwarding request user's personal computer 401 cancel the scrambling process in a similar way.

In this way, in the reception photographic shop 403, even when the forwarding film data D85 and the key data D113 are erroneously sent, it is possible to prevent unauthorized access to the photographic image based on the forwarding film data D85 and to disclose the forwarding content display screen 417 only to the forwarding request user.

Figure 46:
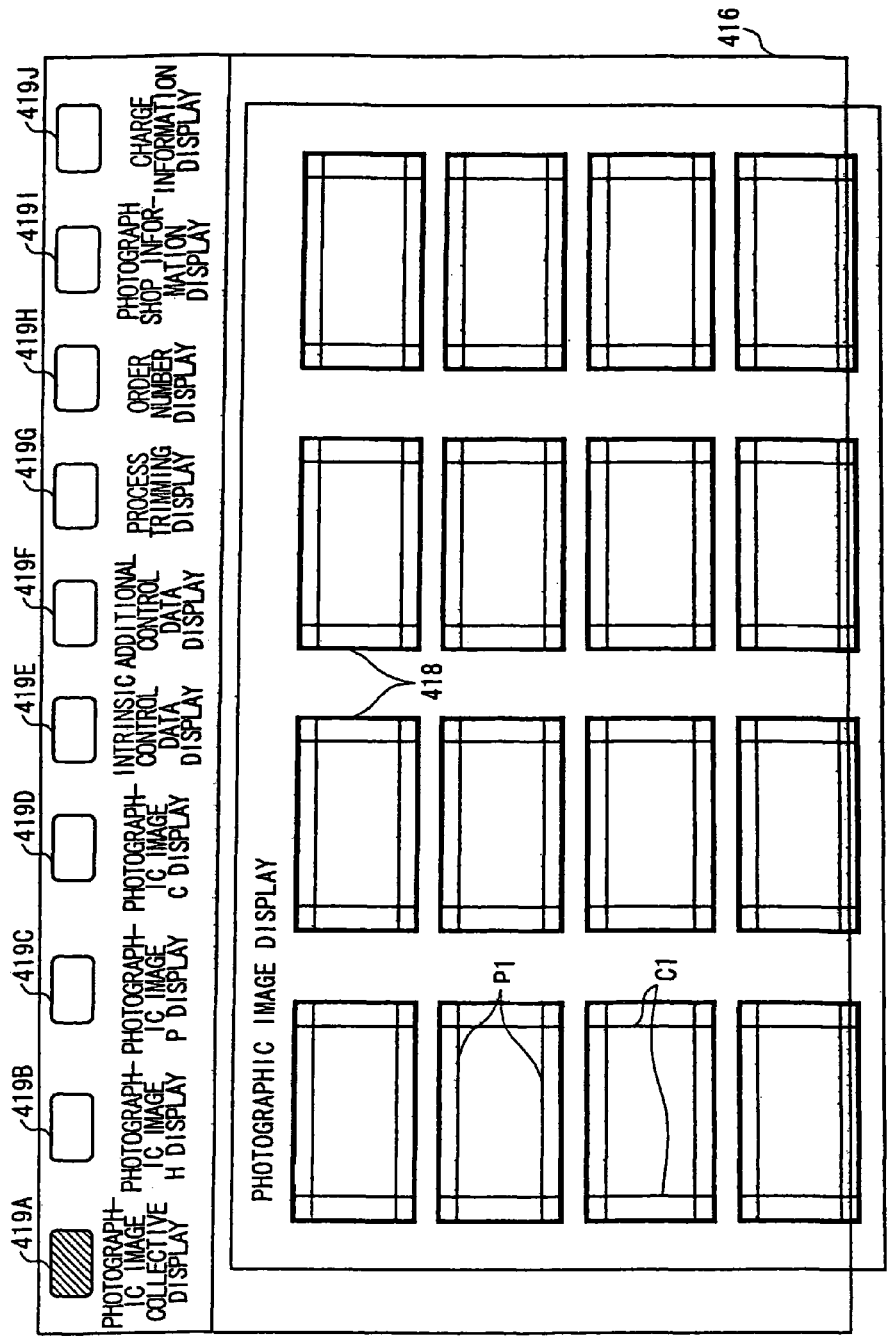
FIG. 46 is a schematic view showing a detailed configuration of a forwarding content display screen.

Herein, in practice, as shown in FIG. 46, in the forwarding content display screen 417, the photographic image 418 of the print photograph shop for which a forwarding request is made is displayed in thumb-nail, and a photographic image batch displaying icon 419A, a photographic image H displaying icon 419B, a photographic image P displaying icon 419C and a photographic image C displaying icon 419D based on the display icon data D100 (FIG. 45), an inherent control data displaying icon 419E based on the inherent icon data D103, an additional control data displaying icon 419F based on the additional icon data D108, a process trimming displaying icon 419G based on the process display icon data D101, an order number displaying icon 419H based on the order icon data D105, a photograph shop information displaying icon 419I based on the photograph shop icon data D91 and a billing information displaying icon 419J based on the billing icon data D90 are displayed.

And in the forwarding content display screen 417 displayed on the monitor 416 (FIG. 45), if a mouse cursor (not shown) is moved onto each icon in accordance with a mouse 423 (FIG. 45) operation and a click operation is performed, the decoder circuit 421 carries out the aforesaid set of processes in accordance with the click operation, thereby switching the content of display such that the icon selected through the click is changed to a display showing the selection by color and the like and the information corresponding to the icon is displayed.

That is, if the photographic image all displaying icon 419A is selected by the operation of the mouse 436 (FIG. 45) when the forwarding content display screen 417 (FIG. 46) is displayed on the monitor 416, the decoder circuit 421 changes each of the angles of view of all the photographic images 418 in the screen to the angle of view of the first printing type synthesized with lines P1 and C1 showing angles of view in accordance with the second and third printing types on the basis of the corresponding batch photographic image data D97.

Figure 47:
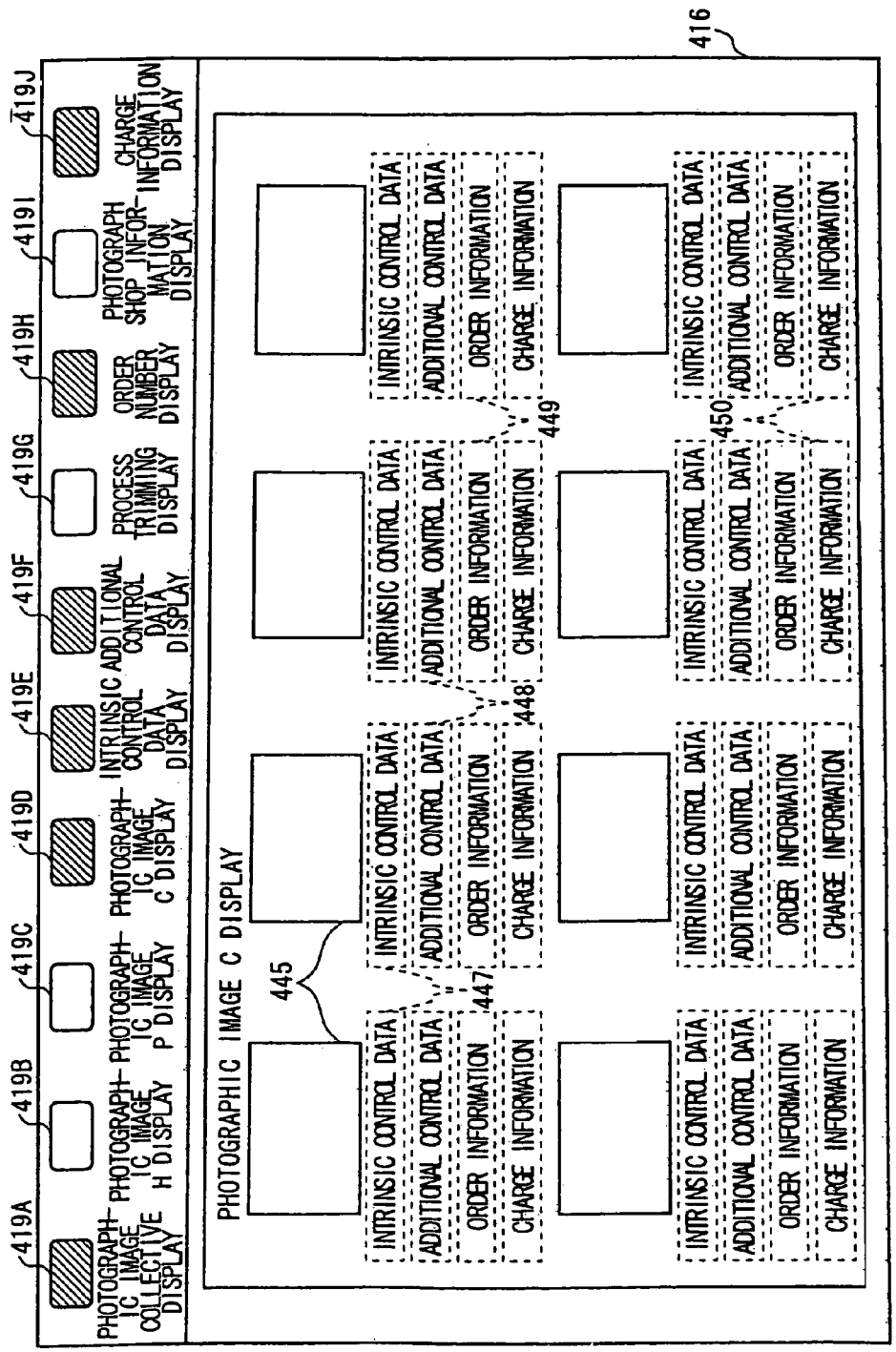
FIG. 47 is a schematic view showing a detailed configuration of a forwarding content display screen.
Figure 48:
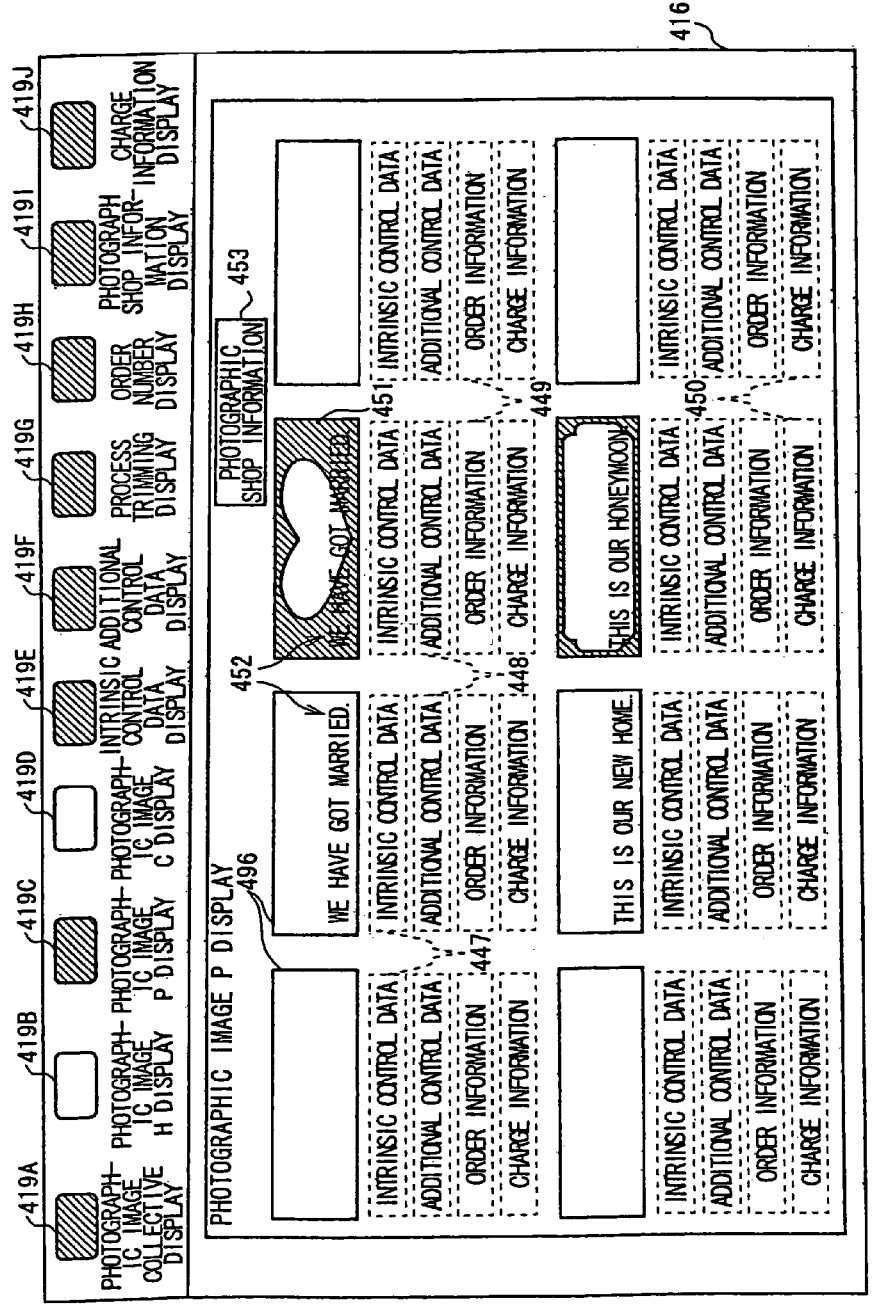
FIG. 48 is a schematic view showing a detailed configuration of a forwarding content display screen.

Also, as shown in FIG. 47 and FIG. 48, if the photographic image C displaying icon 419D is selected through the operation of the mouse 436 (FIG. 45), the decoder circuit 421 changes the angles of view of all photographic images 445 in the screen to the angle of view of the third printing type based on the each corresponding third photographic image data D96.

In this connection, if the photographic image H displaying icon 419B is selected through the operation of the mouse 436, the decoder circuit 421 changes angles of view of all photographic images in the screen to the angle of the first printing type based on the each corresponding first photographic image data D94 (not shown), and if the photographic image P displaying icon 419 C is selected, the decoder circuit 421 changes angles of view of all photographic images 446 in the screen to the angle of view of the second printing type based on the each corresponding second photographic image data D95.

And if the inherent control data displaying icon 419E is selected through the operation of the mouse 436, the decoder circuit 421 has the content of the inherent control data (printing condition, etc.) displayed on an inherent control data display region 447 at the downside of each photographic image 445 and 446, on the basis of the each corresponding inherent control image data D104, and if the additional control data displaying icon 419F is selected, the decoder circuit 421 has the content of the additional control data (the content of additional processing) displayed on an additional control data display region 448 at the downside of each photographic image 445 and 446 based on the additional control image data D109.

Also, if the order number displaying icon 419H is selected through the operation of the mouse 436, the decoder circuit 421 has the content of the order information (the printing type and the printing volume) displayed on an order number display region 449 at the downside of each photographic image 445 and 446 on the basis of the order information image data D106, and if the billing information displaying icon 419J is selected, the decoder circuit 421 has the content of the billing information on a billing information display region 450 at the downside of each photographic image 445 and 446 on the basis of the billing information image data D92.

Furthermore, if the process trimming displaying icon 419G is selected through the operation of the mouse 436, the decoder circuit 421 has the flame ornament 451 and the message 452 based on the process image data D98 displayed on the corresponding photographic image 446 in an overlapping manner at the angle of view being displayed at that time, and has the advertisement based on the advertisement image data D99 (not shown) displayed on the corresponding photographic image 446 in an overlapping manner.

In addition, if the photograph shop information displaying icon 419I is selected through the operation of the mouse 436, the decoder circuit 421 has the content of the photograph shop information displayed on a photograph shop information displaying region 453 on the basis of the photograph shop information image data D93.

Figure 49:
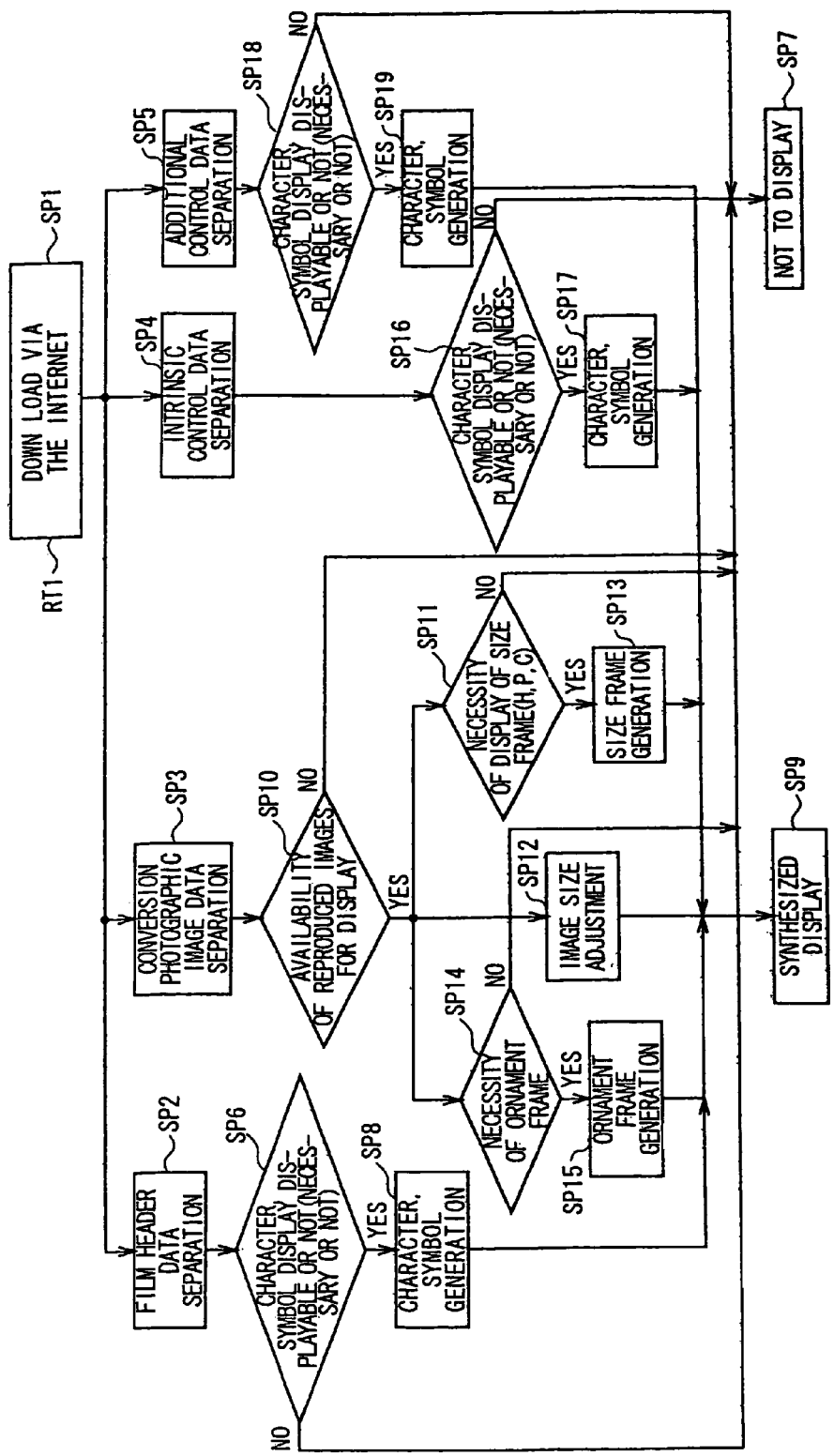
FIG. 49 is a flow chart showing a display process procedure of a forwarding contents display screen.

Actually, upon capturing the forwarding film data D85 transmitted from the reception photograph shop 403 via the interface 425, the decoder circuit 421 enters a display processing procedure RT1 on the forwarding display screen 417 shown in FIG. 49 from a step SP1, and in following steps SP2 to SP5, separates the film header data D52, the converted photographic image data D50 and the photograph shop image header data D51 from the forwarding film data D85 and separates the inherent control data D102 and the additional control data D107 from the photographic image header data D51, followed by carrying out a process using the film header data D52, a process using the converted photographic image data D50, a process using the inherent control data D102 and a process using the additional control data D107 in parallel.

That is, upon separating the film header data D52 from the forwarding film data D85 in the step SP2, the decoder circuit 421 enters a following step SP6 to determine whether the billing information and the photograph shop information are stored in the film header data D52 or not, and if the billing information and the photograph shop information are not stored in the film header data D52, the decoder circuit 421 enters a step SP7 to cancel the generation of the billing information image data D92 and the photograph shop information image data D93 for information that is not stored.

Also, in this step SP6, if the billing information and the photograph shop information are stored in the film header data D52, the decoder circuit 421 waits a request for display of the stored billing information and photograph shop information, and refrains from entering a step SP7 to generate the billing information image data D92 and the photograph shop information image data D93 based on the billing information and the photograph shop information until such display is requested.

And in the step SP6, when the display of the billing information and the photograph shop information is requested, the decoder circuit 421 enters a step SP8 to generate the billing information image data D92 and the photograph shop information image data D93 based on the billing information and the photograph shop information, and enters a step SP9.

Also, upon separating the converted photographic image data D50 from the forwarding film data D85 in the step SP3, the decoder circuit 421 enters a following step SP10 to determine whether the display of the photographic image based on each converted photographic image data D50 is possible or not.

In this step SP10, obtaining a negative result means that there exist the converted photographic image data D50 which is subjected to the masking process and the converted photographic image data D50 which is subjected to the scrambling process and is not provided with the key data D113 for canceling the scrambling process (descrambling process), and the picture of the photographic image based on these converted photographic image data D50 is not visible clearly or not visible at all, and at this time, the decoder circuit 421 enters the step SP7 only for the processing of these corresponding converted photographic image data D50 to cancel the display of their photographic images.

Also, in this step SP10, obtaining a positive result means that there exist the converted photographic image data D50 which is not subjected to the masking process and the converted photographic image data D50 which is subjected to the scrambling process but is provided with the key data D113 for canceling the scrambling process. (descrambling process), and the photographic image based on these converted photographic image data D50 (hereinafter, this is particularly referred to as display capable photographic image data) can be displayed, and at this time, the decoder circuit 421 separates from the display capable photographic image data D50 the process image data and the advertisement image data synthesized therewith, followed by entering a step SP11 and a step SP12 simultaneously, and waiting until the batch display of photographic images is requested in the step SP11 and waiting until the display of any of photographic images with angels of view corresponding to the first to third printing types is requested in the step SP12.

Herein, in the step SP11, the decoder circuit 421 waits to see whether the batch display of photographic images is requested or not, and refrains from entering the step SP7 to generate the batch photographic image data D97 based on the display capable photographic image data D50 until the batch display of the photographic images is requested.

And in the step SP11, if the batch display of the photographic images is requested, the decoder circuit 421 enters a step SP13 to generate the batch photographic image data D97 based on the display capable photographic image data D50, and enters the step SP9.

Also, in the step SP12, if the display of any of the photographic images with angles of view corresponding to the first to third printing types is requested, the decoder circuit 421 generates the first to third photographic image data D94 to D96 of angles of view corresponding to the first to third printing types on the basis of the display capable photographic image data D50, and enters the step SP9.

By the way, when carrying out processing related to any one of the step SP11 and the step SP12 in this way, the decoder circuit 421 waits until the process framing display is requested in parallel in a step SP14, and refrains from entering the SP7 to generate the process image data, D98 and the advertisement image data D99 until such display is requested.

And if the process framing display is requested in this step SP14, the decoder circuit 421 enters a following step SP15 to generate the process image data D98 on the basis of the frame ornament data and the message data stored in the additional control data D107 and generate the advertisement image data D99 on the basis of the advertisement data stored in the additional control data D107, and enters the step SP9.

On the other hand, the decoder circuit 421 separates the inherent control data D102 from the photographic image header data D51 in the step SP4, and then enters a following step SP16 to determine whether the order information is stored in the inherent control data D102 or not, and if such order information is not stored, the decoder circuit 421 enters the step SP7 to cancel the generation of the order information image data D106 for the order information.

While on the other hand, in this step SP16, if the order information is stored in the inherent control data D102, the decoder circuit 421 waits a request for the display of the inherent control data D102 and a request for its order information as well, and refrains from entering the step SP7 to generate the order information image data D106 and the inherent control image data D104 until the display of these order information and inherent control data D102 is requested.

And if the display of the order information and the inherent control data D102 is requested in the step SP16, the decoder circuit 421 enters a following step SP17 to generate the order information image data D106 based on the order information and the inherent control image data D104 based on the inherent control data D102, enters the step SP9.

Also, the decoder circuit 421 separates the additional control data D107 from the photographic image header data D51, and then enters a following step SP18 to determine whether the additional process information is stored in the additional control data D107 or not, and if such process information is not stored, the decoder circuit 421 enters the step SP7 to cancel the generation of the additional control image data D109.

While on the other hand, in this step SP16, if the additional process information is stored in the additional control data D107, the decoder circuit 421 waits a request for the display of the additional control data D107, and refrains from entering the step SP7 to generate the additional control image data D109 until the display of such additional control data D107 is requested.

And if the display of the additional control data D107 is requested in the step SP16, the decoder circuit 421 enters a following step SP19 to generate the order information image data D106 based on the order information and the additional control image data D109 based on the additional control data D107, and enters the step SP9.

As described above, the decoder circuit 421 thus carries out a process using the film header data D52, a process using a converted photographic image data D50, a process using the inherent control data D102 and a process using the additional control data D107 in parallel to generate each kind of image data, and in the step SP9, synthesizes the each kind of image data and thus generates the composition image data D111.

In this connection, when carrying out the process using the film header data D52, the process using the converted photographic image data D50, the process using the inherent control data D102 and the process using the additional control data D107 in parallel, the decoder circuit 421 generates the billing icon data D90, the photograph shop icon data D91, the display icon data D100, the process display icon data D101, the inherent icon data D103, the additional icon data D108 and the order icon data D105 respectively in each corresponding process, and has these icon data also added to the composition image data D111.

Thus, in the forwarding request user's personal computer 401 (FIG 43), it is possible to reproduce the printing condition of print photograph shop that is actually forwarded on the forwarding content display screen 417 displayed on the monitor 416 to be visually checked, and it is possible to have various kinds of information such as the printing condition, the forwarding pattern and the forwarding fee of such print photograph shop checked, in advance.

Also, in this personal computer 401, when the forwarding user provides instructions to change the forwarding content as a result of checking the forwarding content of the print photograph shop on such forwarding content display screen 417, the reception photograph shop 403 is notified of the content of the change, thereby making it possible to have the forwarding film data D85 changed in accordance with the change of the forwarding content.

And in the reception photograph shop 403, since the forwarding content of the forwarding film data D85 can be changed as a result of checking the forwarding content in this way, the forwarding content display screen 417 can be used not only for checking the forwarding content but for setting the forwarding content, and thus when the forwarding content is set, the forwarding request user does not needs to go to the reception photograph shop 403 but can set the forwarding content at home.

In addition, in this photograph shop image commercial transactions system 400 (FIG 43), the display function of the forwarding content display screen 417 provided on the personal computer 401 owned by the forwarding request user is also provided on the personal computer 402 owned by the photograph shop reception user, the reception shop personal computer 404 and the delivery shop personal computer 406.

Thus, in the reception photograph shop 403, when the forwarding request user visits the shop, the forwarding content display screen 417 is displayed on the monitor by the reception shop's personal computer 404, thereby making it possible to have the printing condition easily checked from the forwarding content without actually applying the printing process to the print photograph shop for which forwarding request is made by the forwarding request user, and to carry out processing easily on the spot even if some change in the forwarding occurs as a result of checking, and thus it is possible to have the forwarding content reproduced and checked speedily and reliably.

Also, in the photograph shop image commercial transactions system 400, since it is possible to have the forwarding content display screen 417 displayed on the monitor also in the personal computer 402 owned by the photograph shop reception user and the personal computer 406 of the delivery photograph shop 405, it is possible to have the picture, composition, image quality and the like of the print photograph shop to be forwarded, and the frame ornament and message or the synthesis condition of the advertisement visually checked in advance and have the printing condition and the like of the print photograph shop checked also at the photograph shop reception user and the delivery photograph shop 405.

And in the photograph shop image commercial transactions system 400, at the photograph shop reception user and the delivery photograph shop 405, if a permission from the forwarding request user is obtained when the forwarding content of the print photograph shop is checked in advance, a change (change of the printing type and the printing volume of the photographic image, and the existence and change, etc of the frame ornament and the message to be synthesized) can also be made to the forwarding content from the photograph shop reception user and the delivery photograph shop 405.

Also, in the photograph shop image commercial transactions system 400, if the forwarding content display screen 417 is displayed on the monitor by the personal computer 402 owned by the photograph shop reception user and the delivery shop personal computer 406 of the delivery photograph shop 405, it can be checked whether the forwarded print photograph shop is a correct one (whether it is not tempered in the course of transmission) and the forwarding of the print photograph shop can be made more reliable.

In the above described configuration, in this photographic image commercial transactions system 400, by the reception photograph shop 403, the converted photographic image data is generated from the photographic image of an APS negative film 1A in response to a request for the forwarding of the print photograph shop and generates the user data recorded in such an APS negative film 1A and the inherent control data based on the printing condition and the like designated at the forwarding request user and/or the reception photograph shop 403, and generates the forwarding film data D85 having the converted photographic image data and the inherent control data.

And in the reception photograph shop 403, as necessary, the forwarding content display screen 417 is displayed on the monitor based on the forwarding film data D85 by the reception personal computer 404 to check the forwarding content through the forwarding content display screen 417, and the forwarding film data D85 is transmitted from the reception shop personal computer 404 via the network to the personal computer 401 of the forwarding request user, the personal computer 402 of the photograph shop reception user and/or the personal computer 406 of the delivery shop 405, and thus the forwarding content display screen 417 is displayed on the monitor on the basis of the forwarding film data D85 also in the personal computer 401 of the forwarding request user, the personal computer 402 of the photograph shop reception user and/or the delivery shop personal computer 406 to have the forwarding content of the print photograph shop checked through the forwarding content display screen 417.

Thus, in the photographic image processing transactions system 400, prior to the forwarding of the print photograph, the print photograph shop can be reproduced on the forwarding content display screen 417 to have its forwarding content checked for the reception photograph shop 403, the delivery photograph shop 405, the forwarding request user and the photograph shop reception user respectively, without actually printing the print photograph, thus making it possible to have the forwarding content of the print photograph shop checked speedily and reliably.

According to the above configuration, by the reception photograph shop 403, to the converted photographic image data of the photographic image of the APS negative film 1A for which a forwarding request is made is added the inherent control data composed of the user data regenerated from the APS negative film 1A and the printing condition designated at the reception photograph shop 403 side to generate the forwarding film data D85, and the forwarding content of the print photograph shop to be forwarded is checked on the forwarding content display screen 417 based on the forwarding film data D85 displayed on the monitor 416 by the personal computer 401 of the forwarding request user, the personal computer 402 of the photograph shop reception user, the reception shop personal computer 404 or the delivery shop personal computer 406, thereby making it possible to reproduce the print photograph shop on the forwarding content display screen 417 to check the forwarding content speedily and reliably without actually printing the print photograph shop to be forwarded, in addition to the effects obtained thorough the first and second embodiments, thus the photographic image commercial transactions system capable of making the forwarding of the print photograph shop more easy can be achieved.

(8) Fifth Embodiment

Figure 50:
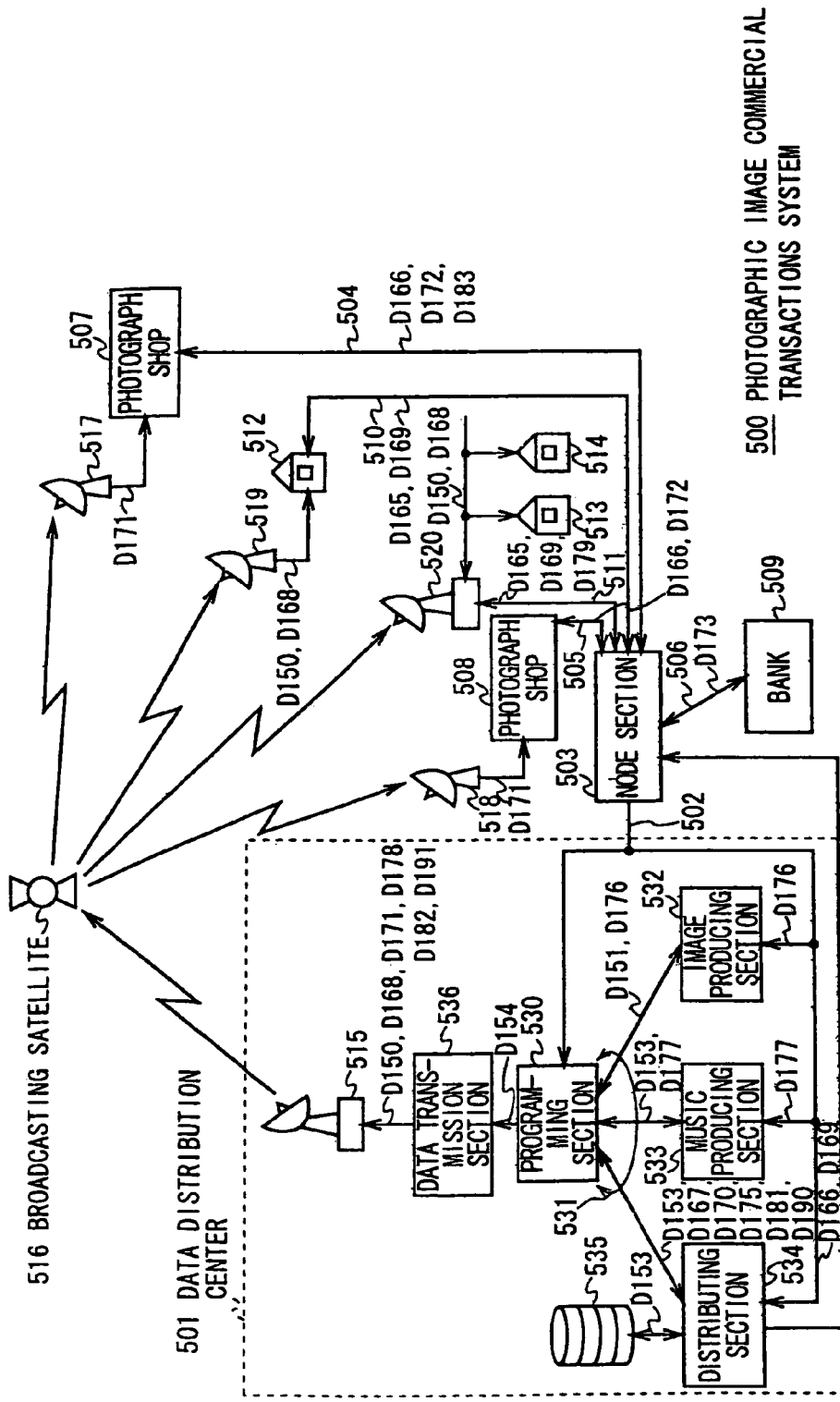
FIG. 50 is a block diagram showing a configuration of a photographic image commercial transactions system according to a fifth embodiment.
Figure 51:
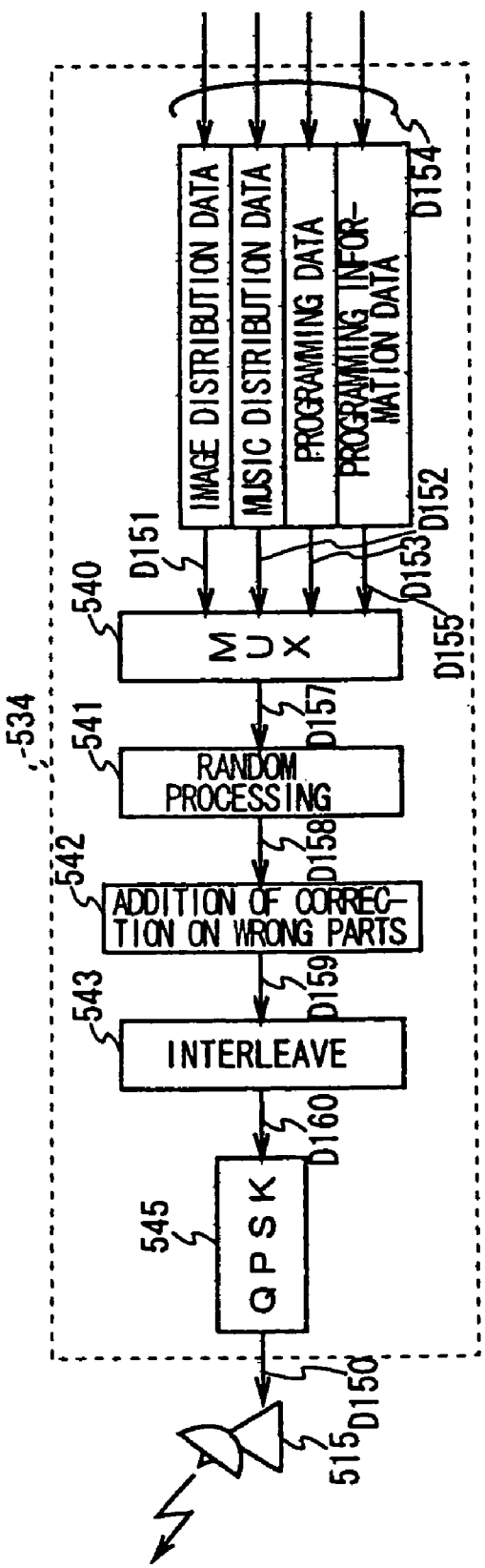
FIG. 51 is a block diagram showing a circuit configuration of data transmitting section.

FIG. 50 shows a photographic image commercial transactions system 500 according to the fifth embodiment, and is configured such that a node station 503 owned by a charge accounting dealer is connected to a data distribution center 501 owned by a data distribution dealer via an above-ground dedicated line 502, and photograph shops 507, 508 and a bank 509 are connected via above-ground dedicated lines 504, 505 and 506, and user's houses 512 to 514 are connected via a telephone line 510 or an above-ground dedicated line 511 such as a line for cable television to the node station 503.

And in this photographic image commercial transactions system 500, transmission data D150 transmitted from the data distribution center 501 via a satellite broadcasting antenna 515 towards a broadcasting satellite 516 can be received by satellite broadcasting receivers described later that are placed in the photograph shop 507, 508 and user's houses 512 to 514 via each corresponding satellite broadcasting antenna 517 to 520.

In the data distribution center 501, two or more channels worth of program organization is carried out by an organization station 530, and obtained program organization lists are supplied to an image production station 532, a music production station 533 and a distribution station 534 via an above-ground dedicated line 531.

The image production station 532 generates image distribution data D151 from a distribution object image content such as a movie for a program allocated on the basis of a program organization list given from the organization station 530, and various kinds of information such as duplicate limitation information, billing information, category codes and parent codes showing audio-visual age limits are added to such generated image distribution data D151 and are sent to the organization station 530 via the dedicated line 531.

Also, the music production station 533 generates music distribution data D152 from a distribution object music content such as music performed by musicians for a program allocated on the basis of a program organization list given from the organization station 530, and various kinds of information such as duplicate limitation information, billing information and category codes are added to such generated music distribution data D152 and are sent to the organization station 530 via the dedicated line 531.

Furthermore, the distribution station 534 stores in a server 535 connected thereto various kinds of program data D153 constituted by image data and voice data produced at a television station (not shown), and if the program list is given from the organization station 530, the distribution station 534 reads out the program data D153 designated based on the program organization list from the server 535 and sends the same to the organization station 530 via the dedicated line 531.

The organization station 530 generates program information data constituted by program tables introducing broadcast contents for each channel and the like on the basis of the program organization list, and if the image distribution data D151, the music distribution data D152 and the program data D153 are given from the image production station 532, the music production station 533 and the distribution station 534, the organization station 530 generates broadcast distribution data D154 from the image distribution data D151, the music distribution data D152 and the program data D153 for each channel and the program information data, and sends the generated two or more channels worth of broadcast distribution data D154 to a data transmission station 536.

The data transmission station 536 captures the broadcast distribution data D154 (image distribution data D151, music distribution data D152, program data D153 and program information data D155) given from the organization station 530 in a multiplexer 540 for each channel.

The multiplexer 540 compresses and encodes the image distribution data D151, the music distribution data D152, the program data D153 and the program information data D155 of the broadcast distribution data D154 given from the organization station 530 into packets in succession respectively for a predetermined unit by, for example, a Moving Picture Experts Group (MPEG) system, time-division multiplexes the obtained packets, and sends multiplexed data D157 obtained in this way to a randomization circuit 541.

The randomization circuit 541 subjects the multiplexed data D157 given from the multiplexer 540 to a randomizing process to change the list of the packet data constituting the multiplexed data D157 to randomness, and sends the obtained randomized data D158 to an error correction addition circuit 542.

The error correction addition circuit 542 generates error correction data from the randomized data D158 given from the randomization circuit 541, and adds the error correction data to randomized data D158, thereby sending the obtained error correction addition data D159 to an interleave circuit 543.

The interleave circuit 543 subjects the error correction addition data D159 given from the error correction addition circuit 542 to an interleave process, and sends the obtained interleave data D160 to a modulation circuit 545.

Thereby, the modulation circuit 545 modulates interleave data D160 given from the interleave circuit 543 by, for example, a Quadrature Phase Shift Keying (QPSK) system, and transmits the obtained transmission data D150 from the satellite broadcasting antenna 515 towards the broadcasting satellite 516 as output of the data transmission station 536.

And the transmission data D150 sent from the data distribution center 501 (FIG. 50) towards the broadcasting satellite is received by the satellite broadcast reception device of each house 512 to 514 via the satellite broadcasting antennas 519 and 520.

Figure 52:
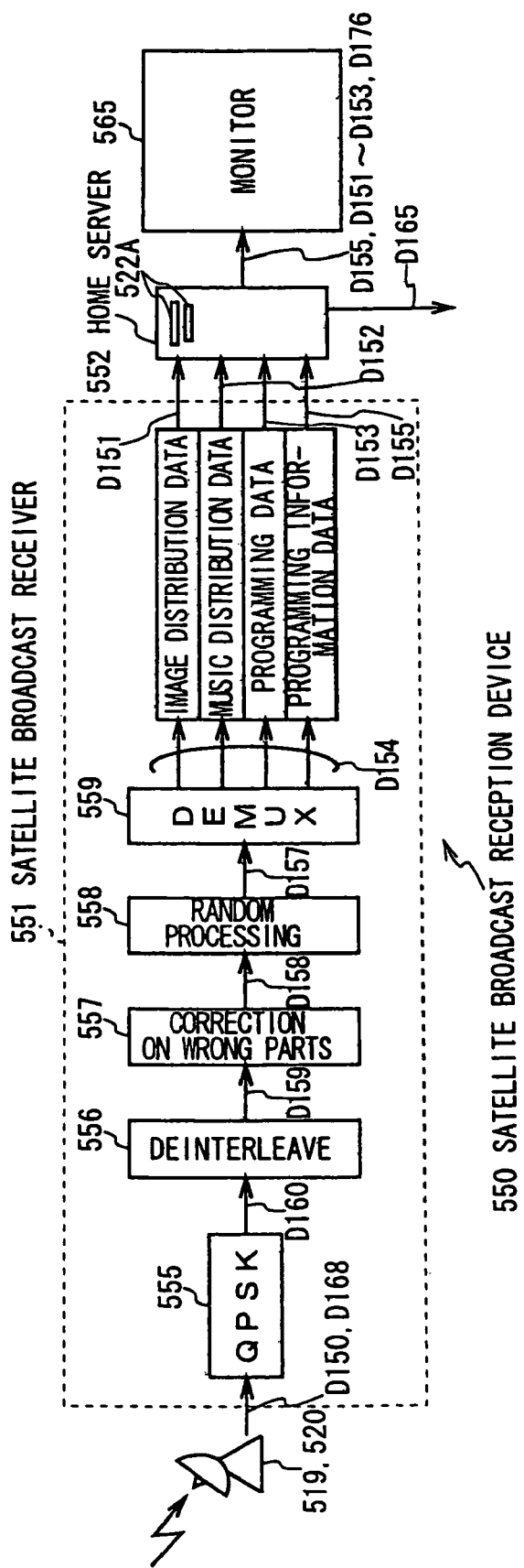
FIG. 52 is a block diagram showing a circuit configuration of a satellite broadcast reception device.

As shown in FIG. 52, the satellite broadcast reception device 550 is constituted with a satellite broadcast receiver 551 and a home server 552 storing a plurality of hard disks therein, and receives via the satellite broadcasting antennas 519 and 520 the transmission data D150 transmitted via the broadcasting satellite 516, by a demodulation circuit 555 of the satellite broadcast receiver 551.

The demodulation circuit 555 demodulates by the QPSK system the transmission data D150 received via the satellite broadcasting antennas 519 and 520, and sends the obtained interleave data D160 to a deinterleave circuit 556.

The deinterleave circuit 556 subjects the interleave data D160 given from the demodulation circuit 555 to a deinterleave process, and sends the obtained error correction addition data D159 to an error correction circuit 557.

The error correction circuit 557 separates the error correction data from the error correction addition data D159 given from the deinterleave circuit 556, subjects the randomized data D158 to an error correction process on the basis of such separated error correction data, and sends the randomized data D158 with its error corrected as a result thereof to a randomization circuit 558.

The randomization circuit 558 subjects the randomized data D158 given from the error correction circuit 557 to the randomizing process so that the list of the packet data constituting the randomized data D158 is turned back to the original list, and sends the obtained multiplexed data D157 to a demultiplexer 559.

The demultiplexer 559 separates the multiplexed data D157 given from the randomization circuit 558 into the packet data of the image distribution data D151, the music distribution data D152, the program data D153 and the program information data D155, subjects such separated packet data to a corresponding demodulation process in succession, sends the obtained broadcast distribution data D154 composed of the image distribution data D151, the music distribution data D152, the program data D153 and the program information data D155 to the home server 552, and thus makes the home server 552 store the two or more channels worth of broadcast distribution data D154 transmitted from the data distribution center 501.

The home server 552 reads the program information data D155 of the stored broadcast distribution data D154 from each hard disk to send the program information data to the monitor 565 in accordance with a user's operation, thereby having a program table based on the program information data D155 displayed on the monitor 565, and thus allowing the user to select a desired program through the program list.

And if the viewing of and listening to a desired program is selected and designated by the user, with the program table being displayed on the monitor 565, the home sever 552 reads the corresponding program data D153 from the internal hard disk to send the program data D153 to the monitor 565, thereby allowing the user to view and listen to the desired program.

Also, if the purchase of a desired image content is designated by the user, with the table list being displayed on the monitor 565, the home server 552 reads the corresponding image distribution data D151 from the internal hard disk to send the image distribution data D151 to the monitor 565, thereby allowing the user to view and listen to the desired image content.

Furthermore, the home server 552 is provided with a card slot 522A constituted by the interface for an Integrated Circuit (IC) card and a memory card (not shown), and if the purchase of a desired music content is designated by the user via the program table on the monitor 565, with the card slot 522A being loaded with the IC card or the memory card, the home server 552 reads the corresponding music distribution data D152 from the internal hard disk, and records the music distribution data D152 in the IC card or the memory card via the card slot 522A.

Thereby, the user can enjoy the music content, using a portable music player (not shown) using the IC card or the memory card.

In addition, when the purchase of the image content and the music content is designated, the home server 552 fetches the billing information added to their image distribution data D151 and music distribution data D152, and sends as billing data D165 the fetched billing information together with an ID that is allocated in advance to the user (hereinafter, it is referred to as a user ID) to the node station 503 via the telephone line 510 or the dedicated line 511 connected to the home server 552.

The node station 503 (FIG. 50) carries out a billing process on the basis of the billing data given from the user's satellite broadcast reception device 550, and sends the obtained result of the billing process to the bank 509 together with the user ID added to the billing data D165.

Thereby, the bank 509, for example, transfers the payment for purchase from the account of the user who has purchased the image content and the music content to the transactions account of the data distribution center 501 to carry out a payment process based on the result of the billing process and the user ID given from the node station 503.

Thus, in this way, the data distribution center 5.01 can distribute the image distribution data D151 and the music distribution data D152 together with program data D153 to a plurality of users, and if the image content and the music content are purchased in accordance with the distribution, the data distribution center 501 can carry out the payment process electronically to establish electronic commercial transactions for the purchase of such contents.

In this connection, when this kind of image content and music content are distributed, the data distribution center 501 can check the content of service to the user's camera using a path of the satellite broadcast or a path of the above-ground dedicated line, and can update the operating system of the satellite broadcast reception device 550, and so forth.

Figure 53:
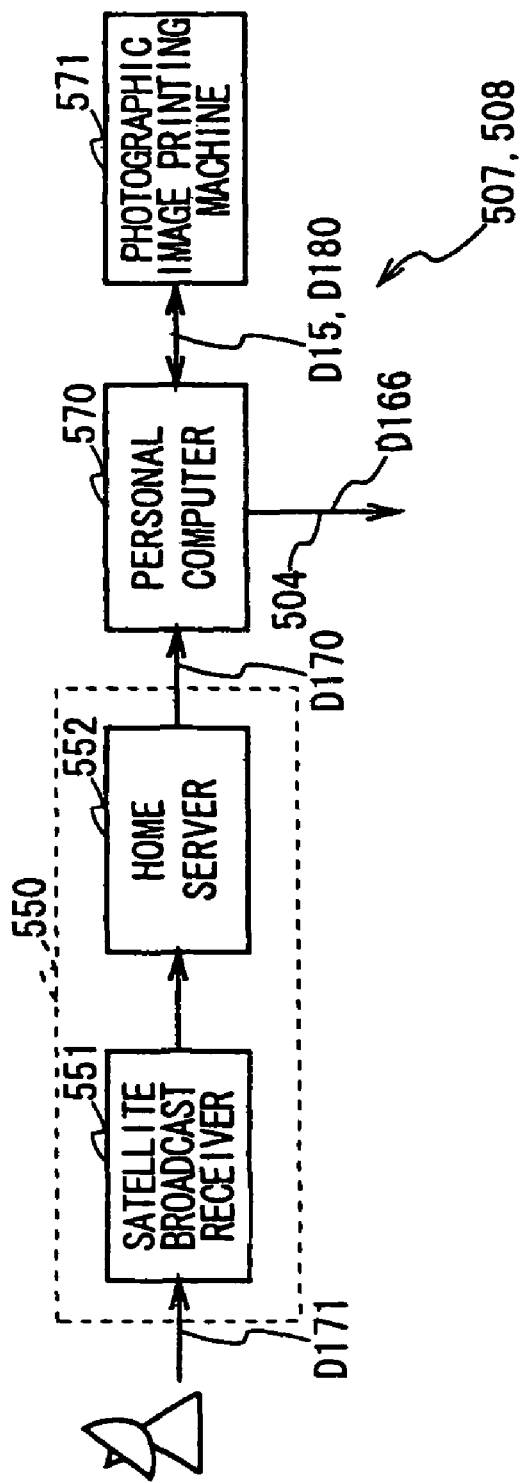
FIG. 53 is a block diagram showing a configuration of a photographic shop.

In addition to such a configuration, in case of this photographic image commercial transactions system 500, the photograph shops 507 and 508 are constituted by the satellite broadcast reception device 550 described above as to FIG. 52, a personal computer 570 connected to the dedicated line 504 and a photographic image printing machine 571, as shown in FIG. 53.

In these photograph shops 507 and 508, if a film cartridge (not shown) in which the APS film is stored is brought in by the user and the printing of the photographic images formed in exposure on the APS film is requested, the APS film is subjected to a development process, followed by using the obtained APS negative film with, for example, the photographic image printing machine 571 having a function similar to that of the reception shop photographic image printing machine 302 described above as to FIG 41 to generate the film data D15.

And in the photograph shops 507 and 508, order confirmation data D166 is generated having each photographic image displayed in thumb-nail, by, for example, the personal computer having a function similar to that of the reception shop personal computer 363 described above as to FIG 41 on the basis of its film data D15, the billing information for the printing request and the user ID of the printing requester are added to the generated order confirmation data D166, and the combined data are sent to the distribution station 534 (FIG. 50) via the dedicated line 504, the node station 503 (FIG. 50) and the dedicated line (FIG. 50) in succession.

The distribution station 534 (FIG. 50) stores in the server 535 the user ID owning the satellite broadcast reception device 550 and an inherent ID allocated in advance to the satellite broadcast reception device 550 (hereinafter, it is referred to as a receiver ID), with these IDS corresponding to each other, and if the order confirmation data D166 is given from the photograph shop 507 or 508, the distribution station fetches the user ID added to the order confirmation data D166.

And the distribution station 534 reads the receiver ID corresponding to the user ID from the server 535, adds the read receiver ID to the order confirmation data D166, and sends the obtained forwarding order confirmation data D167 to the organization station 530 via the dedicated line 531. 105461 Thereby, the organization station 530 sends the forwarding order confirmation data D167 given from the distribution station 534 to the data transmission station 536 as a part of two or more channels worth of broadcast distribution data D154, and thus has the transmission data D168 including the forwarding order confirmation data D167 sent from its data transmission station 536.

Herein, in the satellite broadcast reception device 550 (FIG. 52 and FIG. 53), if the broadcast distribution data D154 is generated from the multiplexed data D157 at the demultiplexer 559 of the satellite broadcast receiver 551 when data is received, whether data with the receiver ID added thereto is included in the broadcast data D154 or not is detected, and in the case data with the receiver ID added thereto is included, the receiver ID is compared with the receiver ID allocated to the satellite broadcast reception device 550 of its own house 512 to 513, and as a result of this, the data with the receiver ID matching its own receiver ID added thereto is selectively fetched to be stored in the home server 552.

Thus, in the house of a user who has requested the photograph shop 507 and 508 to print the photographic image out of houses 512 to 513, when the transmission data D168 transmitted from the data distribution center 501 is received by the satellite broadcast receiver 551, the forwarding order confirmation data D167 included in the transmission data D168 can be correctly fetched to be stored in the home server 552.

Figure 54:
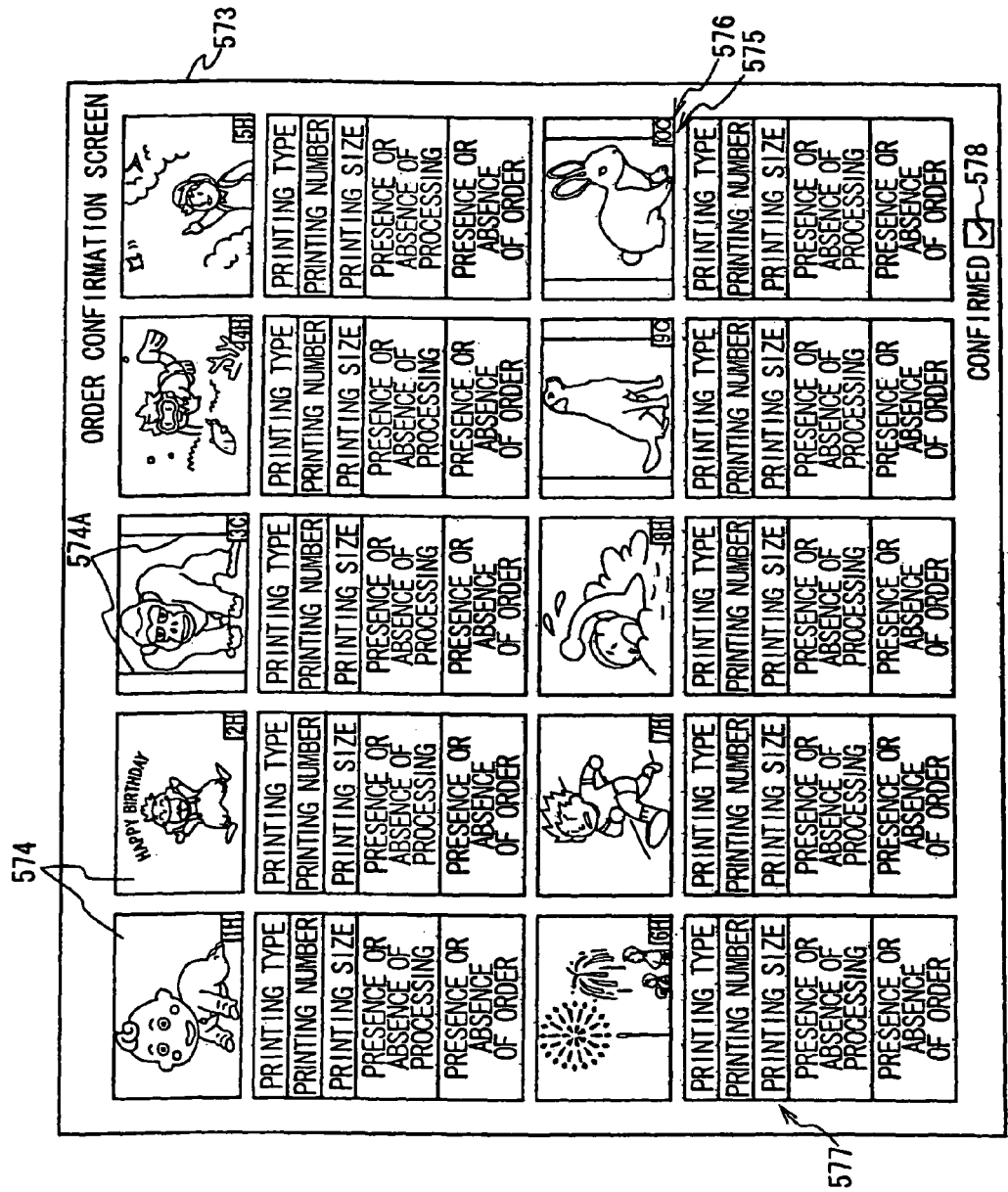
FIG. 54 is a schematic view showing a configuration of a screen-to confirm print photograph shop orders.

And, after that, the home server 552 reads the forwarding order confirmation data D167 from the internal hard disk in accordance with user's operation as shown in FIG. 54, then sends the forwarding order confirmation data to the monitor 565, thereby having a print photograph shop order confirmation screen 573 based on the forwarding order confirmation data D167 displayed on the monitor 565.

In this print photograph shop order confirmation screen 573, each photographic image 574 for which a request for printing has been made is displayed in thumb-nail, the printing type 576 designated at the time of picture taking with the use of an APS camera (not shown), is displayed at the lower right of the photographic image 574 together with the frame number 575, and the line 574A showing the angle of view of the designated printing type is further displayed on the photographic image 574 in an overlapping manner.

In addition, in the print photograph shop order confirmation screen 573, a printing condition display region 577 is provided respectively at the bottom of each photographic image 574, and on the printing condition display region 577 are displayed various kinds of printing conditions such as the printing type, the printing volume, the print size, the existence of the flame ornament and additional processing of the message and the existence of the printing of the photographic image designated at the time of picture taking or at the time of request for printing. Also, a check box 578 for showing that the confirmation of the printing condition is completed is provided at the lower right of the print photograph shop order confirmation screen 573.

And if predetermined operation instructions are inputted by the user, with this print photograph shop order confirmation screen 573 being displayed on the monitor 565, the home server 552 may change various kinds of printing conditions in the printing condition display region 577 on the print photograph shop order confirmation screen 573 in accordance with the operation instructions, and thereafter, the home server 552 has a check mark displayed on the check box 578 in accordance with the operation by the user, and then determines that the confirmation of the printing condition is completed.

Thereby, when the confirmation of the printing condition is completed, the home server 552 generates order confirmation completion data D169 from the print photograph shop confirmation screen 573 with the printing condition changed as necessary, adds the ID allocated in advance to the photograph shop 507 or 508 that has requested the printing process of the photographic image (hereinafter, it is referred to as photograph shop ID) to the order confirmation completion data D169, and sends the same to the node station 503 via the telephone line 510 or the dedicated line 511.

Herein, if the order confirmation completion data D169 is given from the home server 552, the node station (FIG. 50) reads the billing information, the user ID and the photograph shop ID added to the order confirmation completion data D169, records the read billing information, user ID and photograph shop ID in the internal memory, and then sends the order confirmation completion data D169 to the distribution station 534 via the dedicated line 502.

The distribution station 534 also stores the photograph shop ID and the receiver ID of the satellite broadcast reception device 550 owned by the photograph shop 507 or 508 in the server 535, with these IDs corresponding to each other, together with the aforesaid user ID and receiver ID, and if the order confirmation completion data D169 is given from the node station 503, the distribution station 534 fetches the photograph shop ID added to the order confirmation completion data D169.

And the distribution station 534 reads the receiver ID corresponding to the photograph shop ID from the server 535, adds the read receiver ID to the order confirmation completion data D169, and sends the obtained transmission order confirmation completion data D170 to the organization station 530 via the dedicated line 531.

Thereby, the organization station 530 sends the transmission order confirmation completion data D170 given from the distribution station 534 to the data transmission station 536 as a part of two or more channels worth of broadcast distribution data D154, and thus has transmission data D171 including the transmission order confirmation completion data D170 sent from the data transmission station 536.

In the photograph shop 507 or 508 (FIG. 53) requested to print the photographic image by the user, if the transmission data D171 is transmitted from the data distribution center 501 by the satellite broadcast receiver 551, the transmission order confirmation completion data D170 included in the transmission data D171 can be reliably fetched similar to the satellite broadcast receiver 551 (FIG. 52) described above, and the fetched transmission order confirmation completion data D170 is stored in the home server 552.

Thereby, in the photograph shop 507 or 508 (FIG. 53) requested to print the photographic image by the user, the transmission order confirmation completion data D170 stored in the home server 552 by the personal computer 570 is read, the print photograph shop order confirmation screen 573 based on the read transmission order confirmation completion data D170 (FIG. 54) is displayed on the monitor (not shown), and thus the printing condition of the photographic image can be confirmed on the basis of the print photograph shop order confirmation screen 573.

And in the photograph shop 507 or 508 (FIG. 53) requested to print the photographic image by the user, the print photograph and an index print are generated under the condition confirmed on the print photograph shop order confirmation screen 573, and the generated print photograph and the index print are delivered to the user (printing requester) by mail, for example, thereby making it possible to reliably avoid generating the print photograph under a printing condition different from the condition desired by the user.

Also, at this time, in the photograph shop 507 or 508, if the print photograph and the index print are forwarded to the user, identification data 172 for the billing information is sent to the node station 503 via the dedicated line 504.

And the node station 503 (FIG. 50) reads the corresponding billing information, user ID and photograph shop ID from the memory on the basis of the identification data given from the photograph shop 507 or 508, carries out the billing process on the basis of the billing information, user ID and photograph shop ID, and the obtained result of the billing process is sent to the bank 509 as the billing data D173 along with the user ID and the photograph shop ID.

Thereby, the bank 509 transfers the corresponding payment for printing from the account of the user who has made a request for the printing of the photographic image to the account of the photograph shop who has accepted the request to subject the photographic image to the printing process on the basis of the billing data D173 given from the node station 503 to carry out the billing process.

Thus, in this photographic image commercial transactions system 500, once a user brings in the APS film to the photograph shop 507 or 508 to request the printing of the photographic image, the user can receive the print photograph generated in accordance with a desired condition without visiting the photograph shop 507 or 508 thereafter, and can electronically carry out the payment for the printing, and the electronic commercial transactions for the printing of the photographic image can be established.

In this connection, in the photographic image commercial transactions system 500, not only the request for the printing of the photographic image, but a request for the forwarding of the photographic image and a request for the selling of the photographic image can be performed using the photograph shops 507 and 508 and the data distribution center 501 as in the case of the request for the printing.

That is, in the photographic image commercial transactions system 500, even at the time of the request for the forwarding of the photographic image and the request for the selling of the photographic image, the user can check the forwarding content and the selling content to provide notification to the photograph shops 507 and 508 while he or she stays in the house 512 to 514.

The photograph shop 507/508, when entrusted by a user with selling a photo picture, generates index data for introducing the photo picture and sends it to the data distribution center 501 so as to put the photo picture on view to the public via the data distribution center 501.

Confirming the contents of the photo picture received and to be sold, the photograph shop 507/508 generates film data to be sent/sold from the film data D15 with the use of a personal computer 570 and sends the data to the photograph shop 507/508 near the original sender or the purchaser via the data distribution center 501. Then, the photograph shop 507/508 can print out a photo and an index print from the received film data and send them to the original sender or purchaser by mail.

The data distribution center 501 (FIG. 50) can compress and encode the broadcast data D154 to be distributed. Therefore, for example, the center 501 sends the data D154 for a few hundreds of channels with the use of a frequency band of about 5 GHz reserved beforehand in a broadcasting satellite 516.

In recent years, however, in the data distribution center 501, the amount of the transmission data obtained by compressing and encoding the same amount of the distribution data D154 is getting less and less due to progress in the techniques for compressing and encoding data.

As a result, the data transfer rate per unit time required to send transmission data D150 from each channel (hereinafter, to be referred to as a real data transfer rate) is becoming less than the data transfer rate per unit time assigned to a channel (to be referred to as an assigned data transfer rate) in the data distribution center 501. Consequently, the assigned data transfer rate of each channel has come to have a surplus.

This is why the data distribution center 501 uses the surplus of the assigned data transfer rate, generated in each channel for, for example, the assignment of the error correction data generated with selective use of two methods, which are different in error correction performance, thereby improving the noise resistance of the transmission data D150 from each channel on the satellite line. The surplus of the data transfer rate of each channel can thus be used effectively.

Concretely, because the transmission data D150 is affected less by noise on a fine day, the data distribution center 501 assigns error correction data with a low error correction performance to the surplus of the data transfer rate of each channel. On the contrary, because the transmission data D150 is affected by noise more on a bad weather day, the data distribution center 501 assigns error correction data with a high error correction performance to the surplus of the data transfer rate assigned to each channel.

In some cases, however, in case the data distribution center 501 assigns a low error correction performance to such a surplus on a fine day, the amount of error correction data is reduced according to the degradation of the error correction performance, thereby a surplus is generated in an assigned data transfer rate even when error correction data is assigned to the surplus of the data transfer rate assigned to the channel as described above.

And, while the data distribution center 501 is set so as to broadcast data for a few hundreds of channels as described above, the number of picture production departments 532, music production departments 533, and distribution departments 534 are limited respectively as a matter of course. This is, why it is sometimes difficult to secure the picture distribution data D151, the music distribution data D152, and the program data D153 for all of such extremely many channels.

And, because the data distribution center 501 keeps securing a frequency band that is secured once for the broadcasting satellite 516 even when the band can have empty channels, the data transfer rate assigned to each of those empty channels is regarded as a surplus.

Furthermore, when considering the user's utilization rate for each channel, the utilization often becomes the highest, for example, in the time band between 6 p.m. and 12 a.m. while the user is possibly at his/her home 512 to 514, although it depends on the user's lifestyle. On the contrary, the utilization rate becomes low in the time band between morning and afternoon while the user often goes out.

Consequently, the data distribution center 501 stops data transmission to some of the channels (hereinafter, those channels will be referred to as transmission-limited channels) only in such time band in which the utilization rate is low. While data transmission is stopped for those transmission-limited channels, a surplus is also generated in the data transfer rate assigned to each of those channels.

In addition, in the data distribution center 501 the amount of the distribution data D154 itself for each channel is reduced in some cases according to changes in the amount of such data as picture distribution data D151, voice distribution data D152, etc included in the data D154. In such a case, therefore, a surplus is also generated in the data transfer rate of each of those channels.

Consequently, the data distribution center 501 uses a surplus generated in the data transfer rate of a channel so as to transmit predetermined data (hereinafter, to be referred to as transmission request data) D175 such as order confirmation data D167, order confirmation termination data D170, etc received from a photograph shop 507/508, as well as from a user when requested to send such data as order confirmation data D166, etc from the photograph shop 507/508 and/or when requested to send order confirmation completion data D169, etc from the user.

Figure 55:
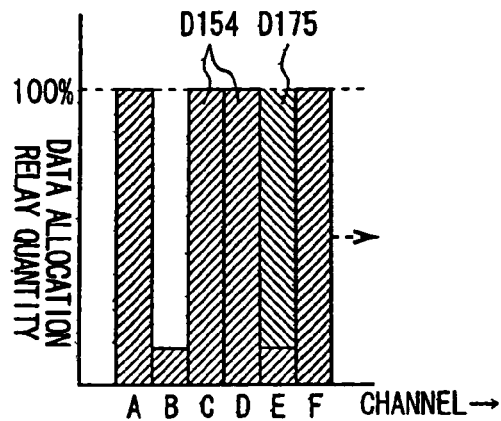
FIG. 55 is a schematic view for describing transmission of transmission request data utilizing surplus of data allocation relay quantities in channels.

Concretely, the programming department 530 in the data distribution center 501, when receiving transmission request data D175 from the distribution department 534 as shown in FIG. 55, detects a surplus in the data transfer rate assigned to a channel according to the weather condition (that is, a real data transfer rate required for error correction data in accordance with the error correction performance), the broadcasting plans of the picture production department 532, the music production department 533, and the distribution department 534 (that is, a change of the real data transfer rate required for the broadcast distribution data D154), and the broadcasting plan of each channel according to a programming list (that is, presence/absence of empty and transmission-limited channels).

The programming department 530 detects a real data transfer rate required for the transmission request data D175 received from the distribution department 534 and compares the detected real data transfer rate with the surplus of the data transfer rate assigned to a channel, thereby detecting a channel having a surplus in its assigned data transfer rate corresponding to the real data transfer rate. Consequently, the programming department 530 transmits the transmission request data D175 with use of the channel.

Consequently, in this photo picture e-commerce system 500, it is possible to transmit data D175 requested from a photograph shop 507/508, as well as from a user with use of the surplus of the data transfer rate assigned to the channel, thereby the data D175 can be sent at a significantly lower price than when a dedicated channel is secured for the transmission of the data D175.

In this connection, the programming department 530 sets a comparatively low error correction performance for the error correction data in case there is no channel having a surplus in the data transfer rate corresponding to the real data transfer rate required for the transmission request data D175. Consequently, it is possible to increase the surplus of the data transfer rate assigned to the channel and the increased surplus can be used to transmit the transmission request data D175.

Unlike the broadcast distribution data D154 to be transmitted according to a programming list, the transmission time is not limited for the transmission request data D175. Consequently, the programming department 530 must wait until a surplus is generated in a channel with respect to its data transfer rate corresponding to the real data transfer rate required for the transmission request data D175 even when the department 530 receives the data D175 from the distribution department 534. Consequently, it is possible to transmit the transmission request data D175 almost surely with use of a channel that has generated a surplus in its as signed data transfer rate.

In addition to the e-commerce for the above-described series of printed photos, this photo picture e-commerce system 500 can also provide a photo printing service with use of the picture distribution data D151 and the music distribution data D152. Hereunder, such the printing service will be described.

In this case, the production department 532 in the data distribution center 501, when generating picture distribution data D151 according to picture contents, creates picture service data D176 from the photo picture of a title for the picture contents, any scene in the picture contents, actor's/actress's photo picture, etc and transmits the generated picture service data D176 to the distribution department 534 via a leased line 512 so as to be stored in the server 535, as well as transmits the data D176 together with picture distribution data D151 to the programming department 530 via the leased line 531.

The music production department 533, when generating music distribution data D152 according to music contents, generates music service data D177 from a photo picture of a title for the music contents, such a photo picture as an album jacket, etc so as to match with the title, an artist photo picture, a photo picture for the words of a song, etc and transmits the generated music service data D177 to the distribution department 534 via a leased line 512 so as to be stored in the server 535, as well as transmits the data D177 together with the music distribution data D152 to the programming department 530 via the leased line 531.

And, the programming department 530 generates broadcast distribution data D178 to which the picture service data D176 and the music service data D177 received from the picture production department 532 and the music production department 533 are added so as to correspond to the broadcasting of the picture and music contents or so as to become the last data of the broadcasting and transmits the data items to each of the homes 512 to 514 via the data transmission department 536 and the satellite broadcasting antenna 515 sequentially.

Consequently, the satellite broadcast reception device 550 (FIG. 52) in each of the homes 512 to 514 can receive the picture service data D176 and the music service data D177 and store those service data items in the home server 552 (FIG. 52) respectively.

Figure 56:
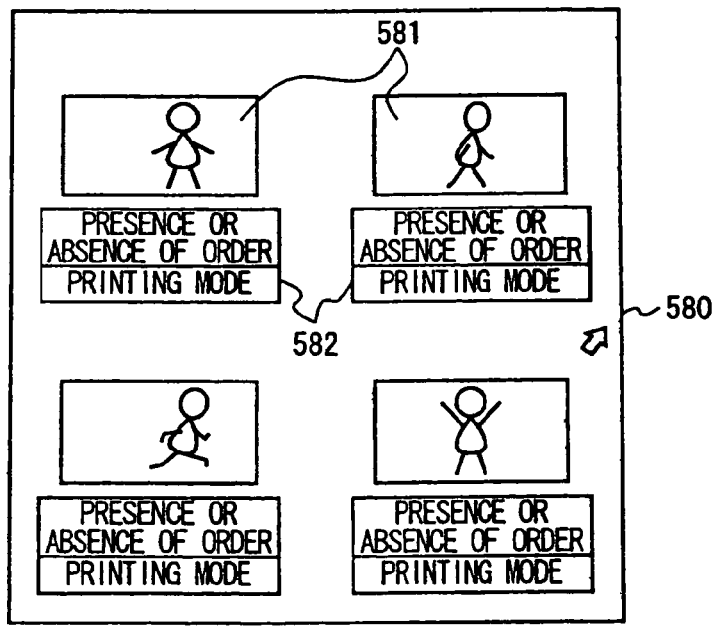
FIG. 56 is a schematic view showing a configuration of an image print ordering screen.

The home server 552, in case the user purchases the picture contents of the corresponding picture distribution data D151 after picture service data D176 is stored therein, reads the data D176 at the end of the broadcasting of the picture contents or at any user-specified timing and transmits the data D176 onto a monitor 565. Thus, the picture printing order screen 580 as shown in FIG. 56 is displayed on the monitor 565.

On this picture printing order screen 580 are displayed titles of picture contents, scenes in the picture contents, and various photo pictures of actors/actresses 581 as thumb-nails. On the screen 580 are also displayed presence/absence of orders for the photo pictures 581 and a select area 582 for selecting print types of ordered photo pictures.

And, receiving an order from a user on the picture print order screen 580, the home server 552 generates picture printing order data D179 according to the picture service data D176 and adds the user ID to the data D179, then transmits the data to the node department 503 via a telephone line 510 or leased line 511.

The node department 503 manages such picture services collectively. And, receiving picture printing order data D179 from the home server 522, the node department 503 specifies a photograph shop 507 or 508 to which printing of the ordered photo picture is requested, then generates print request data D180 from the picture printing order data D179 and the photograph shop ID of the photograph shop 507 or 508 and transmits the data D180 to the distribution department 534 via a leased line 502.

Consequently, the distribution department 534 reads the corresponding picture service data D176 from the server 535 according to the printing request data D180 and generates picture printing data D181 from the read picture service data D176, the printing request data D180, the user ID and the photograph shop ID added to the data D180, and the receiver ID of the satellite broadcast receiver 551 of the photograph shop 507/508. The distribution department 534 then transmits the data D181 to the programming department 530.

And, the programming department 530 generates broadcast distribution data D182 to which picture printing data D181 received from the distribution department 534 is added and transmits the data D182 to the photograph shops 507 and 508 sequentially via the data transmission department 536 and the satellite broadcasting antenna 515.

Consequently, the specified photograph shop 507/508 (FIG. 53) receives the picture printing data D181 via the satellite broadcast reception device 550, then transmits the data D181 to the photo picture printer 571 via the personal computer 570 so as to be printed in the print form specified by the user according to the printing data D181, thereby generating a printed photo, as well as a seal print, a calendar, and/or a poster on which the photo picture is printed, respectively.

The photograph shops 507 and 508 pass the printed photo, the seal print, the calendar, and/or the poster to the user by mail, according to the user order and transmit account data D183 denoting the printing charge (including the printing price) generated in this photo picture printing process to the node department 503 via a leased line 504 or 505.

Consequently, the node department 503 makes an account processing according to the account data D183, the service-related user ID, the ID of the photograph shop 507/508, the charge of the data distribution center 501, etc. and communicates the information about the account processing result to a bank 509, thereby enabling the bank 509 to, settle the account. The e-commerce for the picture printing service is thus finished.

On the other hand, the home server 552 (FIG 52), when having stored the music service data D177, reads the music service data D177 together with the music distribution data D152 from the hard disk while an IC card or memory card is loaded in the card slot 552A in case the user purchases the music contents of the corresponding music distribution data D152. Then, the home server 552 records the data D177 in the IC card or memory card via the card slot 552A.

Figure 57:
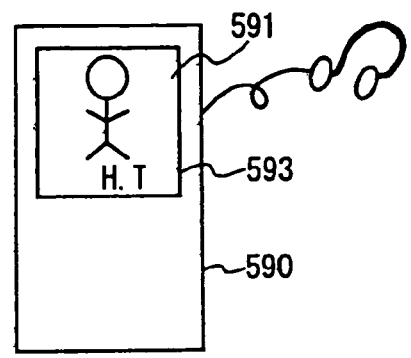
FIG. 57 is a schematic view for describing a portable music reproducing device in receipt of music service.
Figure 58:
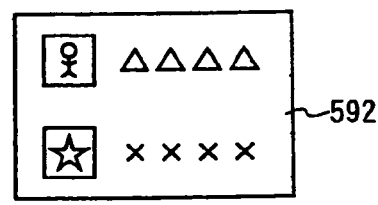
FIG. 58 is a schematic view showing a configuration of an icon image.

And, as shown in FIG 57, in a portable music player 590 in which an IC card or memory card is to be loaded, a title (not illustrated), the words of a song (not illustrated), a photo picture 591 corresponding to the title, and further an icon picture 592 provided with an icon specific to music contents together with the title, etc as shown in FIG 58 are displayed on a display device 593 of the portable music player 590 (FIG 57) according to the music service data D177 read from the IC card or memory card. Consequently, the user can enjoy not only the music contents, but also various other pictures related to the music contents.

By the way, the home server 552 (FIG 52), when the user purchases the music service data D177 as described above, transmits the accounting information for the corresponding music contents, as well as the accounting information for the music service and the type of the recording medium used for purchasing the music service data D177, to the node department 503 via the telephone line 510 or leased line 511.

In this case, the node department 503 (FIG 50) manages such music services collectively. And, when receiving accounting information for music contents and a music service from the home server 552, the node department 503 processes the account according to the accounting information and communicates the accounting result to a bank 509, thereby enabling the bank 509 to settle the account and finish the e-commerce for the music service purchase.

The node department 503 (FIG 50) specifies a photograph shop 507/508 so as to request the shop for printing the photo picture as one of the music services even after the account is processed so as to finish the e-commerce as described above. The node department 503 then communicates the information and the type of the recording medium used by the user to the distribution department 534 via the leased line 502.

Consequently, the distribution department 534 reads the corresponding music service data D177 from the server 535 according to the received information and generates music printing data D190 from the read music service data D177, the user ID, the photograph shop ID, and the receiver ID of the satellite broadcast receiver 551 of the photograph shop 507/508 and transmits the data D190 to the programming department 530.

The programming department 530 then generates broadcast distribution data D191 to which the music print data D190 received from the distribution department 534 is added just like the picture service described above and transmits the generated data D191 to the photograph shops 507 and 508 sequentially via the data transmission department 536 and the satellite broadcasting antenna 515.

Figure 59:
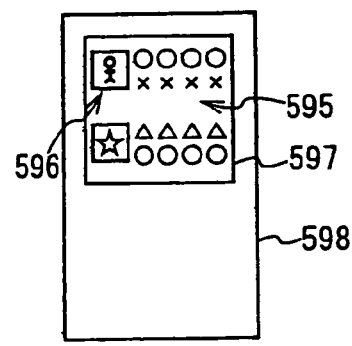
FIG. 59 is a schematic view for describing appearance of a sticker label.

Consequently, the specified photograph shop 507/508 (FIG 53) receives the music print data D190 via the satellite reception device 550, then transmits the data D190 to the photo printer 571 via the personal computer 570 so as to enable the photo printer 571 to generate a stick label 497 on which a picture 596 is printed out so as to match with a title together with the title 595, for example, as shown in FIG 59, according to the music print data D190, and sends the label 497 to the corresponding user by mail.

Thus, the user, after purchasing the music service data D177, can enjoy a picture of the purchased music service data D177 displayed on the display device 593 of the portable music player 590. In addition, the user can stick the label 497 on the IC card or memory card 598 that records the corresponding music contents so as to easily identify if the subject contents are recorded in the IC card or memory card 598.

To provide such picture and music services, the data distribution center 501 uses the surplus of the data transfer rate assigned to a channel just like the photo picture printing request described above so as to transmit the picture service data D176, the music service data D177, as well as the picture printing data D181 and the music printing data D190 that must be transmitted to the photograph shop 507/508 when in service operation.

In this fifth embodiment, the home server 552 (FIG 52), while it has a storage capacity of, for example, 30 to 100 gigabytes, should preferably have a storage capacity of 1 tera-bytes or over when it keeps storing the desired program data D153 selected from the broadcast distribution data D154 received from the data distribution center 501, the picture distribution data D151, and the music distribution data D152.

Concretely, the home server 552 should preferably have a storage capacity of 1 tera-bytes or over inevitably in case picture data that requires a two-hour broadcasting time is 6 gigabytes in data length and the user stores about 200 titles of such picture data for a year so as to keep watching and listening to pictures output on the basis of the picture data.

The home server 552 of the user's satellite broadcast reception device 550, when the above-described photo printing order confirmation screen 573 shown in FIG 54 is displayed on the monitor 565, can confirm the photo picture printing condition and specify a purchase of the index data configured by each photo picture displayed as a thumb nail and can communicate the specification of the purchase of the index data together with the order confirmation termination data D169 to the photograph shops 507 and 508.

Receiving this information, the photograph shop 507/508 generates the index data on the basis of the film data D15 on the personal computer 570 and transmits the generated index data to the user's satellite broadcast reception device 550 via the data distribution center 501.

Consequently, the user can purchase the index data separately from the printed photo and the index received from the photograph shop 507/508 and display index pictures on the monitor 565 on the basis of those data items. In addition, the user can transfer the index data from the home server 552 to an IC card or memory card 598 so as to be recorded therein.

Any of the photograph shops 507 and 508, even when transmitting the index data to the user in such way, generates a stick label matching with the contents of the IC card or memory card 598 and sends it to the user so that the user can identify the contents in the IC card or memory card 598 easily.

The photo picture e-commerce system 500 configured as described above, when the photograph shop 507/508 receives a photo picture printing request, generates order confirmation data D166 according to the request and sends it to the data distribution center 501 via the leased line 504, the node department 503, and the leased line 502 sequentially, so that the data distribution center 501 transmits the order confirmation data D166 to the corresponding user's satellite broadcast reception device 550 with use of the surplus of the data transfer rate assigned to a channel.

In the photo picture e-commerce system 500, in case a user's satellite broadcast reception device 550 generates order confirmation termination data D169 after the user receives the order confirmation data D166 and finishes the confirmation for the photo picture printing condition, the reception device 550 transmits the order confirmation completion data D169 to the data distribution center 501 via the telephone line 510 or the leased line 511, the node department 503, and the leased line 502 sequentially, so that the data distribution center 501 transmits the order confirmation completion data D169 to the corresponding photograph shop 507/508, as well as to the satellite broadcast reception device 550 with use of the surplus of the data transfer rate assigned to a channel.

The photo picture e-commerce system 500 then enables the photograph shop 507/508 to print out the photo picture according to the order confirmation completion data D169 so as to generate a printed photo and enables the node department 503 to ask an account for the printing of the photo and the bank 509 to settle the account according to the accounting processing. Thus, the e-commerce is finished.

Consequently, because the photo picture e-commerce system 500 enables the data distribution center 501 to transmit the transmission request data D175 received from a photograph shop 507/508 and a user with use of the surplus of the data transfer rate assigned to a channel and without use of any dedicated channel, it is possible to transmit the transmission request data D175 required for printing photo pictures at a very low transmission fee.

And, because the photo picture e-commerce system 500 enables the data distribution center 501 to transmit the transmission request data D175 with use of the surplus of the data transfer rate assigned to a channel and without requiring any new investment, it is possible to make such electronic commerce for photo pictures with use of an existing system at a low price and effectively.

Furthermore, in case only the telephone line 510 and the leased lines 504 and 511 that are comparatively low in transfer rate are used to transmit the transmission request data D175 to a destination, the photo picture e-commerce system 500 takes much time for transmitting the transmission request data D175 and the charge for using the telephone line 510 and leased lines 504 and 511 becomes high.

On the contrary, the photo picture e-commerce system 500 uses communication lines whose transfer rates are significantly higher than those of the telephone line 510 and the leased lines 504 and 511 as part of the transmission path to the destination of the transmission request data D175, so it is possible to reduce the time for using the lines 510, 504, and 511 so as to reduce the line usage. In addition, it is possible to reduce the line usage fee significantly by transmitting the data D175 faster with use of such communication lines.

Thus, the configuration of the photo picture e-commerce system 500 as described above makes it possible to transmit communication data between the photograph shop 507/508 and the user's satellite broadcast reception device 550 at a significantly low transmission fee in the data distribution center 501, since it does not use any dedicated, communication channel and the data distribution center 501 uses the surplus of the data transfer rate assigned to a channel. Consequently, the photo picture e-commerce system of the present invention can reduce the cost of the e-commerce of photo pictures significantly.

(9) Other Embodiments

While settlement of accounts is done in the banking institution 256 owned by the accounting company in the first to fourth embodiments described above, the present invention is not limited only to the method; it is possible that the accounting company carries out only the accounting and a newly decided settlement company can carry out the settlement.

While accounting information is embedded in the film data D15 before it is transmitted in the first to fourth embodiments described above, the present invention is not limited only to the method; it is possible that the accounting information is transmitted to the banking institution separately from the film data D15.

Furthermore, while the user data D4 and the laboratory data D14 are recorded/reproduced magnetically in/from the user area 6 and the laboratory area 7 of the APS film 1 in the first to fourth embodiments described above, the present invention is not limited only to the method; it is possible that the user data D4 and the laboratory data D14 are recorded/reproduced magnetically and/or optically in/from the user area 6 and the laboratory area 7 of the APS film 1. Using such the magnetical and optical recording methods will thus make it possible to record much more information as both user data D4 and laboratory data D14.

Furthermore, while a photo picture that is sent or sold is passed to the photograph shops 252, 405, as well as 507 and 508 so as to be printed out on a printing paper as a printed photo picture and an index print respectively in the first to fifth embodiments described above, the present invention is not limited only to the method; it is possible in case the user has a printer that the photograph shop 251/301/362/403/507/508 that has accepted the photo picture generates film data corresponding to the printer and transmits the film data to the user, so that the user can print out the photo picture and generate an index print of the photo picture according to the received film data. Consequently, transmission of printed photos and selling of photo pictures can be done at low prices, since the photograph shops 252, 405, 507, and 508 are not used for generating printed photos and index prints.

Furthermore, frame decoration and synthesizing of a message list and an advertisement are done at the photograph shops 301, 362, and 403 for the accepted photo pictures in the second to fourth embodiments described above, the present invention is not limited only to the method; the photograph shops 252 and 405 that have accepted photo pictures can do such the frame decoration and synthesizing of a message list and an advertisement.

Furthermore, a photo-picture specified by a user is replaced with an advertisement in the second to fourth embodiment described above, the present invention is not limited only to the method; a photo picture specified by the user so as not to be transmitted can be replaced with an advertisement forcibly.

Furthermore, while film data is stored in the servers of the photograph shops from which a photo picture is transmitted and sold out respectively in the first to fifth embodiments described above, the present invention is not limited only to the method; film data to be transmitted and sold out can be stored by a service provider and/or by one or a plurality of such organizations as photographs, etc to which the printed photo is to be passed. Consequently, for example, in case the film data is stored by a service provider, there is no need for a photograph shop to use any lines including a telephone line for transmitting and selling the same film data, thereby the line usage fee can be much reduced.

Furthermore, while a masking treatment is prevented from being reset while it is applied to conversion photo picture data D50 in the first to fourth embodiments described above, the present invention is not limited only to the method; the masking treatment for the conversion photo picture data D50 can be reset as needed by using, for example, predetermined key data even when the masking treatment has already been done for the conversion photo picture data D50.

Furthermore, a photo picture is transmitted in the fourth embodiment described above, the present invention is not limited only to the method; the embodiment can apply to selling of the photo picture.

Figure 60:
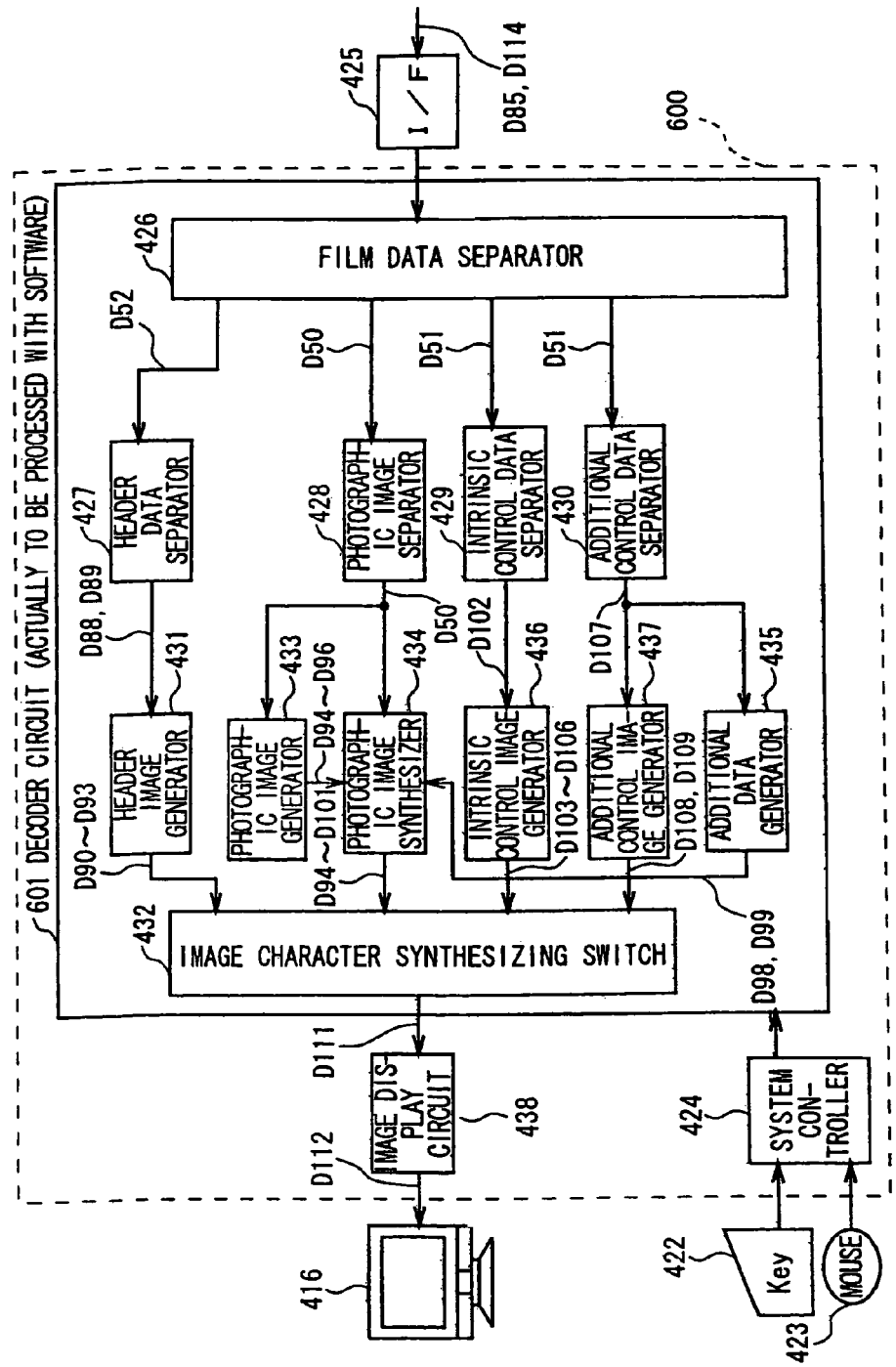
FIG. 60 is a block diagram showing a circuit configuration of a personal computer according to another embodiment.

Furthermore, the personal computer 401 of the user who has requested transmission of data is configured as shown in FIG 45 in the above fourth embodiment described above, the present invention is not limited only to the configuration; the personal computer can be configured so as not to scramble the software executed in the decoder circuit 601 unless scrambled film data is transmitted to the personal computer 600 of the user who has requested transmission of data in FIG. 60 in which the same reference numbers are given to the same parts as those shown in FIG 45. In such a case, it is possible to eliminate the processings for confirming the key data and scrambling the film data so as to simplify the configuration of the software executed in the decoder circuit 601. And, the personal computer 402 of the photo recipient user, the personal computer 404 of the photograph shop that has accepted a photo picture and the personal computer 406 of the photograph shop that delivers the printed photo can have the functions of such the personal computer 600.

Moreover, in the above described first to fifth embodiments, described was such a case where photographic image printing machines 10A, 302 and 571 are used so that light beams obtainable from the lamp are radiated over the entire photographic image of the APS negative film 1A and photographic image lights obtainable subject to equalization of the photographic image are taken into a charge coupled device to form the photographic image data, but the present invention is not limited thereto, and, such a photographic image printing machine that uses optical system of a line scanner type to generate photographic image data from the photographic image of the APS negative film 1A can be arranged to be applied.

Figure 61:
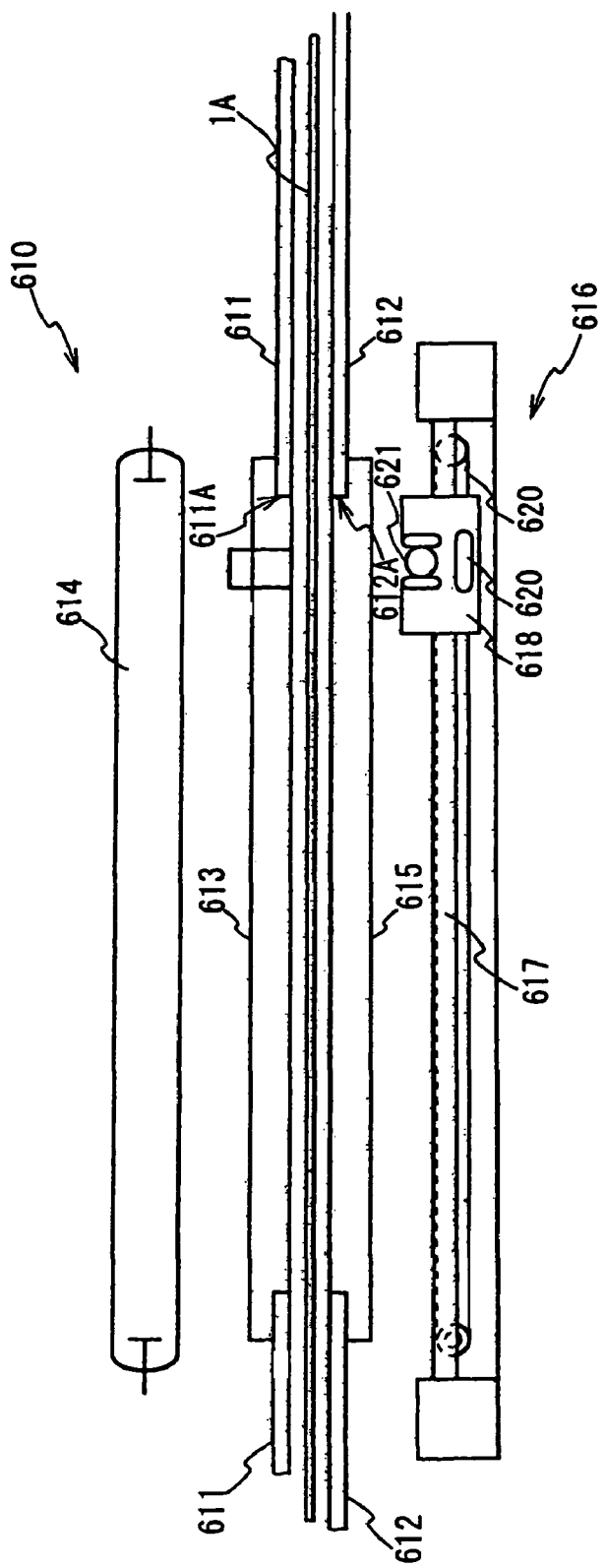
FIG. 61 is a schematic sectional view showing a configuration of a photographic image printing machine having an optical system of a line scanner type according to another embodiment.
Figure 62:
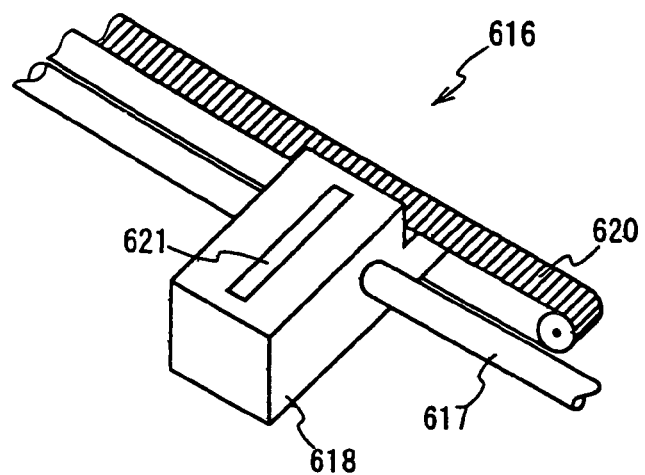
FIG. 62 is a schematic perspective view showing a configuration of a scanner section.

That is, as shown in FIG. 61 and FIG. 62, in a photographic image printing machine 610, an APS negative film 1A, which is driven by a film driving motor (not shown), has been caused to come through between a pair of plate-shaped holding members 611 and 612 and through holes 611A as well as 612A corresponding with image corners of the photographic image of the APS negative film 1A have been punched out. In addition, the holding member 611 of one face side of the APS negative film 1A is provided with a diffusion filter 613 so as to close the through hole 611A, and a lamp 614 is disposed upside the diffusion filter 613.

On the other side, the holding member 612 at the other face side of the APS negative film 1A is provided with a light transmitting window 615 so as to close the through hole 612A, and a scanner 616 is disposed downside the window 615. This scanner portion 616 is arranged to comprise a slider 618 which is slidably mounted on a positioning rod 617 so that the slider 618 can be caused to slide via a (not shown) motor and a belt 619.

In addition, in such a scanner portion 616, the slider 618 is provided with a line sensor type electric charge coupled element 620 and a lens 621 so that, when light beams shot from the lamp 614 onto the driven APS negative film 1A are radiated through a diffusion filter 613, the photographic image of the APS negative film 1A has been transmitted and thereafter the light beams that have transmitted the window 615 are arranged to be available for the electric charge coupled element 620 to receive via the lens 612.

Thus, such a photographic image printing machine 610 is arranged to comprise an electric charge coupled element 620 bringing the sequentially received light beams into photoelectric conversion and thereby photographic image data can be generated.

Figure 63:
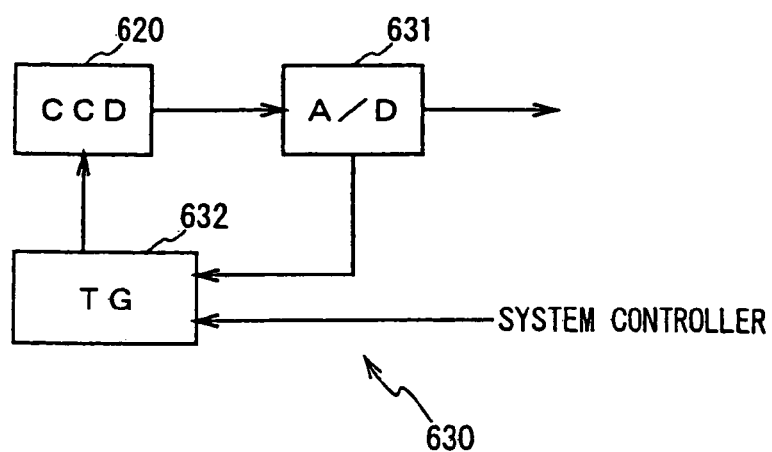
FIG. 63 is a block diagram showing a circuit configuration of an electronic shutter circuit.

Incidentally, this photographic image printing machine 610 comprises an electronic shutter circuit 630 as shown in FIG. 63 and the electronic shutter circuit 630 is designed to supply a timing generating circuit 632 with over flow data to be obtained by taking photoelectric signals obtained from the electric charge coupled element 620 into an analog/digital conversion circuit 631 as well as to supply the timing generating circuit 632 with predetermined control data from a (not shown) system controller and to cause the timing generating circuit 632 to generate a timing pulse with a variable width based on that over flow data and the control data for supplying the electric charge coupled element 620 with this so as to give electronic shutter function to the electric charge coupled element 620 to obtain a sharp photographic image.

Moreover, in the above described first to fifth embodiments, described was such a case where the present invention has been applied to photographic image electric commercial transactions systems 220, 250, 300, 360, 400 and 500 realizing electric commercial transactions utilizing photographic image exposed and formed onto an APS film 1 by using an APS camera 15, but the present invention is not limited thereto, and can be widely applied to various electric commercial transactions systems in addition to an electric commercial transaction system, etc that realizes electric commercial transactions utilizing static images or moving images recorded in a memory card, an IC card, and a disk-shaped recording media, or tape-shaped recording media, etc. together with a handling conditions such as user data described above with regard to FIGS. 6A and 6B with a digital still camera and a digital video camera, etc.

Moreover, in the above described first to third embodiments, described was such a case where converted photographic image data D50, which underwent scrambling process with key data, were arranged to store key data in an intrinsic control data storage region of photographic image header data D51 added to those conversion photographic image data D50 in accordance with necessity, but the present invention is not limited thereto, and the key data can be arranged to be forwarded to a forwarding receiver with another timing different from that for the film data D15, and thereby, secrecy of the conversion photographic image data D50 subject to scrambling process can be improved further.

Moreover, in the above described first to fifth embodiments, described was such a case where film header data D52, conversion photographic image data D50 as well as photographic image data D51 and only data related to photographic images as the film data D15 were arranged to be transmitted, but the present invention is not limited thereto, and music data and music message data, etc can be stored in, for example, an additional control data storage region of the photographic image header data D51 of the film data D15 so that, when a photographic image based on the conversion photographic image data D50 is displayed on a monitor of a personal computer, those music data and music message data can be arranged to be served to a forwarding receiver so as to be reproduced.

Moreover, in the above described first to fifth embodiments, described was such a case where a forwarding request of a print photograph shop as well as selling request of a photographic image were arranged to be received by a photograph shop, but the present invention is not limited thereto, and a machine that proceeds with generation of data for forwarding through to forwarding collectively such as a personal computer as well as a photographic image printing machine installed in a photograph shop can be installed in various places such as a convenient store, a large store and a public facility, etc so that the installed machine receives photographic forwarding request as well as selling request on photographic images and proceeds with forwarding and selling. In addition, if such machines are installed at various places, users can further execute forwarding of print photograph shops as well as selling of photographic images freely.

As described above, according to the present invention, a reception dealer is arranged to receive selling of images recorded in a predetermined recording media in a predetermined form as well as handling conditions intrinsic to the images and to sell the images as well as handling conditions in digital data form, and subject to establishment of a deal a charge accounting dealer proceeds with electronic charge accounting transaction for purchase of data of images as well as handling conditions, and thereby image for selling together with handling conditions are digitalized to digital data to be sold so that the purchased images can be caused to be utilized with handling method intended by a seller according to those handling conditions, and thus selling corresponding with intention of the seller can be realized.

While there has been described in connection with the preferred embodiments of the invention, it will be obvious to those skilled in the art that various changes and modifications may be aimed, therefore, to cover in the appended claims all such changes and modifications as fall within the spirit and scope of the invention.

The invention claimed is:

1. A method of distributing content data, comprising the steps of:
storing content data, program information data and content service data in a server, wherein the content data includes moving picture content data;
distributing the content data with the program information data and the content service data to a computer;
receiving the content data with the program information data and the content service data in the computer;
storing the content data with the program information data and the content service data in the computer; and
displaying a screen related to the stored content data, wherein the screen includes a scene from the content service data, wherein the scene corresponds to the moving picture content data;
the content service data includes billing information that is transmitted to a node station upon purchase of the moving picture content data by a user of the computer,
when the moving picture content data is purchased, the computer fetches the billing information and sends the billing information and a user ID to the node station, the node station carries out a billing process based on the billing information and user ID and sends the result to a bank together with the user ID, and the bank transfers payment for purchase from an account of the user to an account associated with a provider of the moving picture content data,
the content data, program information, and content service data is distributed over a channel that is detected as a channel having a surplus transfer rate in the case that there is a channel detected as a channel having a surplus transfer rate sufficient for distributing the content data, program information, and content service data, and in the case that there is no channel detected as a channel having a surplus transfer rate sufficient for distributing the content data, program information, and content service data, an error correction performance of a channel is lowered such that the channel for which the error correction performance is lowered has a surplus transfer rate sufficient for distributing the content data, program information and content service data, and the content data, program information and content service data is distributed over the channel for which the error correction performance is lowered.

2. The method according to claim 1, wherein the step of distributing is performed according to a schedule.

3. The method according to claim 1, wherein the content data is stored with duplication limitation information in the computer.

4. The method according to claim 1, further comprising the steps of:

storing still picture data provided by an imaging device in the computer; and storing the still picture data from the computer into a portable music player.

5. The method according to claim 1, further comprising the step of:

storing the content data from the computer into a portable music player using a program table.

6. The method according to claim 5, further comprising the step of:

displaying album jacket image data corresponding to the content data on the portable music player.

7. A method of reproducing moving picture service data, comprising the steps of:

receiving moving picture service data in a computer from a server via an internet; and enabling reproduction of scene data in the moving picture service data if a moving picture content data is purchased;

wherein the scene data corresponds to the moving picture content data;

the moving picture service data includes billing information that is transmitted to a node station upon purchase of the moving picture content data by a user of the computer, when the moving picture content data is purchased, the computer fetches the billing information and sends the billing information and a user ID to the node station, the node station carries out a billing process based on the billing information and user ID and sends the result to a bank together with the user ID, and the bank transfers payment for purchase from an account of the user to an account associated with a provider of the moving picture content data, the motion picture service data is received over a channel that is detected as a channel having a surplus transfer rate in the case that there is a channel detected as a channel having a surplus transfer rate sufficient for distributing the motion picture service data, and in the case that there is no channel detected as a channel having a surplus transfer rate sufficient for distributing the motion picture service data, an error correction performance of a channel is lowered such that the channel for which the error correction performance is lowered has a surplus transfer rate sufficient for distributing the motion picture service data, and the motion picture service data is distributed over the channel for which the error correction performance is lowered.

8. The method according to claim 7, further comprising the steps of:

storing the moving picture service data in the computer before reproducing the scene data.

9. The method according to claim 7, wherein the moving picture service data includes a title and a picture, wherein the scene data is reproduced with the title and the picture to allow selection of stored moving picture content data.

10. A method of reproducing moving picture content data distributed via an internet, comprising the steps of:

receiving the moving picture content data and moving picture service data in a computer via the internet from a server;

storing the moving picture content data and the moving picture service data in the computer;

displaying a scene from the moving picture service data; wherein the scene corresponds to the stored moving picture content data;

the moving picture service data includes billing information that is transmitted to a node station upon purchase of the moving picture content data by a user of the computer, when the moving picture content data is purchased, the computer fetches the billing information and sends the billing information and a user ID to the node station, the node station carries out a billing process based on the billing information and user ID and sends the result to a bank together with the user ID, and the bank transfers payment for purchase from an account of the user to an account associated with a provider of the moving picture content data, the moving picture content data and moving picture service data is received over a channel that is detected as a channel having a surplus transfer rate in the case that there is a channel detected as a channel having a surplus transfer rate sufficient for distributing the motion picture content data and motion picture service data, and in the case that there is no channel detected as a channel having a surplus transfer rate sufficient for distributing the motion picture content data and motion picture service data, an error correction performance of a channel is lowered such that the channel for which the error correction performance is lowered has a surplus transfer rate sufficient for distributing the motion picture content data and motion picture service data, and the motion picture content data and motion picture service data is distributed over the channel for which the error correction performance is lowered.

11. The method according to claim 10, wherein the moving picture service data further includes a title and a picture, wherein the title and the picture are displayed with the displayed scene to allow selection of the stored moving picture content data.

12. The method according to claim 10, further comprising the steps of:

reproducing the moving picture content data stored in the computer; and storing the moving picture service data in a portable player, wherein the scene is displayed on the portable player.

* * * * *